United States Patent
Breaux, III et al.

(10) Patent No.: US 11,778,436 B2
(45) Date of Patent: *Oct. 3, 2023

(54) SYSTEMS, METHODS, AND DEVICES FOR ENFORCING DO NOT DISTURB FUNCTIONALITY ON MOBILE DEVICES

(71) Applicant: CELLCONTROL, INC., Baton Rouge, LA (US)

(72) Inventors: Joseph E. Breaux, III, Baton Rouge, LA (US); John Wright, Baton Rouge, LA (US); Chad A. Kennedy, Baton Rouge, LA (US)

(73) Assignee: CELLCONTROL, INC., Baton Rouge, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,509

(22) Filed: Oct. 28, 2021

(65) Prior Publication Data
US 2022/0053081 A1     Feb. 17, 2022

Related U.S. Application Data

(63) Continuation of application No. 16/041,053, filed on Jul. 20, 2018, now Pat. No. 11,178,272.
(Continued)

(51) Int. Cl.
*H04M 1/72463* (2021.01)
*H04M 1/72403* (2021.01)
(Continued)

(52) U.S. Cl.
CPC ............ *H04W 4/48* (2018.02); *G06V 20/593* (2022.01); *H04M 1/72403* (2021.01);
(Continued)

(58) Field of Classification Search
CPC ......... H04M 1/72577; H04M 1/72522; H04M 1/72569; H04W 4/48; H04W 4/02;
(Continued)

(56) References Cited

U.S. PATENT DOCUMENTS 5,410,621 A     4/1995  Hyatt
6,745,021 B1    6/2004  Stevens
(Continued)

FOREIGN PATENT DOCUMENTS

EP          1335614         11/2007

OTHER PUBLICATIONS

Extended Search Report issued in Appl. No. EP20755622.6 (dated Oct. 17, 2022).

*Primary Examiner* — Umair Ahsan
(74) *Attorney, Agent, or Firm* — Barnes & Thornburg LLP

(57) ABSTRACT

Technologies disclosed herein are directed to enforcing blocking functionality on a mobile device (e.g., a mobile device within a vehicle). The mobile device receives a request to disable a blocking of a user interaction with one or more functions of the mobile device. The mobile device prompts a capture of an image by a camera of the mobile device. The mobile device determines whether the image is captured from a passenger space in the vehicle. Once so determined, the mobile device disables the blocking of the user interaction with the one or more functions of the mobile device.

20 Claims, 10 Drawing Sheets

Related U.S. Application Data

(60) Provisional application No. 62/553,993, filed on Sep. 4, 2017, provisional application No. 62/545,443, filed on Aug. 14, 2017.

(51) Int. Cl.

| | | |
|---|---|---|
| *H04M 1/72454* | (2021.01) | |
| *G06V 20/59* | (2022.01) | |
| *H04W 4/48* | (2018.01) | |
| *H04N 23/61* | (2023.01) | |
| *H04M 1/02* | (2006.01) | |

(52) U.S. Cl.
CPC ... *H04M 1/72454* (2021.01); *H04M 1/72463* (2021.01); *H04N 23/61* (2023.01); *G06F 2218/10* (2023.01); *H04M 1/0264* (2013.01); *H04M 2250/52* (2013.01)

(58) Field of Classification Search
CPC .............. H04W 48/04; G06K 9/00832; G06K 9/00838; H04N 5/23218
See application file for complete search history.

(56) References Cited

U.S. PATENT DOCUMENTS

| | | | |
|---|---|---|---|
| 7,711,355 | B1 | 5/2010 | Kruger |
| 7,991,399 | B2 | 8/2011 | Ganesan |
| 8,213,962 | B2 | 7/2012 | Carr et al. |
| 8,254,592 | B2 | 8/2012 | Sander et al. |
| 8,280,791 | B2 | 10/2012 | Davis, III |
| 8,630,283 | B1 | 1/2014 | Breau |
| 8,676,266 | B2 | 3/2014 | Kim |
| 8,732,827 | B1 | 5/2014 | Zhukov |
| 9,338,605 | B2 | 5/2016 | Guba et al. |
| 9,398,421 | B2 | 7/2016 | Guba et al. |
| 9,912,802 | B2 | 3/2018 | Wolterman |
| 10,268,530 | B2 | 4/2019 | Breaux et al. |
| 10,922,157 | B2 | 2/2021 | Breaux |
| 11,119,836 | B2 | 9/2021 | Breaux |
| 2001/0005804 | A1 | 6/2001 | Rayner |
| 2005/0220286 | A1 | 10/2005 | Valdez |
| 2006/0080444 | A1 | 4/2006 | Peddemors |
| 2006/0083390 | A1 | 4/2006 | Kaderavek |
| 2006/0177014 | A1 | 8/2006 | Skakkebaek |
| 2007/0183651 | A1 | 8/2007 | Camaniciu |
| 2007/0195818 | A1 | 8/2007 | Stephenson |
| 2007/0280211 | A1 | 12/2007 | Malueg |
| 2008/0114647 | A1 | 5/2008 | Singer et al. |
| 2008/0200143 | A1 | 8/2008 | Qiu |
| 2008/0227493 | A1 | 9/2008 | Yamazaki |
| 2009/0005136 | A1 | 1/2009 | Hutzel et al. |
| 2009/0049220 | A1 | 2/2009 | Conti |
| 2009/0153295 | A1 | 6/2009 | Hamada |
| 2009/0247189 | A1 | 10/2009 | Sennett |
| 2009/0309831 | A1 | 12/2009 | Sun |
| 2009/0325566 | A1 | 12/2009 | Bell |
| 2010/0005804 | A1 | 1/2010 | Chen et al. |
| 2010/0305779 | A1 | 12/2010 | Hassan |
| 2011/0009107 | A1 | 1/2011 | Guba |
| 2011/0065375 | A1 | 3/2011 | Bradley |
| 2011/0269441 | A1 | 4/2011 | Silver |
| 2011/0105082 | A1 | 5/2011 | Haley |
| 2011/0112717 | A1 | 5/2011 | Resner |
| 2011/0112969 | A1 | 5/2011 | Zaid et al. |
| 2011/0185390 | A1 | 7/2011 | Faenger |
| 2011/0205040 | A1 | 8/2011 | van Wiemeersch |
| 2011/0248992 | A1 | 10/2011 | Van Os |
| 2011/0280386 | A1 | 11/2011 | Fotta |
| 2011/0298924 | A1 | 12/2011 | Miller |
| 2012/0009896 | A1 | 1/2012 | Bandyopadhyay |
| 2012/0021770 | A1 | 1/2012 | Naqvi |
| 2012/0036220 | A1 | 2/2012 | Dare |
| 2012/0142315 | A1 | 6/2012 | Chung |
| 2012/0172012 | A1 | 7/2012 | Sumcad |
| 2012/0214470 | A1 | 8/2012 | Tadayon et al. |
| 2012/0214472 | A1 | 8/2012 | Tadayon |
| 2012/0220284 | A1 | 8/2012 | Tadayon et al. |
| 2012/0244877 | A1 | 9/2012 | Margalef |
| 2012/0276867 | A1 | 11/2012 | McNamee |
| 2013/0024812 | A1 | 2/2013 | Reeves |
| 2013/0084847 | A1 | 4/2013 | Tibbitts et al. |
| 2013/0111020 | A1 | 5/2013 | Cohen |
| 2013/0131890 | A1 | 5/2013 | Armitage |
| 2013/0147901 | A1 | 6/2013 | Weiser |
| 2013/0163476 | A1 | 6/2013 | Meghani |
| 2013/0183924 | A1 | 7/2013 | Saigh |
| 2013/0218902 | A1 | 8/2013 | Vendrow |
| 2013/0227419 | A1 | 10/2013 | Lee |
| 2013/0281079 | A1 | 10/2013 | Vidal |
| 2013/0295901 | A1 | 11/2013 | Abramson |
| 2013/0303143 | A1 | 11/2013 | Schrader |
| 2013/0324160 | A1 | 12/2013 | Sabatellil |
| 2013/0336094 | A1 | 12/2013 | Gruteser et al. |
| 2014/0052531 | A1 | 2/2014 | Kent et al. |
| 2014/0052681 | A1 | 2/2014 | Nitz |
| 2014/0063175 | A1 | 3/2014 | Jafry |
| 2014/0087708 | A1 | 3/2014 | Kalita |
| 2014/0111391 | A1 | 4/2014 | Nagata |
| 2014/0177818 | A1 | 6/2014 | Chang |
| 2014/0179261 | A1 | 6/2014 | Riggs |
| 2014/0187219 | A1 | 7/2014 | Yang |
| 2014/0256303 | A1 | 9/2014 | Jones |
| 2014/0280625 | A1 | 9/2014 | Byrd et al. |
| 2014/0282003 | A1 | 9/2014 | Gruber |
| 2014/0370869 | A1* | 12/2014 | Naqvi ............... H04M 1/72463 455/418 |
| 2014/0373095 | A1 | 12/2014 | Yoon |
| 2015/0024804 | A1 | 1/2015 | Davis |
| 2015/0062017 | A1 | 3/2015 | Barabas et al. |
| 2015/0139058 | A1 | 5/2015 | Xia |
| 2015/0207708 | A1 | 7/2015 | Raleigh |
| 2015/0271102 | A1 | 9/2015 | Antich |
| 2015/0339912 | A1 | 11/2015 | Farrand |
| 2016/0021238 | A1* | 1/2016 | Abramson ............ H04W 12/08 455/418 |
| 2016/0094563 | A1 | 3/2016 | Arsanjani et al. |
| 2016/0094707 | A1* | 3/2016 | Stuntebeck ......... H04W 64/006 455/418 |
| 2016/0121817 | A1 | 5/2016 | Liu |
| 2016/0209018 | A1 | 7/2016 | Johnson |
| 2016/0301808 | A1 | 10/2016 | Choi |
| 2016/0309018 | A1 | 10/2016 | Tibbitts |
| 2016/0335038 | A1 | 11/2016 | Choi |
| 2016/0364665 | A1 | 12/2016 | Hurst |
| 2017/0291611 | A1* | 10/2017 | Innes ................... G07C 5/0841 |
| 2017/0302006 | A1 | 10/2017 | Lavin |
| 2017/0339636 | A1 | 11/2017 | Buck et al. |

\* cited by examiner

SYSTEMS, METHODS, AND DEVICES FOR ENFORCING DO NOT DISTURB FUNCTIONALITY ON MOBILE DEVICES

CROSS REFERENCE TO RELATED APPLICATIONS

This application is a Continuation of U.S. patent application Ser. No. 16/041,053, filed Jul. 20, 2018, which claims the benefit of priority under 35 U.S.C. § 119(e) to U.S. Provisional Patent Application No. 62/553,993, filed Sep. 4, 2017, and to U.S. Provisional Patent Application No. 62/545,443, filed Aug. 14, 2017. The disclosures set forth in the referenced applications are incorporated herein by reference in their entireties.

Additionally, all of the below-referenced patents and applications are hereby incorporated by reference, in their entirety, as if set forth in full herein: (i) U.S. patent application Ser. No. 15/673,398, entitled "Detecting Mobile Devices Within a Vehicle Based on Cellular Data Detected Within the Vehicle," filed Aug. 9, 2017, (ii) U.S. Prov. Pat. Appl. No. 62/372,300, entitled "Detecting Mobile Devices Within a Vehicle Based on Cellular Data Detected Within the Vehicle," filed Aug. 9, 2016, (iii) U.S. patent application Ser. No. 15/629,710, entitled "Managing iOS-Based Mobile Communication Devices by Creative Use of CallKit API Protocols," filed Jun. 21, 2017, (iv) U.S. Prov. Pat. Appl. No. 62/353,015, entitled "Managing iOS-Based Mobile Communication Devices by Creative Use of CallKit API Protocols," filed Jun. 21, 2016, (v) U.S. patent application Ser. No. 15/191,353, entitled "Managing Functions on an iOS-Based Mobile Device Using ANCS Notifications," filed Jun. 23, 2016, (vi) U.S. Prov. Pat. Appl. No. 62/183,452, entitled "Managing iOS-Based Mobile Communication Devices in Vehicles by Creative Use of ANCS Notifications," filed Jun. 23, 2015, (vii) U.S. Pat. No. 9,398,421, entitled "Preventing Access to Functions on a Mobile Device in Response to an External OS-Level Command," issued Jul. 19, 2016, (viii) U.S. Pat. No. 9,338,605, entitled "Driver Identification and Data Collection Systems for Use with Mobile Communication Devices in Vehicles," issued May 10, 2016, (ix) U.S. Prov. Pat. Appl. No. 61/936,152, entitled "Managing Use of Mobile Communication Devices by Drivers in Vehicles," filed Feb. 5, 2014; (x) U.S. Prov. Pat. Appl. No. 61/892,406, entitled "Improved Systems, Methods, and Devices for Controlling, Monitoring, and Managing Use of Mobile Communication Devices in Vehicles and Other Controlled Environments or Settings," filed Oct. 17, 2013; and (xi) U.S. Prov. Pat. Appl. No. 61/821,019, entitled "Systems, Methods, and Devices for Controlling, Monitoring, and Managing Use of Mobile Communication Devices in Vehicles and Other Controlled Environments or Settings," filed May 8, 2013.

FIELD

The systems, methods, and devices described herein relate generally to managing mobile communication devices within a vehicle and, more particularly, to enforcing and preventing by-passing of blocking functions on a mobile communication device.

BACKGROUND

Use of mobile computing and communication devices (i.e., "mobile devices") in vehicles is a hotly debated topic. While use of mobile devices provides convenience and can significantly enhance worker availability, connectivity, and productivity, it has also been shown that reckless use of mobile devices in moving vehicles has a detrimental effect and impact on the ability of a driver/operator (hereinafter referred to, for convenience, as the "driver") of the vehicle to focus on driving or otherwise operating the vehicle. In fact, some studies have indicated that distracted driving may be even more dangerous than driving while intoxicated or under the influence of drugs.

The number of vehicular accidents attributed to driver inattentiveness or distraction while talking, texting, surfing, browsing, or otherwise interacting with or using a mobile device within a vehicle, rather than focusing full attention on driving or operating the vehicle, continues to increase. Numerous cities, counties, states, and even the Federal government have imposed or are considering legal restrictions on use of (or that imposed increased sanctions, penalties, or punishments for accidents that occur due to use of) such mobile devices by a driver of a vehicle. As the functionality and capabilities of mobile devices continues to improve and expand, however, the potential distractions posed by mobile devices to drivers of vehicles is only likely to increase even more—leading to further accidents, higher risks to drivers, passengers, and any third parties near such vehicles, higher insurance rates, and more litigation.

Although laws may be passed, company policies may be adopted, and insurance policies may be tailored to provide lower insurance rates (deductibles and/or premiums) for drivers who do not use their mobile device while they are actively operating a vehicle, the options and ability for physically or technologically controlling, managing, limiting, monitoring, and auditing use of mobile devices, particularly in real time and based on other factors and variables (such as whether the vehicle is on and/or moving, how fast it is moving, what time of day it is, what day of the week it is, where the vehicle is located, and the like) has been limited, to date.

For these reasons, there remains a need in the industry for improved systems, methods, and devices that use computer-implemented, configurable policies to block, control, manage, limit, monitor, and/or audit use of mobile devices in vehicles and, particularly, use of such mobile devices by drivers of vehicles.

In addition to minimizing distracted driving, there remains a significant need to be able to identify, accurately and in a cost-effective and efficient manner, who is driving a vehicle at any given time, based on location of the driver's mobile device within the vehicle. Being able to detect one or more mobile devices in a vehicle provides some valuable data in this regard, especially if there is only one mobile device in the vehicle when it is being driven and especially if that mobile device is designated as the primary mobile associated with the primary driver of that vehicle. If there is more than one mobile device in a vehicle, being able to determine which mobile device is in, near, or closest to the driver quadrant or space within the vehicle provides even more valuable data.

For example, accurately identifying the driver versus the passenger in a vehicle helps to eliminate the inadvertent blocking or limiting of functionality of the passenger's mobile device, which is generally unnecessary to reduce distracted driving. In addition, accurately identifying the driver of a vehicle, based on their mobile device, enables important data to be collected about the vehicle, about the driver's driving patterns over time, and about the driver's activities and driving actions during a specific driving event. In addition, being able to store and upload relevant driver and vehicle data to a driver's mobile device presents significant business opportunities and can be used for many different purposes.

Yet further, it will be appreciated by those of skill in the art that APPLE®-branded mobile communication devices often trail ANDROID®-branded mobile communication devices in availability of third party applications (or apps) due to Apple Inc.'s tighter control of permissions associated with apps installed thereon. Thus, there is a need for being able to provide mobile device control features and distracted driving functionality, which are more easily implemented or only available on an ANDROID®-branded mobile communication device, on an APPLE®-branded mobile communication device.

The above needs and features, as well as additional aspects and business applications, are disclosed herein and will become readily apparent to one of ordinary skill in the art after reading and studying the following summary of the present inventions, the detailed description of preferred embodiments, and the claims included hereinafter. The present inventions meet one or more of the above-referenced needs as described herein in greater detail.

SUMMARY

The present inventions described herein relate generally to systems, methods, and devices for monitoring, managing, controlling, and making effective use of mobile communication devices within a vehicle and, more particularly, to accurately identifying vehicular drivers, collecting vehicular status and driving data, and interfacing with one or more mobile communication devices within the vehicle regarding the same. Briefly described, aspects of the present invention include the following.

In a first aspect of the present invention, a system for determining the location of a mobile device within a vehicle, includes (a) a controller located within the vehicle and configured to transmit at least two audio signals, a first audio signal directed generally into a driver space within the vehicle and a second audio signal directed generally into a passenger space within the vehicle, and (b) software code stored in memory of the mobile device and having instructions executable by the processor that performs the steps of: (i) detecting the at least two audio signals, (ii) sampling the at least two audio signals for a predetermined period of time; (iii) performing digital signal processing on the sampled at least two audio signals; and (iv) based on the results of the digital signal processing, determining whether the mobile device was located within the driver space of the vehicle during the predetermined period of time.

In a feature, the controller is mounted within the vehicle in proximity to a central axis of the vehicle, the central axis extending generally between the driver space and the passenger space within the vehicle. In some embodiments, the controller is mounted on the inside surface of the front windshield of the vehicle. In other embodiments, the controller is built into the vehicle.

In another feature, the controller includes a built-in speaker system for transmitting the at least two audio signals. In some embodiments, the built-in speaker system includes a first speaker configured to transmit the first audio signal generally into the driver space within the vehicle and a second speaker configured to transmit the second audio signal generally into the passenger space within the vehicle.

In yet another feature, the controller is in electronic communication with an audio system of the vehicle that has at least two speakers. Preferably, the first audio signal is output through one of the speakers positioned near the driver space within the vehicle and the second audio signal is output through another speaker positioned near the passenger space within the vehicle.

Preferably, each of the at least two audio signals are transmitted at a frequency above 19 kHz, which is above the audible level that can be heard by most humans. In other embodiments, the at least two audio signals (or one or more tones that are included in the audio signals some or all of the time) can be transmitted at a frequency that is audible to humans.

In some embodiments, the at least two audio signals are transmitted simultaneously. In other embodiments, the at least two audio signals are transmitted repeatedly in sequence, with each transmission or broadcast lasting for a first predetermined duration. Preferably, there is a period of silence (or no broadcast of an audio signal) lasting a second predetermined duration between each audio signal transmission. The first and second predetermined durations can be the same or different periods of time.

In a feature, the first audio signal includes a first plurality of tones, each having its own frequency, which are all transmitted simultaneously. Preferably, the second audio signal also includes its own plurality of tones, each having its own frequency, which are all transmitted simultaneously. Preferably, the frequencies used for the tones of the first audio signal are different from the frequencies used for the tones of the second audio signal.

In yet a further feature, the instructions executable by the processor performs the additional steps of: filtering the sampled at least two audio signals and performing digital signal processing on the filtered at least two audio signals. In another feature, the instructions executable by the processor performs the additional steps of: calculating a baseline sound level from the sampled at least two audio signals, identifying each audio spike from the sampled at least two audio signals that exceeds the calculated baseline, applying Goetzel analysis on each identified audio spike, and initially determining whether the mobile device is in the driver space or the passenger space based on the application of the Goeztel analysis. In a further feature, the step of detecting the at least two audio signals is performed by a microphone of the mobile device within the vehicle. In another feature, the step of sampling the at least two audio signals is performed at a sampling rate that is at least twice the maximum frequency of the highest frequency of the first and second audio signals.

In another feature, a determination that the mobile device was located within the driver space of the vehicle during the predetermined period of time indicates the user of the mobile device was the driver of the vehicle during the predetermined period of time. In another feature, a determination that there is only one mobile device within the vehicle, regardless of whether the mobile device is in the driver or passenger space of the vehicle, indicates that the user of the mobile device was the driver of the vehicle during the predetermined period of time In another feature, even if a determination is made that the mobile device was not located within the driver space of the vehicle during the predetermined period of time, the instructions executable by the processor performs the additional steps of determining whether the mobile device was oriented in a potentially "circumventing" manner, such that the mobile device was still usable or viewable by the driver of the vehicle despite being in the passenger space of the vehicle.

In a further feature, distracted driving prevention software blocks, controls, manages, and/or limits use of the mobile device when the mobile device is located in the driver space. Alternatively, distracted driving prevention software blocks or limits use of the mobile device even when the mobile device is located in the passenger space if the mobile device is determined to be oriented in a potentially "circumventing" manner.

Preferably, such distracted driving prevention software uses default or customized rules-based policies to determine what functionality of the mobile device is affected, when such functionality of the mobile device is affected, and how such functionality of the mobile device is affected. In some embodiments, such distracted driving prevention software causes the mobile device to be powered off, causes a blocking screen to be displayed which prevents other applications or functions of the mobile device to be accessed, or causes the controller to send one or more HID or similar signals back to the mobile device, which prevents unauthorized applications or functions of the mobile device to be used by the driver of the vehicle while the vehicle is being operated.

In a further feature, data collection software on the mobile device captures and collects relevant data about the vehicle and about the driver of the vehicle whenever the vehicle is in operation. Such data is collected and, preferably, time-stamped so that relevant data about the vehicle and about the driver of the vehicle can be matched to use of the vehicle over time. In a feature, such data may be uploaded to a system server for further processing, display, or use.

In another feature, software installed on the mobile device or associated with the system server uses the time-stamped, relevant data about the vehicle and about the driver of the vehicle to reward driving behavior, to maintain driver logging electronic records, to provide or help implement usage based insurance (UBI) scoring or policies, to capture valuable telemetric data, to detect accidents in real-time, to reconstruct use and actions associated with the vehicle during an accident or commission of a crime, to improve insurance claim processing, and to prevent or minimize insurance fraud prevention.

In yet another feature, software installed on the mobile device or associated with the system server uses the time-stamped, relevant data about the vehicle and about the driver of the vehicle to communicate with the vehicle to make "smart pairing" technologies used by the vehicle more efficient and accurate.

In a second aspect of the present invention, a device for collecting and transmitting operational data about a vehicle to a mobile device located within the vehicle includes (a) a housing mounted to the vehicle, and (b) a power supply contained within the housing and adapted to provide power to electronic components contained within the housing. Preferably, the electronic components include: (i) a microprocessor, (ii) memory in electronic communication with the microprocessor and configured to store the operational data, (iii) an accelerometer for detecting movement of the vehicle, the detected movement being converted by the microprocessor into an acceleration value stored as one of the operational data in the memory, and (iv) a data transmission module, controlled by the microprocessor and configured to retrieve the operational data from the memory and to transmit the retrieved operational data to the mobile device.

In a feature, the housing is mounted within the vehicle in proximity to a central axis of the vehicle, the central axis extending generally between a driver space and a front passenger space within the vehicle. In one embodiment, the housing is mounted on the inside surface of the front windshield of the vehicle. In another embodiment, the housing is permanently built or installed into the vehicle by the vehicle manufacturer by an after-market vendor.

Preferably, the power supply includes a solar panel, which is the primary source of energy used by the power supply. Optionally, the power supply includes a battery as the primary or back-up energy used by the power supply. Preferably, such battery is rechargeable. In another option, the power supply can be connected to the battery of the vehicle. Such connection can be hard-wired to the vehicle battery or connectable through a lighter plug or socket. Such power can be provided to the device through a conventional power supply connector or through a USB port.

In another feature, the electronic components further include a GPS module for detecting geographic location and speed of the vehicle. Such geographic location data or values and such speed data or values are preferably stored as operational data in the memory of the device.

Preferably, the data transmission module transmits or broadcasts the operational data about the vehicle using classic Bluetooth protocol. In one embodiment, the data transmission module makes a Bluetooth pairing with the mobile device. In another embodiment, the data transmission module broadcasts the operational data about the vehicle without making a Bluetooth pairing with the mobile device. Preferably, the operational data about the vehicle is broadcast in at least one field of the device name (e.g., "Friendly Name") of the data transmission module. In another feature, the operational data about the vehicle is broadcast in a plurality of device names associated with the data transmission module, wherein each of the plurality of device names includes at least one field containing the operational data. In some embodiments, the device name of the data transmission module is received by at least one other mobile device within the vehicle.

In another preferred embodiment, the data transmission module transmits the operational data about the vehicle using Bluetooth low energy (BTLE) protocol. Alternatively, the data transmission module transmits the operational data about the vehicle using WiFi protocols.

In a third aspect of the present invention, a system for preventing access to a prohibited function on a mobile device when the mobile device is in a vehicle, the mobile device having an operating system (OS) installed thereon, comprises: a control device installed within the vehicle; a software application installed and running in memory resident on the mobile device; wherein, after the software application establishes a connection with the control device, if a prohibited function is active or attempting to become active on the mobile device, the software application causes the mobile device to transmit a notification signal to the control device; wherein, in response to receipt of the notification signal from the mobile device, the control device transmits an OS-level command back to the mobile device; and wherein, in response to receipt of the OS-level command from the control device, the operating system of the mobile device prevents access to the prohibited function without any direct interference or interruption of the prohibited function by the software application installed on the mobile device.

In a feature, the OS-level command is transmitted using a human interface device (HID) protocol. Preferably, the OS-level command is interpreted by the operating system of the mobile device as one or more key press signals from a remote keyboard. For example, the one or more key press signals represent pressing of one or more home keys, power keys, or a combination of home and power keys. In one embodiment, in response to receipt of the one or more key press signals, the operating system of the mobile device powers off the mobile device. In another embodiment, when the prohibited function is active or attempting to become active in a foreground window of the display of the mobile device, in response to receipt of the one or more key press signals, the operating system of the mobile device closes or minimizes the foreground window of the mobile device. In yet a further embodiment, in response to receipt of the one or more key press signals, the operating system of the mobile device causes the mobile device to go to a locked screen status.

In another feature, the software application is a distracted driving application configured to prevent a user of the mobile device from accessing prohibited functions on the mobile device when the user of the mobile device is driving the vehicle.

In yet another feature, the control device and the mobile device are separate and distinct devices.

Preferably, the software application establishes a connection with the control device when the mobile device is in a powered-on state and when the mobile device is in the vehicle in which the control device is installed.

In a feature, the notification signal transmitted by the software application identifies what type of OS-level command the control device should transmit back to the mobile device.

In another feature, the software application determines whether a function on the mobile device that is active or attempting to become active is prohibited. In some embodiments, the software application determines whether the function on the mobile device is prohibited based on a rules-based policy associated with the mobile device.

In another feature, the notification signal is transmitted from the mobile device to the control device using a wired connection, a WiFi wireless connection, or a Bluetooth wireless connection.

In yet a further feature, in response to receipt of the notification signal from the mobile device, the control device periodically re-transmits the OS-level command back to the mobile device for a predetermined period of time.

In a fourth aspect of the present invention, a system for preventing access to functions of a mobile device when the mobile device is in a vehicle comprises: a control device installed within the vehicle, the controlled device configured to determine when the vehicle is moving above a threshold speed; an operating system (OS) installed and operating on the mobile device, the operating system enabling the mobile device to receive OS-level commands transmitted by the control device using a human interface device (HID) protocol; wherein, after the control device determines that the vehicle is moving above the threshold speed, the control device periodically transmits an OS-level command to the mobile device using the HID protocol as long as the vehicle is moving above the threshold speed; and wherein, in response to receipt of the OS-level command from the control device, the operating system of the mobile device prevents access to the functions on the mobile device.

In a feature, the OS-level command is interpreted by the operating system of the mobile device as one or more key press signals from a remote keyboard. Preferably, the one or more key press signals represent pressing of one or more home keys, power keys, or a combination of home and power keys. In one embodiment, in response to receipt of the one or more key press signals, the operating system of the mobile device powers off the mobile device. In another embodiment, in response to receipt of the one or more key press signals, the operating system of the mobile device closes or minimizes a foreground window of the display of the mobile device. In a further embodiment, in response to receipt of the one or more key press signals, the operating system of the mobile device causes the mobile device to go to a locked screen status.

In a fifth aspect of the present invention, a system for managing predetermined functions on a mobile device within a moving vehicle, the mobile device having an operating system (OS) installed thereon, the OS including an event application programming interface (API) configured for two-way communication with an external electronic device, comprises: (a) a control device installed within the vehicle, the control device acting as the external electronic device and configured for two-way communication with the mobile device; (b) a software application installed and running in memory resident on the mobile device; (c) wherein, in response to initiation of one of the predetermined functions on the mobile device, the event API causes the mobile device to transmit a notification message to the control device; (d) wherein, in response to receipt of the notification message from the mobile device, the control device transmits to the software application information about said one of the predetermined functions obtained from the notification message; (e) wherein, in response to receipt of the information about said one of the predetermined functions obtained from the control device, the software application determines and transmits a desired action to be taken by the mobile device with respect to said one of the predetermined functions; and (f) wherein, in response to receipt of the desired action from the software application, the control device transmits to the event API an action message, the action message causing the event API to take the desired action with respect to said one of the predetermined functions, wherein the desired action occurs on the mobile device without any direct interference or interruption of said one of the predetermined functions by the software application installed on the mobile device.

Preferably, the two-way communications between the external electronic device and the event API uses Bluetooth low energy (BTLE) protocols.

In a feature, the predetermined functions on the mobile device include one or more of: a mobile call, a VoIP call, a video call, an SMS text message, an instant messaging message, an email message, a push-to-talk communication, taking of a photo or video, accessing a photo or video, accessing a mobile application, accessing the Internet, and receiving or displaying an application notification.

In another feature, in response to receipt of the notification message from the mobile device, the control device requests additional information regarding the predetermined function from the mobile device. Preferably, in response to receipt of the request for additional information regarding the predetermined function, the event API causes the mobile device to transmit one or more additional notification messages to the control device to provide the additional information requested.

In yet a further feature, initiation of one of the predetermined functions is determined when one of the predetermined functions is active or attempting to become active in a foreground window of a display screen of the mobile device.

In a feature, the software application determines the desired action to be taken by the mobile device with respect to said one of the predetermined functions based on a rules-based policy. Preferably, the rules-based policy includes rules for one or more of the following: preventing outgoing calls from the mobile device, preventing incoming calls from being received by the mobile device, causing an automated message to be transmitted in response to an incoming call, incoming text message, or incoming email, preventing the mobile device from accessing phone functions, text functions, or email functions on the mobile device, disabling an interface of the mobile device, removing application notifications displayed on a display screen of the mobile device, disabling application notifications from being displayed on the display screen of the mobile device, causing a pre-defined message to display on the interface of the mobile device, interfering with email functions of the mobile device, interfering with texting functions of the mobile device, interfering with chat functions of the mobile device, interfering with push-to-talk functions of the mobile device, defining a PIN or password that must be entered into the mobile device to override the rules-based policy, preventing deletion or modification of the rules-based policy, preventing deletion or modification of the software application, and identifying exceptions to the rules-based policy.

In another feature, in response to receipt of the notification message from the mobile device, the control device further transmits to the software application an indication of vehicle state data regarding the vehicle. Preferably, the vehicle state data includes one or more of the following current or historical characteristics associated with the vehicle: speed, speed range, average speed, vehicle engine status, vehicle gear status, engine rpm, fuel efficiency, vehicle identification number, miles driven over a defined period of time, idle time, braking events, acceleration events, vehicle component diagnostics, and engine diagnostics. In addition, the software application preferably determines the desired action to be taken by the mobile device with respect to said one of the predetermined functions based on a rules-based policy, wherein the rules-based policy includes rules associated with said one of the predetermined functions and with the vehicle state data.

In a further feature, the action message transmitted by the control device to the event API enables said one of the predetermined functions to occur without interference. Alternatively, the action message transmitted by the control device to the event API enables said one of the predetermined functions to occur but with partial interference. In another alternative, the action message transmitted by the control device to the event API prevents or terminates said one of the predetermined functions.

In another feature, the control device and the mobile device are paired using a Bluetooth protocol.

In yet another feature, the mobile device receives a request to disable a blocking of a user interaction with one or more functions of the mobile device. The mobile device prompts a capture of an image by a camera of the mobile device. The mobile device determines whether the image is captured from a passenger space in the vehicle. Once so determined, the mobile device disables the blocking of the user interaction.

The present inventions also encompasses computer-readable medium having computer-executable instructions for performing methods of the present invention, and computer networks and other systems that implement the methods of the present invention.

The above features as well as additional features and aspects of the present invention are disclosed herein and will become apparent from the following description of preferred embodiments of the present invention.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In addition, further features and benefits of the present technology will be apparent from a detailed description of preferred embodiments thereof taken in conjunction with the following drawings, wherein similar elements are referred to with similar reference numbers, and wherein.

DETAILED DESCRIPTION OF PREFERRED EMBODIMENTS

Figure 1:
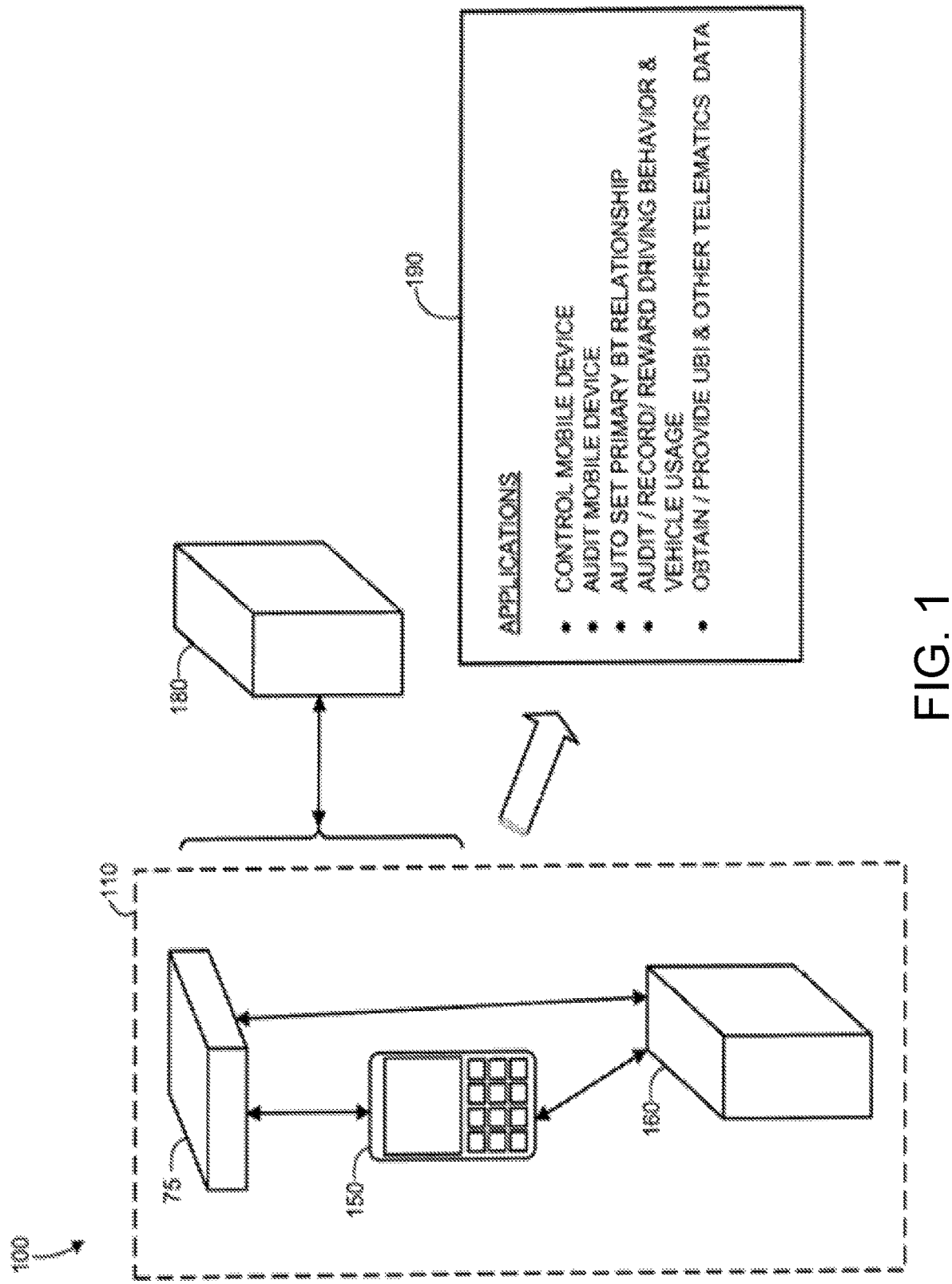
FIG. 1 is a high level system view of one embodiment of the present invention.

Before the present technologies, systems, products, articles of manufacture, apparatuses, and methods are disclosed and described in greater detail hereinafter, it is to be understood that the present technologies, systems, products, articles of manufacture, apparatuses, and methods are not limited to particular arrangements, specific components, or particular implementations. It is also to be understood that the terminology used herein is for the purpose of describing particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described event or circumstance may or may not occur, and the description includes instances in which the event or circumstance occurs and instances where it does not.

Throughout the description and claims of this specification, the word "comprise" and variations of the word, such as "comprising" and "comprises," mean "including but not limited to," and is not intended to exclude, for example, other components, integers, elements, features, or steps. "Exemplary" means "an example of" and is not necessarily intended to convey an indication of preferred or ideal embodiments. "Such as" is not used in a restrictive sense, but for explanatory purposes only.

Disclosed herein are components that can be used to perform the herein described technologies, systems, products, articles of manufacture, apparatuses, and methods. These and other components are disclosed herein, and it is understood that when combinations, subsets, interactions, groups, etc. of these components are disclosed that while specific reference to each various individual and collective combinations and permutation of these may not be explicitly disclosed, each is specifically contemplated and described herein, for all technologies, systems, products, articles of manufacture, apparatuses, and methods. This applies to all aspects of this specification including, but not limited to, steps in disclosed methods. Thus, if there are a variety of additional steps that can be performed, it is understood that each of the additional steps can be performed with any specific embodiment or combination of embodiments of the disclosed technologies, systems, products, articles of manufacture, apparatuses, and methods.

As will be appreciated by one skilled in the art, embodiments of the present technologies, systems, products, articles of manufacture, apparatuses, and methods may be described below with reference to block diagrams and flowchart illustrations of methods, systems, processes, steps, and apparatuses. It will be understood that each block of the block diagrams and flow illustrations, respectively, support combinations of means for performing the specified functions and/or combinations of steps for performing the specified functions.

The exemplary systems, methods, and devices described herein relate generally to monitoring, managing, controlling, and making effective use of mobile communication devices within a vehicle and, more particularly, to accurately identifying vehicular drivers, collecting vehicular status and driving data, and interfacing with one or more mobile communication devices within the vehicle regarding the same.

The present application incorporates herein by reference in their entirety the following: (a) U.S. Pat. No. 8,527,013, entitled "Systems, Methods, and Devices for Policy-Based Control and Monitoring of Use of Mobile Devices by Vehicle Operators," issued Sep. 3, 2013; (b) PCT Int'l Pat. Appl. No. US2010/034151, filed May 8, 2010; and (c) each application from which the above two applications claim priority benefit, including U.S. Prov. Pat. Appl. No. 61/176,640, entitled "System for Policy-Based Mobile Communications in Vehicles," filed May 8, 2009; U.S. Prov. Pat. Appl. No. 61/247,334, entitled "Improved System for Policy-Based Mobile Communications in Vehicles," filed Sep. 30, 2009; and U.S. Prov. Pat. Appl. No. 61/301,902, entitled "Further Improved System for Policy-Based Mobile Communications in Vehicles," filed Feb. 5, 2010.

As used herein, the term "vehicle" is intended to include automobiles, trucks, motorcycles, buses, planes, helicopters, blimps, balloons, gliders, boats, ferries, trains, trams, heavy equipment or machinery, and any type of apparatus, equipment, or other machine that is driven, operated, or controlled by a user (i.e., "driver") and that is susceptible to accident or injury to self or others if the driver is careless or not devoting full attention to operation of the vehicle.

As used herein, the term "mobile device" is intended to include and encompass, but not be limited to, any type of hand-held, portable, mountable, wearable, or similar computing or communication device that is usable within a vehicle, such as but not limited to cell phones, mobile phones, smart phones, push-to-talk devices, personal digital assistants (PDAs), text or email dedicated devices, general computers, laptops, electronic maps or other GPS location devices, vehicle dashboard screens, electronic reading devices, multimedia equipment, data tablets, electronic eyewear, wearable sensory or sensory-enhancement equipment, and any other computing or communication device that would or could be used by or accessible to the driver of a vehicle while it is moving or otherwise in operation and that could contribute to driver inattentiveness or otherwise interfere with the driver's ability to focus full attention on driving or operating the vehicle because of the talking, texting, surfing, browsing, viewing, or other interactive functionality of such device.

System Overview

As will be described hereinafter, the exemplary systems, methods, and devices include a main controller or control device that can be mounted, installed, or built into a vehicle. Preferably, such control device is designed to perform at least two primary functions. One primary function includes the ability to transmit or broadcast at least two different audio signals that can be detected by and then used by one or more mobile devices within the vehicle to enable such mobile devices to determine where they are located within the vehicle, such as in the driver quadrant or in a passenger (or non-driver) quadrant or space in the vehicle. In an alternative embodiment, the first primary function of the control device is to interface with the sound system of the vehicle itself to cause desired audio signals to be produced by the speakers of the sound system of the vehicle, which signals can then be detected and used by the one or more mobile devices to determine where the mobile devices are located within the vehicle.

A second primary function of the control device is the ability to transmit or broadcast vehicular status data. Such data transmissions are intended to be detected and received by one or more mobile devices within the vehicle and, in some embodiments, by the vehicle itself or by software applications being run on or by the vehicle. Preferably, the vehicular status data includes information that can be determined or detected by the control device itself, such as motion/acceleration/deceleration of the vehicle, speed of the vehicle, location of the vehicle, cabin temperature within the vehicle, sound or ambient noise within the cabin of the vehicle at any point in time. Preferably, such vehicular status data can be transmitted or broadcast by the control device to any receiving devices or applications within range using classic Bluetooth (BT) communication protocols and/or Bluetooth Low Energy (BTLE) communication protocols. Other data transmission protocols, such as WiFi, could also be used in alternative embodiments. Preferably, such vehicular status data is transmitted in real time on a periodic basis whenever the vehicle is being operated and whenever there is at least one receptive device or application located within the vehicle; however, in some embodiments or circumstances when there is not at least one receptive device or application located within the vehicle, such vehicular status data may be transmitted in bulk or in non-real time scenarios at a later time, when such receptive device or application does become available.

Additional or optional functions of the control device include storing vehicular status data in memory, communicating directly or indirectly with the on-board computer of the vehicle to obtain additional vehicle data generally available from the on-board computer, exchanging data or engaging in bi-directional communications with one or more mobile devices within the vehicle, exchanging data or engaging in bi-directional communications with the vehicle itself or with one or more applications being run by or within the vehicle, and exchanging data or engaging in bi-directional communications with at least one system server.

As will also be described hereinafter, the exemplary systems, methods, and devices include at least one application or software component embedded or downloaded onto one or more mobile devices used in a vehicle that are configured to handle and make use of the audio signals transmitted or broadcast by the control device. Such application or software component is preferably designed to process the at least two (or more) different audio signals that are transmitted by the control device directly or that the control device causes to be transmitted over the vehicle sound system. Using audio detection, sampling, filtering, digital signal processing, and other audio processing techniques and analysis, this first application enables each mobile device to determine the approximate location of such mobile device within the vehicle (i.e., whether or not such mobile device is located within the driver space or quadrant of the vehicle). In preferred embodiments, the first application is also able to determine when such mobile device is not within the driver space or quadrant of the vehicle but is positioned or oriented in a manner that it can still be used, viewed, or accessed by the driver in such a way that it could still be viewable by or accessible to the driver, which can be important, for example, in preventing the driver from trying to circumvent or avoid distracted driving blocking software that permits usage of mobile devices by passengers but not by drivers of vehicles.

The exemplary systems, methods, and devices also include at least a second application or software component embedded or downloaded onto one or more mobile devices used in a vehicle that are configured to receive the vehicular status data transmitted or broadcast from the control device and then to respond accordingly—based primarily upon the specific purpose of this second application or software component. As will be appreciated by those of skill in the art, such application or software component may also be embedded or downloaded into a computer system associated with the vehicle itself, such as the on-board computer, a main console computer, a head-rest processor/controller, and the like.

For example, such applications include but are not limited to: (i) controlling or limiting use of the mobile device when the vehicle is being operated (e.g. to prevent or minimize distracted driving caused by use of the mobile device within the vehicle)—such applications are preferably managed by rules-based policies that may only prohibit use of mobile devices by drivers of the vehicle or that may prohibit use of all mobile devices in the vehicle—whether used by the driver or a passenger, (ii) auditing, monitoring, and detecting use of the mobile device when the mobile device is in the vehicle or when the vehicle is being operated—such applications are similar to the distracted driving prevention applications, but instead of preventing or restricting use of the mobile device, their primary purpose is merely to capture and record such use, determine and log who is driving the vehicle at any given time based on use of the mobile device in the driver quadrant, and the like, (iii) controlling or managing functions of the vehicle for the convenience of the driver of the vehicle, such as implementing driver seat settings, mirror settings, steering wheel settings, radio settings, customized settings associated with on-vehicle applications (maps, display screen, user controls, and the like), and other driver preferences, based on detection of one or more mobile devices in or near the driver quadrant or space in the vehicle and assuming that the person associated with the detected one or more mobile devices is the current driver of the vehicle, and (iv) auditing or collecting data regarding driving behavior and vehicle usage, which can then be used to reward driving behavior, to provide or help implement usage based insurance (UBI) scoring or policies, to capture valuable telemetric data, and to capture other relevant information associated with the driver and with the vehicle that may be useful for accident detection, accident reconstruction, insurance claim handling, and insurance fraud prevention. Additionally, in many situations, the second application or software component will also make use of the location information determined by the first application or software component to determine whether the one or more mobile devices are in the driver quadrant and, correspondingly, determining who the driver of the vehicle is at any given period of time.

For example, the second application or software component can be configured to block or limit specific functionality of the mobile device to reduce the risk of distracted driving, but only when the device is in the driver space or quadrant. Such policy-based software applications can be used to block, control, manage, and/or limit use of the functionality of such mobile devices. Advantageously, such policy-based software applications may be adapted to use data provided by or obtained from the control device, from the vehicle's on board computer or similar vehicle components or systems, alone or in conjunction with other available external data or information (such as GPS location data, time of day, day of week, type of activity or communication attempted on the mobile device, and the like) more effectively to block, control, manage, and/or limit use of the functionality of such mobile devices.

In another example, the second application or software component can be used advantageously to monitor, audit, and record use of one or more mobile devices in a vehicle, even if actual functionality of the mobile device is not blocked, controlled, limited, or prevented by the system or policy. In some embodiments, all functions on one mobile device (e.g., cell phone) of the driver may be blocked entirely, while specific functions of another mobile device (e.g., a "smart" watch or a Google-glass-type of wearable items), may be allowed to the driver, for example, such as a vibration notification on the "smart watch" when the vehicle exceeds the speed limit of the road on which the vehicle is travelling or displaying of a map on a Google-glass-type of wearable items.

In a further example, the second application or software component can be used to capture relevant data and information about the vehicle when a mobile device is in or in close proximity to the vehicle—even if use of the mobile device is not blocked, controlled, limited, or prevented by the system or policy. Such systems, methods, and devices disclosed herein are also configurable to detect, monitor, and report on vehicle usage patterns, including period of excessive speeding or idle time.

In another example, the first and second applications or software components can be used, in combination, to determine which one or more mobile devices are in the driver quadrant of the vehicle, which can then be used to determine who is likely driving the vehicle—based on the assumption that the owner of the one or more mobile devices in or near the driver quadrant of the vehicle (or the owner of the only mobile device(s) in the vehicle at that time) is most likely to be the current driver of the vehicle at that time, which could then be used for usage based insurance (UBI) scoring, rewards programs, electronic driver logging, confirmation of who is driving during an accident or commission of a crime, and the like.

Being able to determine which one or more mobile devices are in the driver space of a vehicle could also be used advantageously by another example of the second application or software component, which can be used to make "smart pairing" technologies more efficient and accurate. Such software can reside on the mobile devices or in applications being run by the vehicle itself. For example, it is becoming more and more common for vehicles to be configured to adapt automatically to the person who is driving. Many aspects of the driving experience (such as which phone is currently connected to hands free, which address book is shared, which music is being streamed, seat adjustments, mirror adjustment, steering wheel settings, which applications run and are available on the vehicle's console display, and the settings of such applications running on the vehicle's console display, etc.) could be configured within the vehicle if it could be accurately determined who is driving the vehicle.

Currently, determining which mobile device is connected via Bluetooth to the driver's head unit or headrest is one rudimentary method used in making vehicle settings for the driver. Unfortunately, relying upon such Bluetooth connection is inexact and, at times, incorrect. For example, if two family members enter a vehicle today, only one of those mobile devices associated with the family members will actually connect to the head unit for music streaming, address book synching, hands free calling, and the like. Typically, the mobile device that has been previously designated as the "primary" device associated with the vehicle will prevail—even if such mobile device is not being carried by the current driver of the vehicle. There is, thus, an on-going need to be able to identify accurately who is driving the vehicle based on which one or more mobile devices are being carried by or are positioned near the current driver of the vehicle.

Using such technology, the driver's head unit or headrest can be configured to drop the connection to the "primary" mobile device associated with the vehicle when it has been determined that the primary mobile device is not located within the driver's space, but another one or more mobiles devices are. This would free up the connection for the mobile device(s) (and the customized vehicle settings) of the user who is actually sitting in the driver's seat—based on the actual mobile device(s) detected within the driver space. Head unit technology can take advantage of this smart pairing association without blindly relying upon which mobile device has been identified by the owner of the vehicle as the "primary" device associated with the vehicle. Thus, there is a need to be able to designate dynamically a specific mobile device that is in the driver space as the currently "active" or "primary" device and associate the vehicle settings to the user associated with that detected, specific mobile device.

Additional features, as described herein or as will be readily apparent to one of ordinary skill in the art, expand upon the capabilities of the core systems, methods, and devices described herein and are intended to improve the safe operation, manageability, portability, enforcement, and support of use of mobile devices by drivers of vehicles. Additional aspects and business applications, are disclosed herein and will also become readily apparent to one of ordinary skill in the art after reading and studying the summary of the present inventions, this detailed description of preferred embodiments, and the claims included hereinafter.

Turning now to FIG. 1, a high level overview of one exemplary system 100 of the present invention is illustrated. Preferably, the system 100 includes a main controller or control device 75 installed or mounted in a vehicle 110 (such vehicle being shown merely in the abstract using hashed lines). The control device 75 is intended to interact, as will be described in greater detail hereinafter, with at least one mobile device 150 located within the vehicle 110. As will also be described in greater detail hereinafter, the control device 75 and/or the at least one mobile device 150 are configured to communicate uni-directionally or bi-directionally with at least one system server 180 that is typically accessed over the cloud or through a cellular network communication. As will also be appreciated, the control device 75 and/or the one or more mobile devices 150 are configured to communicate uni-directionally or bi-directionally with a computer system 160 installed within the vehicle itself. Such computer system 160 associated with the vehicle itself would include, for example, the vehicle's on-board computer, a main console computer, a head-rest processor/controller, and the like.

In practice, the exemplary system 100 is useful for a wide variety of applications 190, such as (i) detecting where one or more mobile devices are located within the vehicle (e.g. determining whether the mobile device is in the driver's quadrant or space of the vehicle), (ii) controlling or limiting use of the one or more mobile devices when the vehicle is being operated (e.g. to prevent or minimize distracted driving caused by use of the mobile device within the vehicle), (iii) auditing, monitoring, and detecting use of the mobile device when the mobile device is in the vehicle or when the vehicle is being operated, (iv) controlling or managing functions of the vehicle, such as driver seat settings and driver preferences, based on detection of the mobile device in or near the driver's quadrant or space in the vehicle, and (v) auditing or collecting data regarding driving behavior and vehicle usage, which can then be used to reward driving behavior, to provide or help implement usage based insurance (UBI) scoring or policies, and to capture valuable telemetric data.

More specifically, the control device 75 is designed to perform at least two primary functions. First, in the preferred embodiment, the control device 75 is configured to transmit at least two different audio signals that can be detected and then used by one or more mobile devices to determine where such mobile devices are located within the vehicle. In an alternative embodiment, the control device 75 is configured to interface with the sound system of the vehicle itself to cause desired audio signals to be produced by one or more speakers of the sound system of the vehicle, which audio signals can then be detected and used by the one or more mobile devices to determine where such mobile devices are located within the vehicle. Second, the control device 75 is configured to transmit or broadcast vehicular status data. Such transmissions or broadcasts can be received and processed by mobile devices within the vehicle or by software system or applications being run by the vehicle itself. Preferably, the vehicular status data includes information that can be determined or detected by the control device itself, such as motion of the vehicle, speed of the vehicle, location of the vehicle, cabin temperature within the vehicle, sound or ambient noise within the cabin of the vehicle at any point in time.

Preferably, such vehicular status data can be transmitted or broadcast by the control device 75 using classic Bluetooth (BT) communication protocols or using Bluetooth Low Energy (BTLE) communication protocols. Specific details about such communication protocols are described in greater detail hereinafter. Preferably, such vehicular status data is transmitted in real time on a periodic basis; however, in some embodiments or circumstances, such vehicular status data may be transmitted in bulk or in non-real time scenarios.

Additional or optional functions of the control device 75 include storing vehicular status data in memory, communicating directly or indirectly with the on-board computer of the vehicle to obtain additional vehicle data, exchanging data or engaging in bi-directional communication with one or more mobile devices 150, and exchanging data or engaging in bi-directional communication with the at least one system server 180.

Preferably, the mobile device 150 makes use of two embedded or downloaded applications or software components, each designed to handle and make use of the data or communications made by the control device 75. First, one application or software component is preferably designed to process the two or more different audio signals that are transmitted by the control device 75 directly or that the control device causes to be transmitted over the vehicle sound system. Using audio detection, filtering, and digital processing techniques, this first application is able to determine the approximate location of each such mobile device within the vehicle (i.e., whether or not such mobile device is located within the driver space or quadrant of the vehicle). In preferred embodiments, the first application is also able to determine when the mobile device is not within the driver space or quadrant of the vehicle, but is positioned or oriented in a manner that it can still be used, viewed, or accessed by the driver in such a way that it could still distract the driver while driving. The second application or software component, whether being run on a mobile device or by the vehicle itself, is preferably designed to receive the vehicular status data from the control device 75 and then respond accordingly—based primarily upon the specific one or more applications 190 for which the system is intended to be used. Additionally, in many situations, the second application or software component will also make use of the mobile device location information (and driver identification) determined by the first application or software component. For example, the second application or software component can be configured to block or limit specific functionality of the mobile device to reduce the risk of distracted driving, but only when the device is in the driver space or quadrant.

Exemplary Control Device

Figure 2:
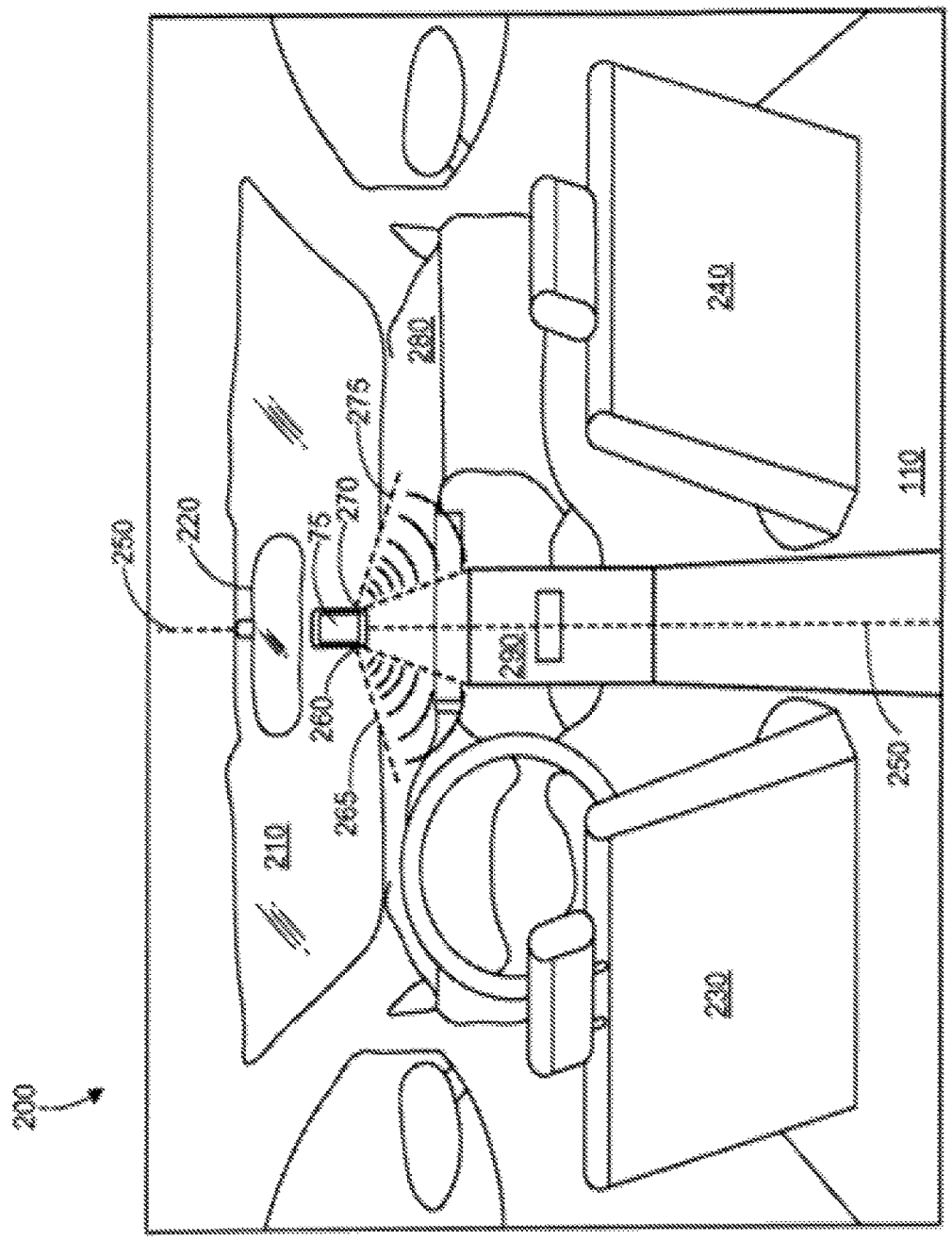
FIG. 2 is a perspective view illustrating a control device installed within a vehicle used with the embodiment of FIG. 1.

FIG. 2 illustrates a perspective view 200, from within a vehicle 110, in which an exemplary control device 75 is mounted conveniently on the interior surface of the windshield 210 of the vehicle 110, near the central rear view mirror 220 of the vehicle 110. This mounting location on the interior windshield 210, near the central rear view mirror 220, is convenient since it does not obstruct the visibility of the driver of the vehicle sitting in the driver's seat 230, since it can be installed in an after-market environment, and since it is strategically located along or near the central axis 250 of the vehicle 110 along an invisible dividing line between the driver's seat 230 and the front passenger's seat 240. Preferably, the control device 75 includes a first speaker 260 that is configured to transmit a first audio signal 265 aimed generally toward the driver space or quadrant of the vehicle. Preferably, the control device 75 includes a second speaker 270 that is configured to transmit a second audio signal 275 aimed generally toward the passenger space or quadrant of the vehicle.

Although the mounting location for the control device 75 shown in FIG. 2 is preferred, it will be appreciated by those of skill in the art that the control device 75 can be placed, mounted, or installed in different locations within the vehicle compartment. For example, the control device 75 can be placed anywhere along the central axis 250, such as lower on the windshield 210, on the dashboard 280, on the center console area 290, along the ceiling console area (not shown), or even on the back windshield (not shown), or the rear dashboard surface (also not shown). The exact location is not critical as long as one audio signal is aimed toward the driver space and the other audio signal is aimed toward the passenger space. As will be understood by those of skill in the art, the first application or software component installed on or used by the mobile device can be configured to work with control devices 75 positioned in front of or behind the driver's seat 230, as long as the configuration specifies which speaker 260, 270 and correspondingly which audio signal 265, 275 is aimed toward the driver space and which is aimed toward the passenger space. Likewise, the first application or software component can also be configured to work with the control device 75 that are used in countries or in vehicles in which the driver's seat and passenger's seat are on opposite sides of the vehicle (as compared to that shown in FIG. 2). Further, it will also be appreciated by those of skill in the art that the control device 75 does not have to be placed directly on the central axis 250 as long as the configuration of the first application or software component specifies which speaker 260, 270 and correspondingly which audio signal 265, 275 is aimed toward the driver space and which is aimed toward the passenger space.

In some embodiment, the control device 75 can make use of its on-board accelerometer to determine its orientation relative to gravity. Thus, the control device 75 can determine whether it has ben installed correctly or whether it has been installed upside down, in which case the standard speaker configuration (one pointing toward the driver space and one pointing toward the passenger) would be reversed.

Figure 3:
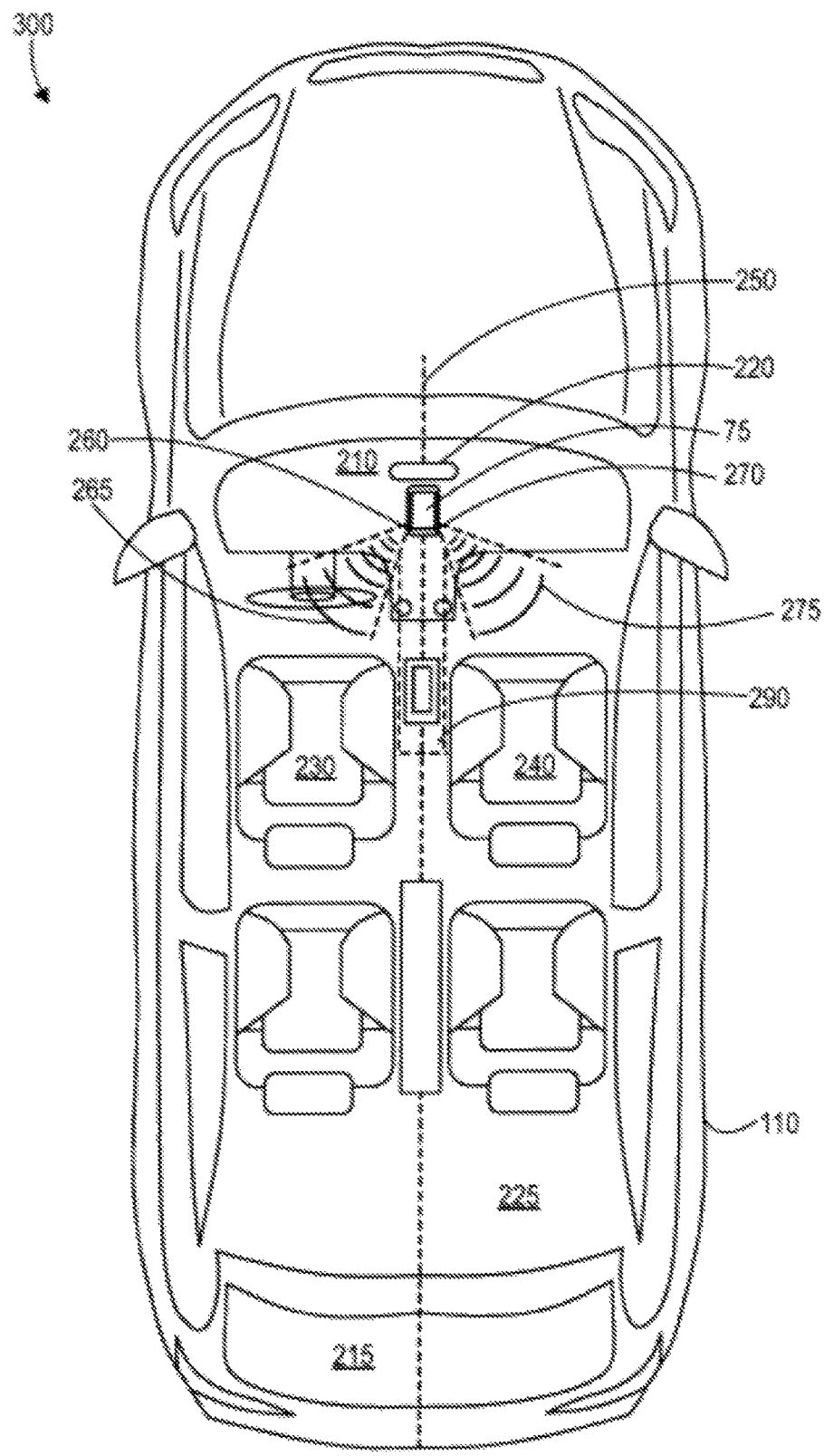
FIG. 3 is a top view illustrating the control device installed within the vehicle of FIG. 2.

FIG. 3 is similar to FIG. 2, but illustrates a top view 300 of a conventional vehicle 110 in which the exemplary control device 75 is mounted conveniently on the interior surface of the windshield 210 of the vehicle 110, near the central rear view mirror 220 of the vehicle 110. This mounting location on the interior windshield 210, near the central rear view mirror 220, is convenient since it does not obstruct the visibility of the driver of the vehicle sitting in the driver's seat 230, since it can be installed in an after-market environment, and since it is strategically located along or near the central axis 250 of the vehicle 110 along an invisible dividing line between the driver's seat 230 and the front passenger's seat 240. Preferably, the control device 75 includes a first speaker 260 that is configured to transmit a first audio signal 265 aimed generally toward the driver's space or quadrant of the vehicle. Preferably, the control device 75 includes a second speaker 270 that is configured to transmit a second audio signal 275 aimed generally toward the passenger's space or quadrant of the vehicle.

As with the exemplary system of FIG. 2, although the mounting location for the control device 75 shown in FIG. 3 is preferred, it will be appreciated by those of skill in the art that the control device 75 can be placed in different locations within the vehicle cabin. For example, the control device 75 can be placed anywhere along or near the central axis 250, such as lower on the windshield 210, on the dashboard, on the center console area 290, along the ceiling console area (not shown), or even on the back windshield 215, or the rear dashboard surface 225. The exact location is not critical as long as one audio signal is aimed toward the driver space and the other audio signal is aimed toward the passenger space.

Figure 4:
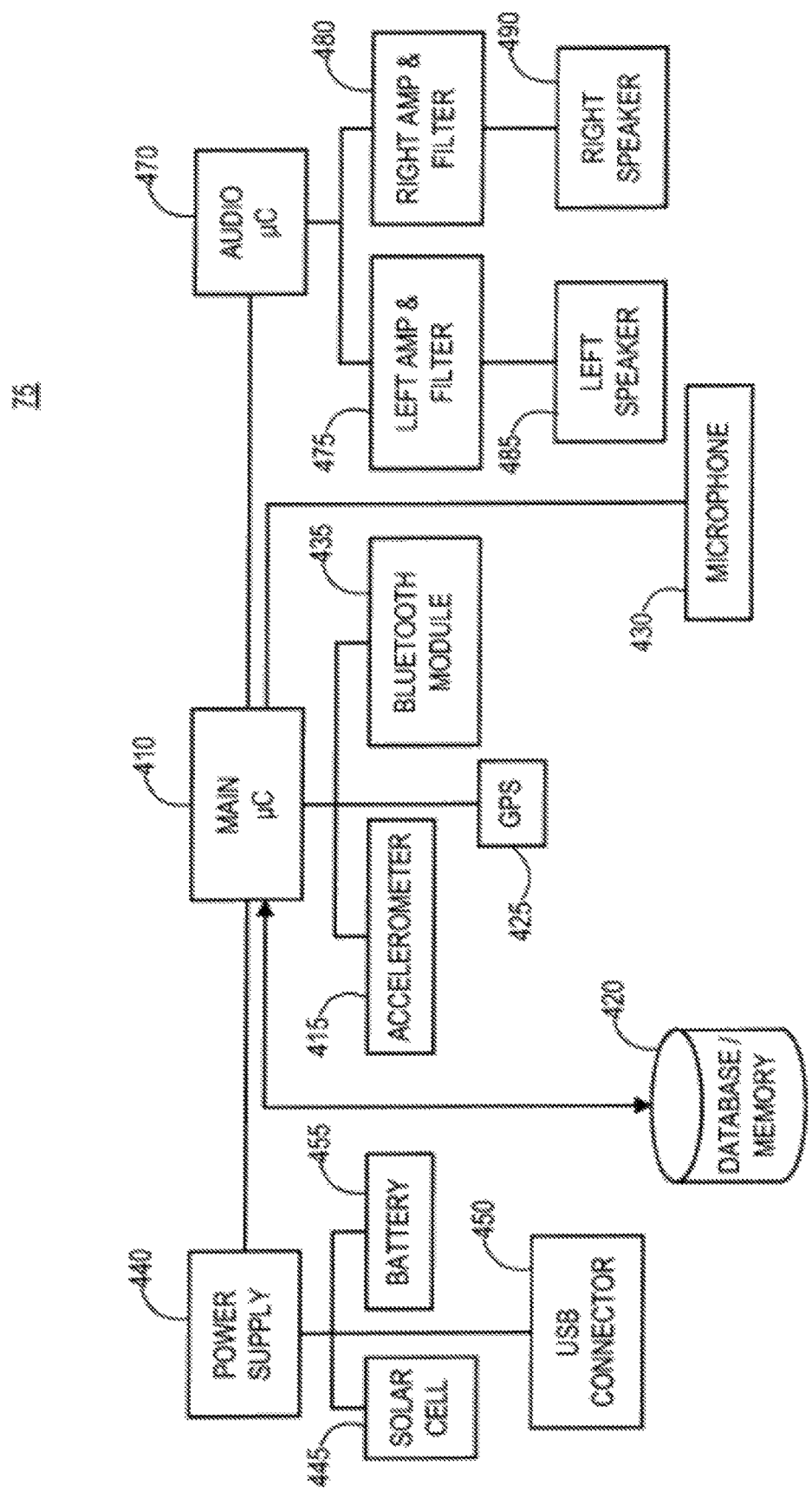
FIG. 4 is a schematic of primary components used in the control device illustrated in FIGS. 1-3.

FIG. 4 is a schematic that illustrates, at a high level, the primary components of the control device 75 used in the exemplary embodiments of the system described in association with FIGS. 1-3. The control device 75 preferably includes a main microprocessor 410, a power supply 440, and an audio processor 470. The main processor 410 receives power from the power supply 440 and controls the audio processor 470. Preferably, the control device 75 also includes an accelerometer 415, a GPS component 425, a Bluetooth (BT) module 435, and memory 420. The power supply 440 preferably includes a primary solar power component 445 and a rechargeable battery 455. Optionally, the power supply 440 also includes a USB power supply input to enable the control device 75 to connect to the power supply of the vehicle 110 in conventional manner. The audio microprocessor 470 preferably controls a left amplifier and filter 475 and left speaker 485 and a right amplifier and filter 480 and right speaker 490. In some embodiments, the control device 75 also includes a built-in microphone 430. As will be appreciated by those of skill in the art, the control device is able to detect ambient light levels based on the level of sunlight detected by the solar power component. Additionally, although not shown, the control device may also include a temperature sensor, which can detect and determine the ambient temperature level within the cabin of the vehicle, which may be of value in some end use applications.

Installing the control device 75 on the windshield of the vehicle allows solar power to be used as the primary power supply, with battery used for back-up purposes or when there is insufficient sunlight. This has the advantage of not requiring any wires or plugs to be connected during initial installation. It also allows more freedom in placement of the control device 75 within the vehicle 110. Power can be conserved by detecting long periods of time without any movement, as measured by the accelerometer 415 or other motion sensor, and then going into a low power (or "sleep") mode. Similarly, the control device 75 is preferably configured to power up (or "awaken") upon movement, again, as measured by the accelerometer 415 or other motion sensor. When the control device 75 is in regular power mode, the GPS 425 can be used for obtaining more accurate motion, speed, and position data. In some embodiments, it is still useful to have a USB power supply input on the control device 75 to be able to connect the control device 75 to the vehicle's power supply for occasions in which there is insufficient sunlight or in case the battery does not have sufficient charge to power the control device.

Having an independent and self contained control device 75 that can detect movement, at a minimum, and that has its own GPS tracking capability, which is not dependent upon data that must be obtained from the vehicle 110 or from the vehicle's on-board computer, offers many advantages. For example, the built-in accelerometer 415 can be used to determine when the vehicle, in which the control device is mounted, is moving. Because the control device 75 is physically connected to the vehicle, it would be assumed that any acceleration is likely caused by the vehicle in motion. Once the accelerometer 415 detects movement, the vehicle status (the fact that the vehicle is moving, the degree of acceleration, or the actual velocity—if GPS data is available) can be transmitted to any mobile devices within the vehicle using any of the data transmission protocols described herein, including Bluetooth, BTLE, WIFI, or audio. Similarly, rapid deceleration, sharp braking, or vehicle veering movements can also be detected by the accelerometer 415 and then transmitted. In preferred embodiments, the Bluetooth module 435 transmits the vehicle status data using classic Bluetooth and/or BTLE protocols.

From a practical standpoint, it is possible to use non-removable industrial, double-sided tape for mounting the control device to a windshield to prevent tampering, or to use tamper tape to detect tampering of the control device while still allowing eventual removal, when desired and authorized. As stated previously, the control device preferably is placed near or along the center axis of the vehicle. This control device preferably has one speaker pointing towards the driver quadrant and a second speaker pointing towards the passenger quadrant. Optionally, a third speaker can be placed pointing towards the back of the vehicle for better accuracy and filtering of back seat passengers. This control device could transmit or broadcast audio signals utilizing any one or combination of methods for mobile device location and corresponding driver identification, as will be described in greater detail hereinafter.

Advantageously, by being solar-powered, the control device 75 can be used for far more than distracted driving applications. For example, since the system can be used to identify drivers as compared to passengers, it is possible to automatically log drivers in and out of vehicles for electronic log books or hours of service type applications. The system can also be used for low cost UBI (usage based insurance) applications. Because the control device 75 can be installed by simply sticking, mounting, or otherwise attaching it to the vehicle windshield, consumers or fleet operators can easily install the device without needing any special equipment or expensive professional installs. This ease of installation and ability to "self power," provides a huge advantage in UBI, traditional telematics, insurance, and other driver or vehicle-usage applications.

The accelerometer 415 of the control device 75 is useful for detecting motion, braking, veering/swerving, and acceleration events associated with the vehicle. The GPS module 425 is useful for recording driving speed, collecting mileage information, and tracking vehicle location at any point in time during operation of the vehicle. The Bluetooth module 435 enables the system to communicate vehicular status data, as captured, obtained, or made available from the accelerometer and GPS module, to one or more mobile devices within the vehicle and/or to one or more applications being run by the vehicle. The Bluetooth module 435 could also be used to collect information from nearby sensor devices. For example, an OBDII device installed within the vehicle, as described in U.S. Pat. No. 8,527,013, can also have a Bluetooth module, which can communicate vehicle diagnostic and other detailed information obtainable from the vehicle's on-board computer, to the control device 75. A cellular component can also be added to the control device 75 to allow it to easily communicate data directly back to the at least one system server 180 using convention cellular communications. This allows the solar-powered control device 75 to have a function similar to a central hub within the vehicle for gathering information.

In one embodiment, rather than sending data directly from the control device 75 to a system server 180, such data can first be transmitted to one or more mobile devices within the vehicle, which can then upload such data to the system server 180. Finally, in some embodiments, vehicular status data may be provided separately to mobile devices within the vehicle both from the control device 75 as well as from any other data collection and communication devices within the vehicle (e.g. OBDII, JBUS, etc.). These arrangements provide a dynamic vehicle and data collection system that reduces cost while maintaining 24×7 connectivity.

Locating Mobile Devices in Vehicles Using Control Device

As stated previously, the control device 75 is designed to perform at least two primary functions. The first primary function is to transmit one or more signals that can be detected and then used by the mobile device to determine where the mobile device is located within the vehicle. There are a variety of ways to determine if a mobile device is in the driver quadrant (or side, for vehicles with no backseat) of a vehicle. One preferred method described herein is to use audio signals. Preferably, such audio signals are above 19 kHz, to prevent normal humans from being able to hear the tones, while still being in the range of typical audio output speakers and detectible by microphones on typical mobile devices. However, audible tones could also be utilized.

In a preferred embodiment, a first audio signal is played out of a speaker on the control device 75 and directed toward the driver space. A second audio signal is played out of a speaker on the control device 75 and directed toward the passenger space. Preferably, the first audio signal is a set of specific audio frequencies (1 or more) and the second audio signal is another set of specific audio frequencies (1 or more). Preferably, the frequencies used by the first and second audio signals are different from each other.

For example, in one implementation, the first audio signal includes three separate audio frequencies (e.g., 19100 hz, 19250 hz, and 19500 hz) played for a specific period of time, such as 50 ms. After 50 ms of playing, all sound playing stops for another predetermined period of time, such 200 ms. After 200 ms of silence, the second audio signal includes three different audio frequencies (e.g., 19200 hz, 19300 hz, and 19450 hz) played for another specific period of time, such as 50 ms. After 50 ms of playing, the system again pauses another predetermined period of time, such 200 ms, with silence before starting over by transmitting the first audio signal again. The frequencies, duration of playing or transmission, and duration of pause times are all exemplary and, as will be appreciated by one of skill in the art, could be configured using any number of combinations.

This method has several benefits in practice. For example, by spacing the playback out of each speaker, it is possible to reduce the potential for frequencies to interfere with one another. Also, the periods of silence allow any reverberations introduced within the vehicle cabin to dampen. Another benefit provided by this embodiment is the ability to detect relative distances. Because the play back timings are known or predetermined, it can be determined when to expect the frequencies to arrive at a mobile device based on its location within the vehicle. This deviation in the timings enables the system to identify accurately the quadrant of the vehicle within which the mobile device is located. The time from the beginning of the left audio to the beginning of the right audio, and vice-versa, is equal and fixed with a high degree of accuracy. Based on the speed of sound, the system can detect left-to-right versus right-to-left start times as being slightly different, depending on the position of the microphone of the mobile device relative to the speakers.

In another embodiment and as stated previously, the control device 75 can be integrated with the sound system of the vehicle. In such a configuration, the first and second audio signals can be played out of speakers built into the vehicle. In such embodiment, the first audio signal would be output through the speaker (or speakers) closest to the driver and the second audio signal would be output through the speaker (or speakers) closest to the passenger. Preferably, the control device 75 would control the audio outputs.

In yet a further embodiment, it is possible to broadcast first and second audio signals simultaneously. Such signals could either be broadcast from speakers on the control device 75 or by speakers of the vehicle under control of the control device 75. For example, the speaker aimed toward the driver or closest to the driver may broadcast a short duration tone at a first frequency, such as 19,100 Hz, while the speaker aimed toward the passenger or closest to the passenger may broadcast a short duration tone at a different frequency, such as 19,200 Hz. The length of the tones are predetermined. Preferably, the tones could be short, such as ten (10) milliseconds (ms), or longer, such as one (1) second.

As will be appreciated by those of skill in the art, any tone duration could realistically be used; the overall concept remains the same. Since, in this particular embodiment, the two tones are broadcast simultaneously, the frequency tone received first by a particular mobile device can aid in determining its location. For example, if the left tone reaches the mobile device first, this would indicate the mobile device is closer to the left side of the vehicle than right—which in certain countries would indicate that the mobile device is in the driver quadrant rather than the passenger quadrant. By utilizing more speakers and frequencies, exact quadrants could be determined. For instance, multiple control devices (one at the front of the vehicle and one at the back of the vehicle) could be used to provide four separate speakers, each having a dedicated audio frequency. Alternatively, each of the four speakers of the vehicle could be used in similar fashion. For example, the front left speaker (or speaker closest to the driver or aimed at the driver quadrant) could broadcast a tone at 19,100 Hz, the front right speaker at 19,200 Hz, back left speaker at 19,300 Hz, and back right speaker at 19,400 Hz. From these four different frequency audio signal, one could determine the location of the mobile device by comparing the order in which the frequencies are received by the mobile device(s). For example, if the first two frequencies received are from the front left speaker followed by the back left speaker, the mobile device is likely located in the driver seat.

The position is determined by comparing the relative start time of the different frequency tones, as observed by the microphone of each mobile device. Thus, each mobile device will observe the audio for each frequency to start frequently, up to multiple times per second. For this to work properly, the sample rate should be at least twice the maximum frequency emitted by any of the speakers, preferably higher. The exact start time of the frequency would preferably be determined using known digital signal processing (DSP) techniques.

One such technique is to perform a Fourier transform on a sub-window of the recorded audio. In this case, one would look for a spike at each of the frequencies emitted by the speakers. The time at which each frequency is marked as "started" would be the time at which the value of the Fourier transform for that frequency and window position exceeds a given threshold. That threshold may be fixed, or may be adaptive. Additionally, the threshold may be different for different speakers. This is especially helpful to overcome the frequency response of the speakers and the microphone of the mobile device, especially at high frequencies.

Preferably, each speaker will emit its tone for a fixed period, followed by a fixed period of silence. This allows each mobile device to take multiple samples. This procedure can be used to help each mobile device determine the desired information in spite of a noisy environment or being near a middle point between two speakers. The processing of this information may be processor-intensive. Depending on the speed of the CPU of the mobile device(s) and its data connection, it may make sense to process the audio locally, or upload it to a server for processing. In the latter case, the audio may be sent raw, or may be preprocessed to reduce size.

In yet another embodiment, the mobile device and the control device can be programmed to perform a set of pings. Once the mobile device detects the control device in the vehicle for which it is allowed to communicate, the mobile device can be configured to emit a short duration high frequency tone. The control device in the vehicle would be configured to detect this high frequency tone and, in response, emit its own short duration tone. The mobile device would then compare the time from which it emitted its tone until the response tone from the control device was detected.

In one implementation, the mobile device would accomplish this by starting to record audio before producing its tone. It would then record for a set amount of time, long enough for the response tone to have come back. The mobile device would then use this audio capture to determine, using one or more DSP techniques, the difference in time between the start of its own tone and the start of the responding tone. Preferably, the mobile device's tone and the responding tone would be sufficiently different in frequency to be able to be clearly separated using DSP techniques. Using this information, the processing software on the mobile device would be capable of calculating the distance between mobile device and the system control device. Based on the distance, it would be possible to determine whether the mobile device is in the drivers quadrant, passenger quadrant, or in the back seat. For this method to operate properly, the responding tone generated by the control device would have to be reliably produced at a fixed time interval after the control device first detects the tone produced by the mobile device. Processing the audio capture can be performed locally on the phone, or remotely in the cloud. This method could further be enhanced by having multiple control devices located within the vehicle to help pinpoint the quadrant within which the mobile device is located with better accuracy.

In a slight variation of the above embodiment, it is not necessary to determine precise distances between the mobile device and the control device or to determine conclusively within which quadrant the mobile device is located. For example, just determining which mobile is closest to the control device may be enough information to determine what action to take, such as which mobile device should be blocked, scored, or logged. In this variation, the response time from emitting the tone from the mobile device until receiving the response tone from the control device would be shared with other mobile devices located within the vehicle. If the control device is placed nearest to the driver or driver's quadrant of the vehicle, then the mobile device with the shortest tone transmission and response time would be considered in the driver quadrant. Conversely, the mobile device with the longest tone transmission and response time would be considered in the driver quadrant depending on alternative placements (such as a location furthest away from the driver's quadrant) of the control device. The tone transmission and response times can be shared with the other mobile devices in the vehicle in many different ways. One way would be by uploading the information to the cloud and allowing an application running on a remote web server to determine the shortest (or longest) distance. Another way would be to share the information locally through standard Bluetooth, BTLE, or by changing a discoverable field on the mobile device, such as Friendly Name, to represent the information. For these methods to operate properly, the responding tone would have to be reliably produced at a fixed interval after the responding system control unit first detects one or more tones from mobile devices within the vehicle. Processing of the data could be performed locally on one or more mobile devices, or remotely in the cloud.

In yet a further embodiment, the amplitude of the various frequencies may be enough to determine mobile device location within the vehicle. One or more control devices could be installed or prebuilt into a vehicle, which simultaneously sends tones out of two or more speakers. All of the frequencies would be broadcast with the same relative power. The frequency, which is the loudest, would indicate the speaker that is closest to that respective mobile device. This would be accomplished on the mobile device by recording the audio and using one or more DSP techniques, such as Fourier transform, to determine amplitude. The average amplitude at the desired frequencies would be calculated across the recorded sample.

Again, the actual processing of the recorded audio could be performed locally or in the cloud. Utilizing this procedure, the frequencies could be broadcast in short duration bursts or played continuously into the cabin of the vehicle. The exact quadrant could again be determined by utilizing multiple speakers. However, this procedure could work using just two speakers or four speakers—in a manner as described above—with each speaker broadcasting at its predetermined and pre-set frequency. Each (or all) speakers could be continuously playing their tone or alternating each tone with periods of silence. The mobile devices within the vehicle can then compare the relative amplitude of each of the speakers to determine approximate location within the vehicle. It should be noted that the tone does not have to be played continuously, it can be played in short duration bursts, continuously, long bursts, or any combination thereof. It should also be noted that the use of signals out of each speaker in this embodiment could be any combination of frequency—both audible and in-audible tones could be used. To account for various frequency responses of the speakers and/or receiving mobile devices, the power at which each speaker is playing may be varied to account for the frequency response. The particular frequencies chosen will depend on several factors. For example, high noise and/or low fidelity environments will benefit from wider separation between the frequencies of the different speakers. In addition, wider separation of the frequencies can reduce the calculation load of the DSP performed, which may be beneficial for some handsets or mobile devices.

In another embodiment or as a variation of any of the above embodiments, one or more "presence" frequency tone may also be emitted from the speakers. These frequencies tone(s) would be emitted in equal power by all speakers. Preferably, such "presence" frequency tone(s) would be at a different frequency from any of the frequencies used for positioning determinations, as described above. These presence frequency tone(s) would enable the mobile device to determine that it is inside the vehicle or other designated/protected area. When the presence tone is used in the current system, the handset or other mobile device must first detect the presence frequency tone before it will interpret any other frequency tone for the purpose of determining its location within the vehicle. This may be especially useful in high noise and/or low fidelity environments. These "presence" signals could be utilized to improve the reliability of all of the above driver detection embodiments discussed above or, alternatively, such presence frequencies could be used as a standalone system.

For the various audio implementations discussed above, it is recommended that the frequencies used by the system not be harmonics of one another, as this could cause potential detection issues. Also, another aspect of operation is detecting the signal emitted from the speakers amid the ambient noise of the environment within the vehicle. Various procedures can be used to make this determination. For example, the powers at all measured frequencies, except the ones expected, can be averaged. This will represent the noise level. The power level at the expected frequencies can then also be measured. The expected frequencies must then exceed the noise by some threshold in order to be considered detected. The threshold for detecting the presence frequency may be the same or different from the threshold required for the positioning frequencies. Alternatively, the powers seen at all frequencies may be averaged over time to prevent false positives.

If the presence frequency is detected, but no positioning frequency is thereafter detected, then, after some predetermined period of time, the threshold for the positioning frequency may be lowered. In addition, if there is some external signal that the mobile device is inside the vehicle, such as a specific Bluetooth signal, for example, but the presence frequency is not detected, the threshold for the presence frequency may be lowered as well.

In a feature of any of the above mobile device location (and corresponding driver detection) embodiments, it is useful to be able to determine when the driver may be attempting to circumvent the system by reaching out and holding the mobile device on the passenger side of the vehicle, by having a passenger hold the mobile device for the driver but in a manner in which it is viewable or useable by the driver, or by having the mobile device mounted or positioned outside the driver's seat area but still oriented so that the driver can see and interact with the mobile device.

Determining when a mobile device is being held, position, or oriented in a manner that can be viewed or used by the driver, even when not in the driver's seat area of the vehicle can be accomplished in several different ways. For example, it is possible to compare the heading of the vehicle with the orientation of the mobile device. In one implementation, this can be accomplished using only the sensors on the mobile device as follows: using the GPS on the mobile device, the heading of the mobile device can be detected. As this matches the heading of the vehicle, this provides a number range between 0-360 degrees—indicating the orientation of the vehicle relative to magnetic north. Using the magnetic sensor on the mobile device, the orientation of the mobile device relative to magnetic north can also be determined—also as a number range between 0-360 degrees. This is the compass orientation of the vector perpendicular to the back side of the phone (the side opposite the display). These two numbers can then be compared. For example, if the heading of the car is 0 degrees (straight north) while the orientation of the phone is 90 degrees (back side of the phone is pointing due east), then the system determines that the mobile device may be in a circumventing use orientation. Clearly, a passenger would not typically hold her mobile device in this position.

As a second example, if the heading of the car is 0 degrees (straight north) while the orientation of the mobile device is 10 degrees (back side of the device is pointing just slightly east of north), then the system determines that the mobile device is in an "allowed" use orientation, as this would be considered within a valid range of orientation for passenger use. The exact threshold of degree of difference is configurable, so as to accommodate varying vehicle cabin geometries, individual user movement patterns, and parent/administrator strictness.

In some instances, it may be desirable for the passenger to hold her mobile device in a position in which the screen is facing the driver. One example would be when the passenger holds her mobile device against her ear, in which case the screen could still be "facing" the driver, but would not in fact be viewable by the driver. This scenario can be filtered out as an exception—using additional data available from the mobile device, such as screen proximity sensor, screen on state, or the current call status.

The gyroscope and magnetometer of the mobile device can also provide useful information to help identify the orientation of the mobile device in the vehicle since many applications can be viewed in either a portrait screen orientation or in a landscape screen orientation.

As stated previously in conjunction with FIG. 1, the mobile device 150 preferably makes use of two embedded or downloaded applications or software components, each designed to handle and make use of the data or communications made by the control device 75. The first application or software component is preferably designed to process the audio signals that are transmitted to the mobile device for enabling the mobile device to determine whether it is located in the driver quadrant or, in a feature, located in the passenger quadrant but being positioned or held in such a manner that it is likely to be useable or viewable by the driver, which is important to prevent a driver from trying to circumvent a distracted driving application.

Figure 5:
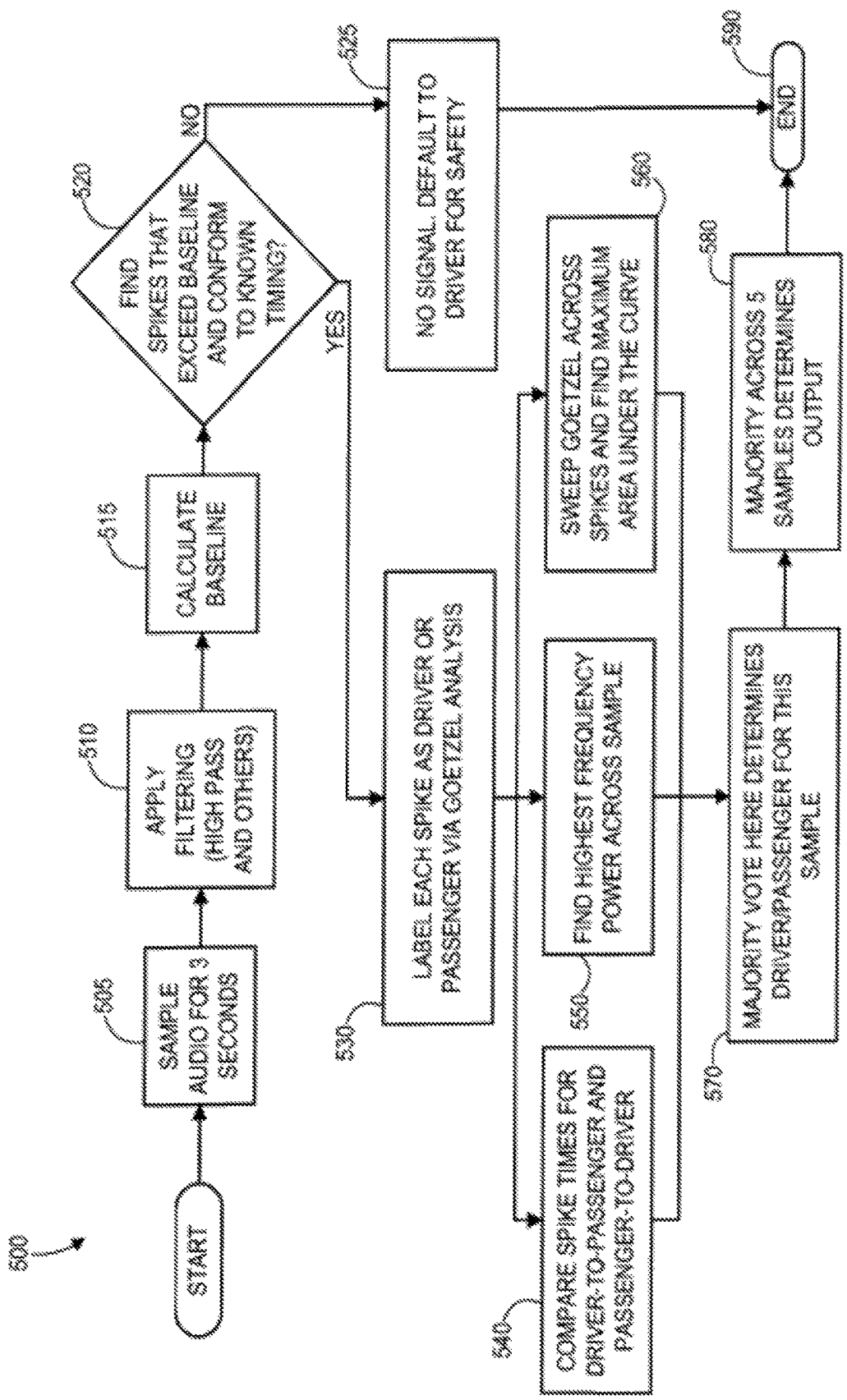
FIG. 5 is a flow chart of the steps used by a mobile device for processing audio signals generated by the control device illustrated in FIGS. 1-4.

The flow chart of FIG. 5 illustrates the process 500 by which the mobile device 150 determines whether it is located within the driver quadrant of a vehicle 110 when used in conjunction with a control device 75 configured, according to the preferred embodiment, to transmit a first audio signal toward the driver and a second audio signal directed toward the passenger. Preferably, the first audio signal includes three separate audio frequencies (e.g., 19100 hz, 19250 hz, and 19500 hz) played for a specific period of time, such as 50 ms. After 50 ms of playing, all sound playing stops for another predetermined period of time, such 200 ms. After 200 ms of silence, the second audio signal includes three different audio frequencies (e.g., 19200 hz, 19300 hz, and 19450 hz) played for another specific period of time, such as 50 ms. After 50 ms of playing, the system again pauses another predetermined period of time, such 200 ms, with silence before starting over by transmitting the first audio signal again.

The audio processing application of the mobile device first samples the audio signals transmitted to the mobile device (Step 505). Filtering, such as high pass and other filtering, is used to reduce or minimize noise from the audio sample (Step 510). A baseline of intentional and ambient noise captured during the sampled audio is calculated (Step 515). The process 500 then determines whether there are any audio signal spikes that exceed the calculated baseline and that conform to the predetermined or pre-set audio signals— based on frequency and based on expected duration of such signals and delays between such signals (Step 520). If no audio signal spikes are detected, the process assumes that the mobile device is not in a vehicle, not in a vehicle that is moving, or not in a vehicle that has a suitable control device installed or activated (Step 525). In such a scenario, the mobile device cannot determine its location in the vehicle based on any signals from a control device; therefore, the process for seeking audio signals from a control device either ends or starts over again (Step 590).

If one or more audio signal spikes are detected at Step 520, the process 500 then labels each such detected audio signal spike as either a "driver" or "passenger" audio signal using Goetzel analysis (Step 530). Three separate analyses are then performed by the process 500 on each labeled audio signal spike. In one analysis, the spike times for driver-to-passenger and passenger-to-driver are compared (Step 540). In a second analysis, the highest frequency power audio signal is identified (Step 550). In a third analysis, a Goetzel analysis sweep is performed across all of the detected spikes and a maximum area under the curve is calculated (Step 560).

The process 500 then compares the results from the three separate analyses and initially determines whether the mobile device is located in the driver quadrant or not—based on the results of at least two of the three analyses performed on the audio sample (Step 570). The audio processing application of the mobile device then finally determines whether the mobile device is located in the driver quadrant or not—based on the results of at least three of the determinations made at Step 570 (Step 580).

All of the above methods using the control device (and any of the exemplary methods described below that do not use the control device) for determining if a mobile device is in the driver quadrant or one of the other quadrants within the vehicle are useful for a variety of reasons based on the end use application. For example, in some instances, a decision of whether to block or not to block functionality of the mobile device may be made based on the location of the mobile device. In other scenarios, deciding whether to audit the mobile device's activities may be made based on the quadrant. For example, in a UBI scoring application, the mobile device may not go into blocking mode, but by knowing this mobile device is the one that is in the driver quadrant and using the mobile device as a proxy to identify the individual driving, more accurate scoring models can be constructed. In other uses, the mobile device in the driver quadrant may be used automatically to "sign in" for hours-of-use type applications, commonly found in FMCSA vehicles. Yet another use of quadrant identification could be for accident reconstruction. An accident could be reconstructed in which the location of various mobile devices within the vehicle could be used and potentially cross-referenced with carrier data corresponding to each mobile device before, during, and after the accident.

It should also be noted that the quadrant in which a mobile device is located may change over time. For instance, when a vehicle first starts moving, the mobile device in the driver quadrant may be identified and go into blocking/auditing/scoring modes. The system could be continuously monitoring its location to help determine when its quadrant location within the vehicle may have changed. Upon quadrant change, different actions may occur. For example, call blocking may change to a new mobile device that moves into the driver quadrant, while the mobile device that has moved out of the driver quadrant may be freed up to make calls. Similarly, blocking/auditing/scoring applications can switch from one mobile device to another depending upon which one is within the driver quadrant at any given time.

It may also be useful to know if more than one person is in the vehicle. For instance, if only one person is in the vehicle, it may be desirable for that user's mobile device or devices to be blocked/audited/scored regardless of the quadrant in which such device(s) are located. Therefore, various methods outlined above may be useful in determining if more than one mobile device is in the vehicle and where each mobile device is located within the vehicle. Each mobile device may communicate with a centralized server to help facilitate this discovery, or mobile devices locally may be configured to communicate with each other using Bluetooth or other short-range communication mechanisms. In some implementations the mobile devices may broadcast their own audible tones to help with this determination. For example, while in the vehicle, or in motion only, the mobile device may pick an unused frequency and broadcast its own audio signal. This could be accomplished in many ways, such as having a pool of available frequencies from which to choose. The other mobile devices in the vehicle can detect and sample this pool of frequencies to determine if another mobile device has "checked in" within the vehicle. In yet another implementation, vehicle specific sensors may be utilized. Such vehicle specific sensors include, but are not limited to, seat belt detectors that detect which seat belts are engaged, weight sensors on the seats that help identify if the seat is occupied, and the like.

Transmission of Vehicular Status Data from Control Device

As stated previously, in addition to transmitting signals used to determine the location of the mobile device within the vehicle, the control device 75 is also configured to transmit or broadcast vehicular status data. Preferably, the vehicular status data includes information that can be determined or detected by the control device itself, such as motion of the vehicle, speed of the vehicle, location of the vehicle, cabin temperature within the vehicle, sound or ambient noise within the cabin of the vehicle at any point in time. Preferably, such vehicular status data can be transmitted or broadcast by the control device 75 using classic Bluetooth (BT) communication protocols, using Bluetooth Low Energy (BTLE) communication protocols, or both. Preferably, such vehicular status data is transmitted in real time, on a periodic basis; however, in some embodiments or circumstances, especially if vehicular status data has accumulated and been stored in memory on the control device 75 without previously being transmitted to a receiving mobile device or vehicle application, such vehicular status data may be transmitted in bulk or in non-real time scenarios to a mobile device—once one such receptive device comes within communication range of the control device 75.

Figure 6:
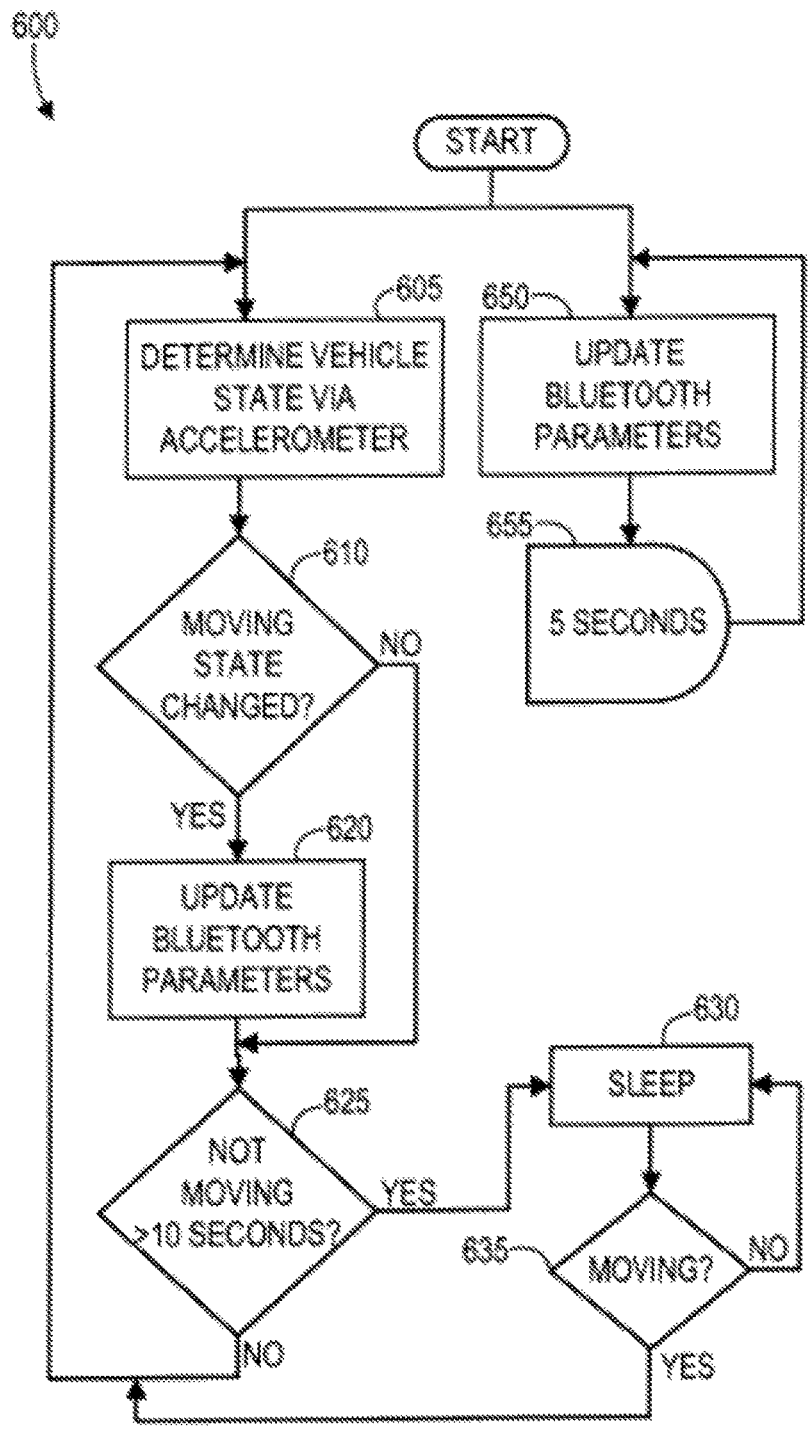
FIG. 6 is a flow chart of the steps used by the control device of FIGS. 1-4 for detecting vehicle status and for transmitting vehicular status data in accordance with the embodiment of FIG. 1.

The flow chart of FIG. 6 illustrates the process 600 by which the control device 75 communicates vehicular status data to one or more mobile devices within a vehicle. As stated previously, the control device 75 preferably remains in a powered-down state to preserve its battery. Thus, the control device 75 monitors its built-in accelerometer in order to detect when the vehicle in which it is installed or mounted begins to move (Step 605). Upon detection of movement, the control device 75 powers on. The process 600 continues to monitor the output of its accelerometer to determine any changes in movement of the vehicle (Step 610). Any change in movement of the vehicle, including its rate of acceleration or deceleration, is recorded and stored in memory on the control device. Preferably, such information is embedded in a suitable data field that will be transmitted by the control device using one of many potential communication protocols (Step 620). As stated previously, such vehicular status data can be transmitted or broadcast by the control device 75 using classic Bluetooth (BT) communication protocols, using Bluetooth Low Energy (BTLE) communication protocols, or both. Specific details about transmission of such data using classic BT and BTLE are described in greater detail hereinafter.

If the accelerometer of the control device detects (Step 625) that the vehicle has not moved for a predetermined period of time, such as ten (10) seconds, then the control device returns to a sleep or powered-down state (Step 630). The control device remains in its sleep of powered-down state until movement is again detected (Step 635).

Preferably, the control device 75 periodically updates the vehicular status data embedded in the suitable data fields that will be transmitted by the control device (Step 650). In a preferred embodiment, such information is updated every five (5) seconds (Step 655).

As will be appreciated, for control devices that include a GPS module, the vehicular status data includes not only the accelerometer data, but also geographic location data, vehicle speed, and corresponding time-based correlation data associated with such information.

Finally, it will be appreciated by one of skill in the art that the control device described herein can be configured just to perform one or the other of its primary functions. For example, one embodiment of the control device can be configured just to transmit audio signals for use in detecting the location of mobile devices within a vehicle. Such control devices can be constructed without inclusion of an accelerometer, GPS, data transmission module, and other sensors described above. Conversely, another embodiment of the control device can be configured just to detect and transmit vehicular status data. In such embodiments, such control devices can be configured without an audio microprocessor and speakers.

Transmissions Using Classic Bluetooth Protocols and Friendly Name Broadcasts

As will be appreciated from an understanding of U.S. Pat. No. 8,527,013, classic Bluetooth (BT) communication protocols can be used by the control device 75 of the present invention to transmit relevant vehicular status data to one or more mobile devices located within a vehicle and/or to one or more computer systems and applications associated with the vehicle.

As will be appreciated by one of skill in the art, with conventional Bluetooth communication protocols, once a single mobile device 150 has "paired" and connected with the Bluetooth module of the control device, other mobile devices are not able to connect with the Bluetooth module of the control device until the original mobile device disconnects and the pairing is dropped. Thus, with conventional Bluetooth connectivity, only one mobile device can be used in a vehicle at a time. That may be fine for some or many applications and uses, but not for all.

Therefore, preferably, the Bluetooth connective modules on the control device and installed within the system application or software component installed or used by each compliant mobile device in the vehicle and compliant computer system associated with the vehicle is configured to allow for "one to many" connections with the Bluetooth module of the control device.

In one embodiment, multiple mobile devices and vehicle computer systems can connect simultaneously to the Bluetooth module of the control device through the use of piconets. The Bluetooth module of the control device acts as the "server" and is designated as the "master" device and each associated mobile device or vehicle computer system is designated as a "slave." However, to initiate the connection, the mobile device or vehicle computer system initiates the connection initially as the "master" device. Conventional Bluetooth protocols support a procedure called the master-slave switch, which allows the mobile device or vehicle computer system to become the slave after initiating this initial connection. However, not all mobile devices or vehicle computer systems, at least currently, are configured to enable master-slave switching.

For this reason, in another preferred embodiment, the present system does not use the "normal" or "orthodox" connection or paired oriented protocol for Bluetooth connections. Instead of initiating a connection in the normal Bluetooth sense using the mobile device, the Bluetooth module of the control device communicates its "state" or vehicular status data in a broadcast manner to any listening mobile devices or vehicle computer systems in Bluetooth range. It does this by changing its "friendly name" to represent the current state of the vehicle and any available vehicular status information. This technique enables the system to support a much wider array of mobile devices and vehicle computer systems while also retaining the ability to communicate vehicular status data to multiple mobile devices or vehicle computer systems in the same vehicle using a single Bluetooth transmitter associated with the Bluetooth module of the control device. For example, in one simple embodiment, when the control device detects vehicle movement, an acceleration value can be obtained from the accelerometer built into the control device. Likewise, if the control device has its own GPS component, vehicle location and speed can also be obtained. This data can then be embedded and incorporated into the "friendly name" of the Bluetooth module on the control device that is then broadcast to any listening devices within range of the control device, which would typically include any mobile devices within the cabin of the vehicle and, potentially, one or more vehicle computer systems. Each mobile device or vehicle computer system, having the system software installed thereon, would then be able to detect the "friendly name" broadcast and extract the relevant vehicular status data. This vehicular status data, along with the previously determined mobile device location data, can then be used to advantage for a wide range of purposes—depending upon the other software applications, components, or modules installed on each mobile device or vehicle computer system. Each mobile device or vehicle computer system can then be configured to search for and detect the Bluetooth "friendly name" at pre-set intervals to ensure that updated vehicular status data is obtained on a desired and periodic basis.

In another preferred and more sophisticated embodiment, the Bluetooth friendly name of the Bluetooth module of the control device can be updated on a periodic basis (e.g., every 3 seconds) to provide multiple pieces of vehicular status data—when the amount of available data exceeds the field parameters of the Bluetooth friendly name. Since it may not be possible to send all potentially relevant vehicle state or status data in a single friendly name data transmission, the information transmitted can be divided into frames. Obviously, the more characters that the transmitter is capable of using as its Bluetooth friendly name, the fewer frames and fewer cycles of name transmissions required to pass on all relevant data to the listening devices.

The amount of data and information that can be sent as part of the Bluetooth "friendly name" depends upon the software and hardware used. For example, some Bluetooth transmitters have a 16 character limitation in regards to how long the "friendly name" can be; others have 20, 28, or 30 character limits, but the exact length is not important and will vary based on the application and the Bluetooth hardware in use at the time. Regardless of the exact size or character limitation of the "friendly name," the system is able to accommodate any amount of information transmitted by using frames and pre-set protocols that identify what information is being transmitted and by identifying or knowing the number of character fields that follow a specific frame identifier and, potentially, how many friendly names are transmitted as part of a single data broadcast. Such information can be pre-set or identified within the friendly name itself through use of an "end" character that specifies the end or last piece of information in a series of broadcasts and which would indicate that the next broadcast would represent the start of a new broadcast of information.

Transmissions Using BTLE Protocols

Bluetooth low energy (BTLE) wireless technology is an ultra-low power (ULP) 2.4 GHz RF technology designed to bring wireless links to products that currently use: proprietary wireless that is unable to communicate with other wireless protocols; wired connections; or have (at present) no wireless communication provision but would benefit from one.

Bluetooth low energy (BTLE) wireless technology is a ULP wireless solution featuring:

Ultra-low peak, average and idle mode power consumption;
Ultra-low cost plus small size for accessories and human interface devices (HID);
Minimal cost and size addition to handsets and PCs; and
Global, intuitive, and secure multi-vendor interoperability.

Bluetooth low energy (BTLE) wireless technology was designed from the outset to be a ULP technology whereas classic Bluetooth technology is a "low power" wireless technology. This difference dictates that the operational characteristics of Bluetooth low energy wireless technology and classic Bluetooth wireless technology are opposites. Classic Bluetooth wireless technology is a "connection oriented" radio with a fixed connection interval ideal for high activity links like mobile phones communicating with wireless headsets. Among several measures to reduce the power consumption, BTLE wireless technology employs a variable connection interval that can be set from a few milliseconds to several seconds depending on the application. In addition, because it features a very rapid connection, Bluetooth low energy wireless technology can normally be in a "not connected" state (saving power) where the two ends of a link are aware of each other, but only link up when necessary and then for as short a time as possible.

There are three characteristics of Bluetooth low energy technology that underlie its ULP performance: (i) maximized standby time, (ii) fast connection, and (iii) low peak transmit/receive power. Bluetooth low energy technology uses just three "advertising" channels to search for other devices or promote its own presence to devices that might be looking to make a connection. In comparison, classic Bluetooth wireless technology uses 32 channels. This means Bluetooth low energy wireless technology has to switch "on" for just 0.6 to 1.2 ms to scan for other devices, while classic Bluetooth wireless technology requires 22.5 ms to scan its 32 channels. Consequently, Bluetooth low energy wireless technology uses 10 to 20 times less power than classic Bluetooth wireless technology to locate other radios.

Once connected, Bluetooth low energy wireless technology switches to one of its 37 data channels. During the short data transmission period the radio switches between channels in a pseudo-random pattern using the Adaptive Frequency Hopping (AFH) technology pioneered by classic Bluetooth wireless technology (although classic Bluetooth wireless technology uses 79 Bluetooth low energy wireless technology features a raw data bandwidth of 1 Mbps)—greater bandwidth allows more information to be sent in less time. A competing technology that features a bandwidth of 250 kbps, for example, has to be "on" for eight times as long (using more battery energy) to send the same amount of information. Bluetooth low energy wireless technology can "complete" a connection (i.e., scan for other devices, link, send data, authenticate and "gracefully" terminate) in just 3 ms. With classic Bluetooth wireless technology, a similar connection cycle is measured in hundreds of milliseconds; more time on air requires more energy from the battery.

Bluetooth low energy wireless technology also keeps a lid on peak power in two other ways: by employing more "relaxed" RF parameters than classic Bluetooth wireless technology, and by sending very short packets.

When using BTLE to communicate vehicular status data to one or more mobile devices, there are several things to consider. By default, BTLE allows for the communication of data without requiring pairing. The BTLE specification also allows for multiple devices to be simultaneously connected and sharing data. However, in practice, it has been found that most BTLE modules on the market can only support one device connected at a time. This introduces issues if more than one person or mobile device is in the cabin of the vehicle. To overcome this limitation, several workaround methods have been developed.

In one method, a unique identifier is embedded in the BTLE advertising data, so the mobile device can immediately recognize the unit as the one with which it will interact. In addition, vehicle status information can be embedded into the service UUID being advertised. In this manner, it is possible to transmit basic information, such as moving, not moving, and vehicle off status information by utilizing 3 different service UUIDs. The service UUID that is present indicates which mode the mobile device should be in. Utilizing this method, it is possible to prevent the mobile device from initiating a "connection" to the BTLE device. By not connecting, it is possible to have multiple devices simultaneously retrieve vehicle status data.

In addition to utilizing the service UUID, it is possible to overwrite the advertising data with additional information, such as, for example, using an approach outlined previously consisting of various frames of data. This allows the system not only to communicate vehicle status without connecting, but also to communicate additional vehicle metrics, such as braking, mileage, and speed.

In another implementation, it is possible to create a custom BTLE profile. This profile has multiple characteristics consisting of ASCII strings. Once the mobile device connects, it will read all characteristics. Once all characteristics are read, or a timeout is exceeded, the mobile device automatically disconnects from the BTLE device. In an alternative implementation, these characteristics can use the BTLE indication mechanism. Using the indication mechanism, the remote BTLE device can determine when the mobile device has read all of the characteristics. The BTLE unit will then disconnect the mobile device. Having the external hardware device automatically disconnect the mobile device at a set interval or at the completion of reading characteristics is critical to ensure multiple devices can retrieve the requested data in a timely fashion. This allows one unit to service multiple mobile devices and prevents possible denial of service.

Data can be retrieved via BTLE in multiple manners. For example, multiple custom characteristics are pre-defined. More than one custom characteristic is necessary since there is a length limit on a single characteristic, and the sum width of available data fields will likely exceed that value. These characteristics will be read-only by the client, and are configured such that the client is notified when the characteristics change.

Another method for BTLE data transmission is to use two custom characteristics. The first characteristic will hold a chunk of data—the next chunk of the data in the stream of data to be transmitted. The second characteristic will be readable and writable by the BTLE client, with notify enabled. It will be in one of two states. In state A, it will indicate that there is a new chunk available to be read. After the client has read the chunk, it will write state B. The BTLE server will then see that the client has read the chunk, and will load the next chunk, again setting the state back to state A.

Transmissions Using Other, Non-Bluetooth Communication Protocols

Instead of BT or BTLE communications, it is also possible, in alternative embodiments, for WiFi to be used as a means for transmitting or broadcasting vehicular status data from the control device. Such information may be streamed over WiFi directly from the vehicle to a receiving device. In a mechanism similar to non-pairing Bluetooth implementations describe previously, the SSID of the WiFi network may be altered to communicate vehicle status. Furthermore, a web service could be running on the control device within the vehicle. Again, such device or hardware may be either aftermarket or OEM installed. This web service would respond to various queries indicating the state of the vehicle to such receiving device.

In an alternative embodiment, audio itself could also be used to transmit or broadcast vehicular status data. Using DSP techniques, data can be transmitted from the vehicle to software on mobile devices within the vehicle or to software being run by or on the vehicle itself. Essentially, any of the techniques used in analog modems may be used here, since the basic constraints are the same: transmit data via audible sounds over a noisy channel. These techniques include frequency modulation, amplitude modulation, or phase modulation. The number of different allowed frequencies/amplitude/phases will determine throughput, with more allowing higher throughput, but less allowing better operation in high signal-to-noise environments. Combinations, where more than one of these factors is modulated, may also be useful. Also, error detection schemes, such as parity or CRC32, are useful for finding and correcting errors.

Determining Location of Mobile Device(s) in a Vehicle Using One or More Antennas for Detecting Cellular Data Transmissions In some implementations there may be advantages to having systems, methods, and devices that can detect mobile devices in the vehicle without the need for any custom software running on the mobile device. Preferably, such systems, methods, and devices are implemented using the main controller or control device, as described above, as a monitoring device that is mounted, installed, or otherwise built into a vehicle or other controlled environment and is used to detect the presence of mobile devices in the vehicle or other controlled environment.

In one embodiment, such main controller or control device or monitoring device uses an antenna to receive cellular signals, especially the uplink bands. By measuring the power in these bands, the system is able to detect the presence of a mobile device in the vehicle. Mobile devices typically transmit and communicate with remote servers through the uplink frequency bands. Therefore, by looking at these specific bands, one can determine if a mobile device in the vehicle is requesting and/or uploading data.

The uplink bands and their frequency ranges differ from carrier to carrier and from region to region. Additionally, there are specific uplink bands for GSM and CDMA, UMTS (commonly known as 3G), and LTE (commonly known as 4G). By observing as many uplink bands as possible, the system can increase the success rate in detecting the presence of a mobile device within the vehicle or controlled environment regardless of carrier.

In one implementation, all desired uplink bands are monitored simultaneously. This is achieved by passing the received RF signal from the antenna through a splitter so that filters of correct center frequency and bandwidth can be used only to pass signals in those bands. A low noise amplifier (LNA) may be added after the filter to normalize each output power level before being fed into one or more power detectors. Optionally, a combiner can be used to feed the filtered signals into a single power detector. This approach is simplest in implementation. It also continuously monitors all bands. However, it has poor signal-to-noise ratio (SNR) due to the cumulative attenuation introduced by the components. Another downside is that, using this approach (absent further processing or tagging), the information regarding which band contains the signal is lost or not captured.

In another implementation, instead of feeding the received RF signal into a splitter and combiner, a switch is used. This mitigates the poor SNR of the previous approach, but at the cost of greater complexity as logic is required to control the switches. In addition, timing constraints now exist on when the power detector output is valid. Also, because all bands are not monitored constantly (if a single antenna is being used), short uplink pulses may be missed (e.g., sending of a text message on one band while another band is being monitored).

In another implementation, the RF signal is routed from the antenna to a mixer. The mixer is also connected to a voltage-controlled oscillator (VCO). By controlling the VCO, the signal can be frequency-shifted. An advantage of shifting the received RF signal around is the ability to use a single filter. The bandwidth of the filter is chosen to be the bandwidth of the narrowest noncontiguous band to be detected. Wider bands are swept across in multiple steps. This approach has low attenuation and allows identifying the band of the signal. However, complexity is high as logic is required to control the switches and timing constraints now exist on when the power detector output is valid. Also, because all bands are not monitored constantly, short signals may be missed. A second implementation with the mixer and VCO includes shifting the received RF signal to a lower frequency for less hardware intensive analysis. With the RF signal shifted downward, Fourier Transforms and Inverse Fourier Transforms can be computed and processed with minimal delay.

In another implementation, the RF signal is routed from the antenna to a mixer. The mixer is also connected to a VCO. By controlling the VCO, the signal can be frequency-shifted into one of multiple-sized bandwidth filters. Filters are available to match the specific bandwidth of the bands of interest, so no sweeping is necessary—in contrast with the previously-described approach.

In each of the approaches above, one or more low noise amplifiers may be added to try to reduce SNR degradation due to attenuation. This is especially important in approaches that have high attenuation and medium-to-low power levels. Low noise amplifiers (LNAs) are preferably placed immediately after the antenna, immediately before the power detector, or both.

Splitters and combiners mentioned above are preferably chosen from two categories: lossy and lossless. Lossless splitters are not actually lossless, but simply minimize the loss to that which is physically necessary. For example, a 2:1 splitter will have half the power at each output as compared to its input, a 3:1 splitter will have a third of the power at each output as compared to its input, etc. Lossy splitters have a resistive element that increases losses beyond those minimally required. Lossless splitters typically require more circuit board space, and have a narrower bandwidth than lossy splitters.

In the above approaches, different components and different frequencies may have different degrees of attenuation. For example, multiple filters in parallel may have different degrees of attenuation in the passband. In this case, LNAs can be used to compensate for these differences. In dynamic implementations, such as those that use a switch or a mixer, the LNA can be tuned to compensate for the present configuration.

A fixed or variable attenuator could be used in place of the compensating LNAs mentioned above. This would most likely be used in combination with a fixed LNA. This approach has the advantage of being cheaper and using less power, but the disadvantage of decreasing SNR.

In another implementation, a field-programmable gate array (FPGA) is used to process the signals via a Fast Fourier Transform (FFT) or other Digital Signal Processing (DSP) techniques, which provide the speeds of the hardware implementation with the flexibility of firmware to create adjustments or fixes. For example, this approach enables the frequencies being monitored to be modified using a firmware update at a later date. This implementation could be implemented in any portion of the systems described above—including anywhere from analysis of the raw signal coming from the antenna to the DSP analysis of the power detector. In applications designed to determine whether or not there is a mobile device in the driver space of a vehicle, it is critical to eliminate, or minimize as much as possible, false positive determinations (i.e., when the mobile device is actually outside of the driver space of the vehicle).

One source of potential false signals includes cell towers. Cell towers transmit on downlink frequencies that are very close and sometimes directly following the uplink frequencies the above-described techniques and systems are designed to detect. There are a number of approaches for addressing this source of potential false signals.

In one approach, the filters being used are set to as narrow a bandwidth as possible. In another approach, a mixer with a narrow bandwidth filter is used to "zoom in" on the exact frequency of the signal. In another approach, the signal is monitored while the vehicle is in motion. Typically, as the vehicle moves, cell tower noise power will vary as the distance between the vehicle and the cell tower changes. In contrast, in-vehicle mobile device signal power remains relatively fixed even while the vehicle is in motion.

In addition to the uplink bands, the downlink bands hold useful information as well. Another method for helping determine the presence of a mobile device and checking for false positives is to monitor both the uplink and downlink pair of frequencies. By knowing the signal strength of the downlink towers, it is possible to estimate the power decrease or power amplification the mobile device will use when transmitting different distances to reach the cellular tower. For example, if the system detects a potential "rogue" mobile device through a certain uplink band, the system can then examine the paired downlink frequency as a power level comparison. If the mobile device is transmitting at very low power, then that means the cellular tower is nearby and the mobile device is not having to add more power into the transmitting antenna in order to maintain a communication link with the cell tower. However, if the mobile device is transmitting at a very high power, then that means the cellular tower is far away and the mobile device is amplifying its output to aid in maintaining a stable connection. The expected result for a mobile device being detected within the vehicle is that there will be a correlation between the power levels of the uplink and downlink bands.

Another method for helping determine the presence of a mobile device and checking for false positives is to use the signal strengths of the downlinks to determine thresholds for the paired uplink. This method utilizes all available data to help prevent false triggers. For example, if a very large signal strength in AT&T's LTE downlink band is detected, the system can adjust its threshold for AT&T's LTE uplink band to a lower threshold. Inversely, if AT&T's LTE downlink band signal is very low, the system can increase the threshold for AT&T's LTE uplink for mobile device detection. A cellular modem used by the system and installed inside a vehicle can also be used to help determine the downlink strengths of the carrier being used by the cellular modem. This approach allows for a faster calculation of the upload strengths and quicker mobile device detection than merely waiting for the mobile device to download data.

It will also be understood that anomalous or broken transmitters may emit power in any band, including the uplink bands monitored by the system. While these are not allowed by FCC rules, these signals nevertheless may still be present in real-world environments. It is possible to determine if signals are coming from anomalous or broken transmitters by monitoring such signals as the vehicle moves. Similar to determining if signals are coming from an external cell tower, the source of noise from anomalous or broken transmitters will vary as detected by the system antenna as the vehicle moves relative to such signal, while in-vehicle mobile device signal power will remain relatively fixed/stable.

The transmissions of mobile devices in other vehicles will, obviously, be in the uplink bands monitored by the system. Again, it will be appreciated that such signals in other vehicles will vary as the vehicle in which the system antenna is located moves relative to such other vehicles. In contrast, the in-vehicle mobile device signal power will remain relatively fixed during uplink periods. The signal power of a mobile device can adjust depending on the distance of the cell tower with which it is communicating, but that signal power adjustment will typically be a relatively low difference over time and, thus, should not significantly impact any of the implementations described above.

Another implementation uses the antenna of the main controller or control device to monitor all uplink bands by itself, without the aid of any other external sources, to determine if any mobile device is present and cellularly-active instead of being off or in airplane mode. For example, if a company's policies state that ALL mobile devices must be turned off or in airplane mode during trips and the system detects that a user is not following this restriction, an alert can be sent by the system to the administrator or contact point for the company.

Figure 7:
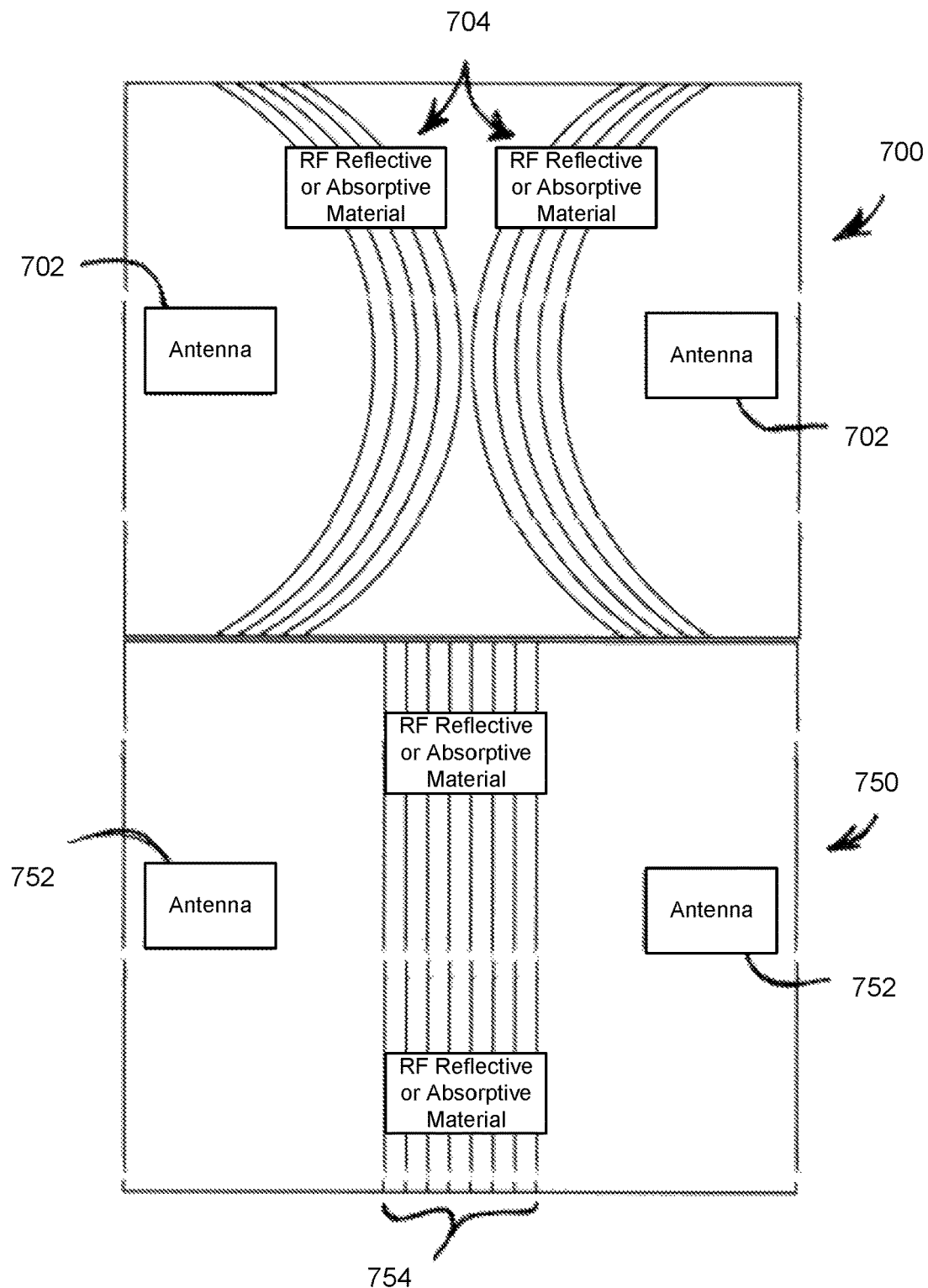
FIG. 7 is a top view of two different types of sandwich antennas for use with various embodiments of the present invention.

Since most restrictions and/or monitoring of mobile device usage within a vehicle are targeted at mobile devices within the driver's space of the vehicle, it is still necessary to be able to distinguish when the mobile devices is being used in the drive or passenger seat with the present system. For example, if the mobile device is in the passenger seat, the system will still detect transmissions from such devices in the uplinks bands, and the system will still be able to determine that the signal is coming from within the vehicle and not from a source outside of the vehicle. However, to distinguish signals coming from the driver's space and the passenger's space, the present system preferably uses the concept of an "antenna sandwich" 700, 750, as shown in FIG. 7. This is a device with two (either directional or omnidirectional) antennas 702, 752 placed on either side of a microwave reflective or microwave absorptive material 704, 754. This effectively restricts each antenna to pick up only signals from opposite hemispheres, where the sphere is split along the plane of the absorptive/reflective material. Transmissions from near the meeting of the two hemispheres will be received roughly equally. Maximum differentiation will occur along the axis perpendicular to the absorptive/reflective material. To increase the differentiation between the two hemispheres even further, the RF reflecting material is preferably parabolic, as shown by antenna sandwich 700, in contrast with the straight design of antenna sandwich 750. The orientation of the antenna sandwich is preferably selected during installation so as to maximize differentiation of the desired RF sources on either side of the absorptive material 704, 754. For differentiating between signals coming from driver versus passenger seats, the antenna sandwich is preferably placed between the driver and passenger, oriented such that the perpendicular axis passes through the centers of the driver and passenger spaces.

The above-described technique of an antenna sandwich can also be used to distinguish cellular signals originating from the front seat of a vehicle versus the back seat and, more preferably, between the driver's seat and the seat behind the driver. In contrast with distinguishing between a signal coming from the driver and passenger side of the vehicle, distinguishing between front and back seat requires a change in position and orientation of the antenna sandwich. Specifically, the antenna sandwich should be placed between the driver and the seat behind the driver, oriented such that the perpendicular axis passes through the centers of the driver space and the seat behind the driver space.

It should also be noted that the antenna sandwich technique can also be useful for identifying RF sources external to the vehicle as well, such as cell towers, mobile devices in other vehicles, mobile devices of pedestrians, and anomalous/broken transmitters. In these situations, an antenna sandwich mounted in/on/near the driver door may be helpful.

Using the antenna techniques described above, it is possible to distinguish cellular signals coming from a mobile device within the driver space versus cellular signals coming from the passenger space—again, without requiring specific software or apps being installed on such mobile devices for communicating with the control device or with distracted driving software, as described herein and in the cross-referenced patents and applications. This enables the system to implement any of the distracted driving, auditing, monitoring, and other solutions described earlier. In real world applications, cellular signals coming from either the driver space or the passenger space will still reach the "other" antenna (of an antenna sandwich) furthest from the source. Once the system has determined which antenna is closest to the mobile device being monitored, it may be desirable to remove noise or unwanted signals coming from other mobile devices that do not need to be controlled, managed, or monitored. One or more signal cancellation techniques, such as a Balanced-Unbalanced (Balun) Transformer, may be used to remove or distinguish the noise or unwanted signals from the wanted signals.

There are multiple ways in which the output of the power detector can be used to determine the presence of a mobile device transmission. In one implementation, an absolute threshold is used and whenever the power detector output exceeds that threshold, the system determines that a mobile device is "transmitting." In another implementation, the system establishes a noise floor and monitors for a minimum signal-to-noise ratio (SNR).

Taking the difference between the two received antenna signals of the uplink bands in an antenna sandwich provides other benefits and uses. In an implementation, the two cellular signals received by the antennas of the antenna sandwich are subtracted from each other and then analyzed by the system, preferably on the control device, using an isolated RF cable. Thus, for example, if the passenger side antenna is subtracted from the antenna closest to the driver, and the difference between the two power levels received is positive and their delta is greater than a predefined threshold, then it can be assumed that there is a mobile device in the driver's space.

In yet another implementation, the timing patterns that a mobile device uses in communication with a cellular tower are measured, and then the system analyzes for similarity among those timing parameters, potentially in addition to the techniques described above, to determine the presence of a mobile device transmission. Similarity can be measured using several digital signal processing (DSP) techniques, including but not limited to dynamic time warping.

In a finer-grained version of the above implementation, timing patterns can be studied to determine differences in these patterns in different operation scenarios, such as sending a text, making a call, or other data activity. Again, the system analyzes for similarity among those timing parameters using several DSP techniques, including but not limited to dynamic time warping.

In a practical implementation, the system uses multiple antenna sandwiches to assist in determining whether the mobile device is being utilized in the driver's seat/space. In one robust implementation, the system would preferably make use of up to five antenna/antenna sandwich configurations. The control device will typically include a built-in antenna. If no other antennas or antenna sandwiches are installed, this main antenna will be the primary factor for determining if a mobile device is actively being used inside the driver's zone of the vehicle. Due to the modularity of the design, multiple antenna sandwiches are optionally added for better detection results for different configurations, as will be described in greater detail in Example 1 below. If the driver usually has a passenger riding along, a preferred configuration preferably includes an antenna sandwich between the driver and the passenger. This is usually the first antenna sandwich that would be added to the vehicle. The output of this antenna sandwich will assist in determining from which side of the vehicle the mobile device signal is coming. If the driver typically has someone sitting in the back seat on most drives, then it is recommended to include an antenna sandwich between the driver and back seat passenger space. A five antenna configuration provides a highly accurate technique for ensuring that the system is able to isolate any signal coming from the driver's space as opposed to one of the passenger spaces within the vehicle. If false positives are frequently detected, then a third antenna sandwich can be installed between the driver and the driver's door. This would help eliminate any noise from RF sources external to the vehicle, such as cell towers, mobile devices in other vehicles driving past, mobile devices of pedestrians, and anomalous/broken transmitters. An additional antenna could also be added if the driver wanted to view his navigation app. Preferably, such antenna would be added to the cradle that would hold the mobile device.

The antenna in the control device preferably acts as the primary cellular signal detector. Any other antennas or antenna sandwiches included within the vehicle or controlled environment communicate with the control device using conventional wired or wireless communication techniques and protocols. Preferably, the control device is configured to determine if external antennas/antenna sandwiches have been installed within the vehicle or controlled environment and is further configured to determine if any such antennas or antenna sandwiches have been installed incorrectly or otherwise tampered with. For example, if the antennas of an antenna sandwich are installed in reversed configuration, the control device preferably includes software that is able to invert the logic and properly account for the orientation in which the antenna sandwich has been installed. For example, if there is an antenna sandwich between the passenger and the driver's seat and another antenna sandwich behind the driver's seat and if the main antenna and the antenna sandwich behind the driver determines that a mobile device is being used in the driver's seat, but the antenna sandwich between the driver and passenger has a strong passenger signal and weak driver signal, then the system has a strong confidence that the orientation of the antenna sandwich between the driver and passenger seats has been reversed. This installation determination would then be stored in memory in the control device to ensure that signals received from that antenna sandwich would be correctly oriented over time and across different trips.

Figure 8:
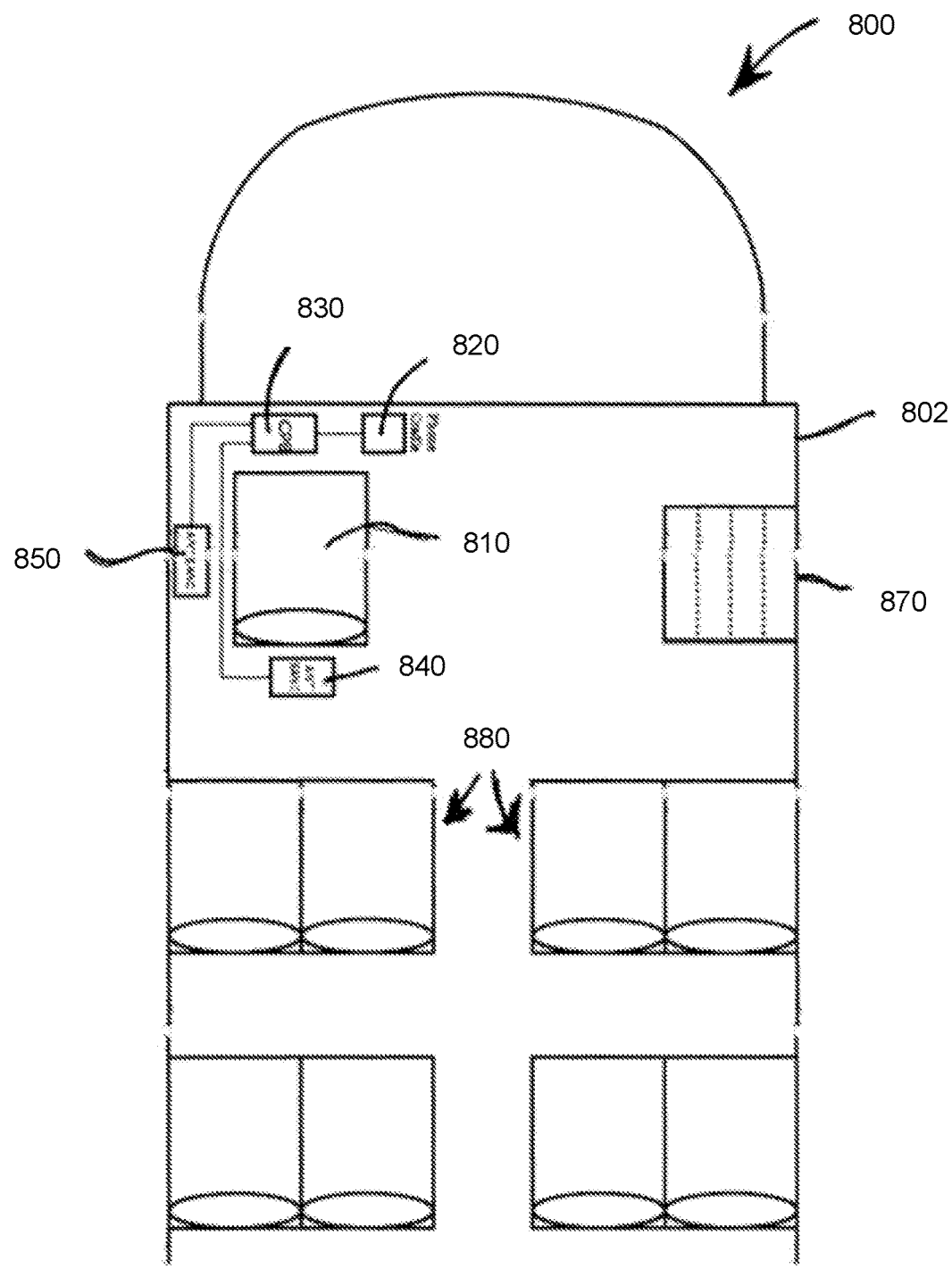
FIG. 8 is a top view of one exemplary implementation showing potential placement of a plurality of sandwich antennas from FIG. 7 within a commercial vehicle.

Example 1: Turning now to FIG. 8, an exemplary system 800 is illustrated for use in a charter bus 802 and includes a plurality of antennas and antenna sandwiches that are useful for determining whether a charter bus driver is using his mobile device, within the driver's space 810, while the vehicle 802 is in operation. Specifically, in this example, four antennas/antenna sandwiches are used, including one in the device cradle 820 on the assumption that the driver needs to view route details on a company-issued mobile device or navigation app. The first/main antenna is located in the control device (CPB) 830. The second antenna is in/on the mobile device cradle 820 to ensure the driver leaves the mobile device showing route details in the cradle. The third antenna/antenna sandwich 840 is preferably positioned behind the driver to determine a difference between mobile device transmissions coming from the driver's space 810 and from any mobile devices from the passenger space 880 behind the driver. The fourth antenna/antenna sandwich 850 is used between the driver 810 and the driver's door/window to reduce the number of false positives from external sources. As can be seen, no antenna is placed between the driver space 810 and the main passenger door 870 to avoid interfering with passengers entering the vehicle. In addition, any noise RF signals that are external to the vehicle beyond the passenger door are likely to be far enough away that an antenna sandwich on that side of the vehicle is less necessary.

If it is assumed that the driver's mobile device starts transmitting from the driver's seat while the vehicle is in operation, the system will see all driver facing power detector outputs sending logic back to the control device that a signal in the uplink band has been detected. The system would compare these outputs from the non-driver power detectors and see a larger SNR and amplitude from the driver facing power detector outputs, proving that the driver's mobile device is being used. This would then be noted and can be reported back to the company administrator overseeing the driver's account at an appropriate time.

If a passenger behind the driver uses a mobile device, the system will detect a strong signal on the passenger-facing power detector output of the antenna sandwich 840 behind the driver and a weak signal at all other locations watching for uplink transmissions from the driver's zone 810.

If the driver and the passenger sitting behind the driver both decide to use their mobile devices at the same time, the uplink transmissions may occur simultaneously, or non-overlapping in time. If they occur simultaneously, then the output of the control device 830 and the antenna sandwich 850 between the driver and his door/window would show that the driver is using his mobile device, but the antenna sandwich 840 behind the driver would also determine that there is an active signal in both the driver and the passenger zones, which the system can dismiss since the system will already have received outputs from two other sources that the mobile device of the driver was being used during vehicle operation. If the uplink transmissions are non-overlapping in time, then each transmission can be handled independently on a moment-by-moment basis as described above for driver-only and passenger-only transmissions.

If the mobile device is removed from the driver's device cradle 820, this can be detected in several ways. In one implementation, the system simply sees the signal amplitude for the mobile device decrease at the cradle antenna, while not changing appreciably at the other antennas. In another implementation, this process can be augmented by monitoring changes in downlink signal strength to help determine what changes, if any, in uplink signal strength the system should expect. In further embodiments, the mobile device cradle 820 is equipped with a proximity sensor that detects the presence of the mobile device within the cradle using conventional techniques, such as infrared beam breaking, ultrasound, etc. In another embodiment, the above-described implementations may be combined to provide an even more robust solution. If the mobile device is detected as having been removed from its cradle, the system determines, according to a predefined policy, what action to take to prevent use of the mobile device, log the event, or initiate a real-time or subsequent notification to the company administrator, as appropriate.

If the hardware allows the system to determine which band contains the RF transmission, the system can determine the cellular carrier of the mobile device transmission. By using the band in which the mobile device transmits, along with the mobile device's geographic coordinates, the system can then use the FCC database of spectrum owners to determine which provider owns that uplink band in that area.

In some situations, similar to the charter bus example described above, it may be desirable for the driver to continue to have access to a mobile device while driving, but without allowing handheld operation. For example, the driver may need to be able to place/receive calls or be able to see a map. The system can accommodate this scenario by having a custom mobile device cradle in the vehicle. This mobile device cradle or holder preferably has a receiving antenna built onto or into the case, where it will receive much higher signal strength than any other antennas and/or antenna sandwiches within the vehicle. Further, the holder preferably uses RF absorptive material to minimize the strength of the signal leaving the holder and reaching the other antennas and/or antenna sandwiches. This requires proper placement of this material so as to minimize that signal while still allowing the mobile device to operate. A central processor in the control device will then analyze the precise timings of signals from the various antennas to make sure the system is correctly identifying the same signal detected by each antenna. Once the system knows a single signal from multiple antennas has been identified, the system evaluates relative signal strength to determine whether or not the mobile device is in the holder, using a simple threshold criteria. If the holder does not have RF absorptive material, the system preferably uses signal cancellation techniques to take the mobile device in the holder's transmissions out of the signals received from the other antennas or antennas sandwiches. The custom mobile device holder may include additional feature, such as charging or inductive charging functionality.

In another implementation, the mobile device holder may be an off-the-shelf conventional device cradle, but having an antenna or antenna sandwich affixed to the back side of the cradle. In this implementation, the difference in signal strength (SNR) between the cradle antenna and other antennas in the vehicle will be lower than in the scenario of a custom mobile device holder, but will still be sufficient to determine if the mobile device is in its holder.

When there is an allowed mobile device in the vehicle, placed in its holder or cradle, it may still be desirable for the system to detect the presence of other mobile devices in the driver's area of the vehicle. The system must subtract out the signal from the allowed mobile device. In one implementation, the system determines on which band the allowed mobile device is operating, and ignores that band at all antennas when looking for additional mobile devices. Most mobile devices will use different uplink bands depending on the activity (mobile device call versus data transmission, for example). Therefore, the "band white-listing" must be used in conjunction with a time component, monitoring how the emissions from the allowed mobile device change over time, and modifying which band is white-listed. In one implementation of band white-listing, a hardware notch filter is preferably used. The system may switch between several notch filters—depending on the active frequency of the allowed mobile device. These notch filters may be implemented via standard hardware or software techniques. In another implementation, where multiple bandpass filters are used, one for each uplink band, the output of the bandpass for the active band of the allowed mobile device may simply be attenuated.

In another implementation, the transmitting band of the allowed mobile device is ignored, and only the time when the allowed mobile device is transmitting is examined. In this implementation, those times are determined by relative signal strength between the holder antenna and other antennas. If it exceeds a predetermined SNR threshold, the system determines that the signal is coming from the allowed mobile device. Then, for that moment, input from all antennas in the vehicle are not considered when looking for unauthorized mobile devices. The signal during that time may simply be ignored, or may be replaced by a "background" signal, where the necessary qualities of that background signal will depend on the algorithm used for further analysis. For most purposes, the replacement signal would need to have a power spectral distribution similar to the quiet periods before and after the allowed mobile device transmission period.

Determining Location of Mobile Device in a Vehicle without Use of a Control Device Numerous procedures for determining the location of a mobile device within a vehicle, whether in the driver quadrant or in a passenger quadrant, using the control device of the present invention, are described in detail above. However, there are other procedures and techniques described in greater detail below, using suitably configured applications or software components installed or embedded on the mobile device, that can be used by such mobile device to determine its location within the vehicle.

In one embodiment, the location of the mobile device can be determined based on common engine noises and frequencies. For example, when driving, the left side of the engine will generate different sound patterns than the right side. Using this information, it is possible to determine if the mobile device is on the left or right side of the vehicle. After determining the vehicle's year/make/model, the mobile device would download a configuration file for the year/make/model of the current vehicle. This configuration file contains parameters for this vehicle, which can then be loaded into variables used by a combination of DSP and neural network algorithms. These algorithms are then used to determine the position of the mobile device within the cabin of the vehicle. In an alternative implementation, the mobile device preferably already contains all known configurations and can process the sounds without downloading additional information. In yet another implementation, the recorded sound capture will be sent to the cloud for further processing and to match the sound with the appropriate vehicle and to determine the quadrant in which the mobile device is located.

In another embodiment, the location of the mobile device within a vehicle or other closed environment can be determined by using various sensors on the mobile device. One such sensor is the magnetometer found on many mobile devices. When the mobile device is on the left side of the vehicle, the left door speaker will be closer than the right door speaker. Using this information one can determine if the mobile device is located in the driver quadrant. Accuracy of this will depend on orientation of the mobile device relative to the vehicle. However, this is not an issue, since the mobile device will typically be held in a common position when the driver actually tries to use it. Further, orientation of the mobile device relative to the ground can be helpful as well. In some situations, the magnetometer reading may be best utilized relative to the other mobile device located within the vehicle to account for other magnetic instruments distorting the signal. The comparison data can be sent to a cloud-based server, or transmitted locally among the mobile devices located within the vehicle. In another implementation, using a combination of sensors on the vehicle, such as magnetometer, accelerometer, gyroscopes, and other common sensors, it is possible to determine the approximate location of a mobile device within the vehicle. For example, when a vehicle makes a right turn, the vehicle tilts on its suspension. The side closest to the right side will feel a force pushing downward while the side closest to the left side will feel a force rising upwards while the suspension tilts. Utilizing this information, mobile devices within the vehicle can make assumptions about which quadrant it is likely located. This processing could happen individually with each mobile device, or in a manner in which the information is shared amongst the mobile devices within the vehicle either locally utilizing Bluetooth or other short range signals, or by uploading the data to a cloud-based server for further processing.

With regard to the orientation of the mobile device relative to the vehicle, another technique may also be used. The mobile device can determine the heading, and thus orientation, of the vehicle via GPS. Additionally, the mobile device can determine its own orientation via magnetometer and tilt sensors. Thus, the mobile device can determine its orientation with respect to the vehicle. The vector seen by the magnetometer of the mobile device may change as the mobile device rotates. However, it may also change as the position of the mobile device relative to a speaker changes. The mobile device can differentiate between these two conditions by looking for corresponding changes in the gyroscope to correlate with the observed rotation seen by the magnetometer. If there is no correlation, then the mobile device may be near a speaker. This information, combined with determination of its orientation relative to the vehicle, allows the mobile device to identify if it is near a speaker on the right side or the left side of the vehicle, allowing yet another method for driver identification.

In yet another embodiment, Bluetooth signal strength can be used. The mobile device with the highest Bluetooth signal strength relative to the control device would likely represent the mobile device closest to the control device. Again, this signal strength information, along with the model information of the mobile device and its orientation to ground, can be sent to the cloud, where variances in model sensitivity of the mobile device to Bluetooth at a given orientation can be taken into account.

In another embodiment, a challenge and response system can be used. If the control device is configured with a means of detecting cellular signal usage in the driver's seat area only, the control device can issue a challenge to each mobile device in the vehicle. For mobile device A, the control device may request the mobile device to make multiple quick data connections. If the control device detects that the mobile device in the driver seat performs this action, the driver mobile device would be identified. The control device would then issue a challenge to the remaining mobile devices. After each challenge/response session, the control device will have determined which mobile device(s) are located in the driver quadrant and policy can then be applied accordingly to all the mobile devices in the vehicle. If the control device is capable of differentiating calls vs. SMS vs. data transmissions, some combination of these may be used for more sophisticated challenge/response sessions.

Another embodiment, using cellular signal detection, can be implemented without requiring software to be installed on the mobile device. In this implementation, the control device monitors usage of the mobile device and compares generated signals to the known activity generated by mobile device(s) potentially used by the driver. For example, assume that the control device detects two (2) incoming SMS messages and one (1) outgoing SMS message at times x, y, and z, respectively. By comparing usage details contained within the carrier's network at times x, y, and z, the mobile device positioned within the driver's quadrant could be identified in real time. Once the proper mobile device has been identified as being in the driver quadrant, usage of the mobile device can be shut off within the carrier's network, or a signal can be sent to software running on the mobile device instructing it to block further activity.

The mobile device in the driver quadrant can also be narrowed down and/or identified without any activity manually being generated by the mobile device. For instance, by detecting patterns in the cellular signal generated by the mobile device in the driver quadrant, the model of the mobile device can be determined—which can further aid in identifying the mobile device. The method for detecting patterns within the cellular signal uses all methods known in the art, including neural networks and other AI methods. In addition to detecting patterns, signals can be generated by the carrier network and then detected locally within the driver quadrant. An example would be for the cellular network to send information to each mobile device within the vehicle and potentially within the driver quadrant of the vehicle. The control device would then match the generated signal with the appropriate mobile device.

In another embodiment, consider the scenario in which there is a mechanism to detect data bursts from the mobile device in the driver quadrant. This procedure is capable of building a data set of when the mobile device in the driver quadrant and what data is used over time. Consider, also, that there is an application on each mobile device in the cabin that monitors data usage on the mobile device over time or monitoring is provided through the carrier network without requiring an application on the mobile device itself. Mobile devices periodically perform data transactions even when in standby, such as checking email or Facebook status. Clearly, all of these data sets can be uploaded to a server, where they can be processed and a correlation found between the data set from the data detection mechanism for the driver quadrant and the data set from one or more other mobile devices in the vehicle. These correlation results can then be sent back down to the mobile devices within the vehicle, letting the mobile devices determine whether they are in the driver quadrant or in one of the passenger quadrants. Instead of uploading the data for processing via a server, the data may also be processed in-cabin using local communication techniques to transmit the data to a processing unit. The data may be transmitted via audible sound, ultrasonic sound, Bluetooth, BTLE, WiFi, NFC, infrared, visible light, or other mechanism. The processing unit may be one of the mobile devices itself or an application installed on one of the mobile devices, may be installed on or part of the control device, or may be a dedicated processing unit or processor installed on or within the vehicle.

In another embodiment, it is possible to use more than one mobile device to record or detect information from various sensors: GPS, accelerometer, manometer, light detector, camera, etc. The information can then be collected and compared to one another—either locally or within the cloud—to help determine the relative location of the mobile devices within the cabin of the vehicle. For example, imagine a scenario in which two mobile devices are running system software and collecting GPS location. GPS is typically accurate within a few feet. If, over the course of a drive (or vehicle outing), one mobile device continually reports a GPS location slightly to the left of the other mobile device, it could be determined which mobile device is the driver quadrant and which is in the passenger quadrant—depending upon the country and type of vehicle, and based on whether the driver of the vehicle is likely positioned to the right or left of passengers in the vehicle. Similar data could show whether one mobile device is further to the front or rear of the vehicle. Such data can then be used to determine which mobile device belongs to the driver. Similar scenarios could be constructed using any number of sensor data collected. Comparing the relative tilt or angular acceleration recorded by the mobile devices while turning represents another data point that may be used to advantage.

In another embodiment, it is possible to use an application installed on the mobile device, such as iBeacon, which is capable of transmitting a BTLE transmission, which can be detected and responded to by an OBDII device or control device. The BTLE data exchange provides distance data that can be used by the mobile device to determine how far away it is from the responding OBDII device or control device. Such distance data can be used alone, or in conjunction with one or more of the device location techniques described herein, to determine the likely location of the mobile device—whether in the driver quadrant, front seat passenger quadrant, or back seat passenger space.

All of the methods for determining or aiding in determining which mobile devices are located within particular quadrants (whether using the control device or not) could be used in various combinations with one another. While the methods are presented herein individually for ease of explanation, a real world solution can use one or more of these techniques for more accurately determining the location of mobile devices within vehicles.

Applications Making Advantageous Use of Device Location and Vehicular Status Data (1) Distracted Driving Applications for Conventional Mobile Devices In a distracted driving prevention or risk reduction system, there is a significant need and it would be very advantageous to be able determine the location of a mobile device within the vehicle—whether in the possession of the driver, a front seat passenger, or a passenger in the backseat. Once the location (or relative location) of the mobile device is known within the vehicle, the distracted driving prevention or risk reduction system can be configured to behave differently with different mobile devices—based on such location determinations.

For example, in some circumstances or applications, only the driver's mobile device needs to be blocked (i.e., monitored, controlled, etc.)—while the passenger devices (front seat and/or backseat) are allowed to remain unaffected. Alternatively, there may be circumstances or applications in which it is desirable for the system to be configured to block all mobile devices regardless of which mobile device is in the driver seat, or to open up certain aspects of the mobile device for non-drivers.

Preferably, such distracted driving prevention or risk reduction are designed to improve upon the safe operation of a vehicle by a driver who has a mobile device, by limiting, controlling, managing, or preventing use of some or all functionality of the mobile device while the vehicle is in operation by the driver and/or in motion above a threshold speed, whether in reverse or forward direction. Preferably, a default or configurable policy, rule base, or set of protocols are installed on, uploaded to, or otherwise accessible by the mobile device to define what functionality of the mobile device is limited, controlled, managed, or prevented and under what circumstances.

Preferably, the distracted driving prevention or risk reduction applications described herein use rules-based policies that are defined and targeted to individual users, devices, and vehicles, or they may be targeted to fleets of vehicles and selectively to groups or subgroups of employees or other categories of people using a centralized policy distribution and management system.

Preferably, there are one or more "default" or pre-defined policies usable and pre-configured for individual or corporate users and for different types of mobile devices—based on the capabilities and functionality of such mobile devices and based on the typical functions of the mobile device that are prevented, based on when such functionality needs to be prevented, and based on what functionality should not be prevented or is selectively permitted (such as the ability to make an emergency phone call, access a GPS map application, and the ability to text or call to or from specific numbers or people included on a "white" list or permitted list).

In addition, some companies may want to allow some of their corporate software applications to be accessible to their employee drivers even while operating a vehicle, as part of their job. The system allows an administrator to define customized policies for individuals or for larger groups of people (e.g., all family members, all kids in the family, employees of a division, specific types of employees, or all employees of the company, and the like). In a preferred embodiment, mobile devices and/or vehicles that are not integrated into the system or that do not have suitable system software application(s) installed on the mobile device will not be impacted or interfered with by the system.

Preferably, the vehicular status data provided by the control device and transmitted to the mobile device is used by software application installed on the mobile device, along with the mobile device location determination, to limit, control, manage, or prevent use of some or all functionality of the mobile device based on the applicable rules-based policy in effect on the relevant mobile device.

Once it has been determined which mobile device(s) within a vehicle should be disabled, the user must be prevented from accessing some or all functions of the mobile device, based on the policy associated with the user, with the vehicle, or with the mobile device—as may be customized based on environmental or other factors, such as location of the vehicle, time of day, weather conditions, etc.

Preventing a user from accessing specified functions of the mobile device may be accomplished in a number of ways. For example, one way to prevent access to all functions of a mobile device is to continuously display pop-up dialogs on the screen of the mobile device. These would appear at a rate such that no matter how fast the user dismisses the box, he never has time to access any function of his mobile device. Another way is to continuously throw up a full screen dialog or screen, potentially containing graphics and text. All touchscreen presses will be intercepted and thrown away by this dialog. Pressing the home button will simply cause the dialog to disappear for a very short time, due the continuous nature of its appearance. Another way is to allow the user to attempt to access some functionality of their mobile device, but to immediately close any application that is opened by the user. This may be accompanied by displaying a dialog box or other notification warning the user to be safe.

(2) Distracted Driving Applications for Apple iOS-Types of Mobile Devices

Traditionally, distracted driving prevention and risk reduction systems have relied on a software application installed on or accessible by the mobile device located within the vehicle that receives a signal that then triggers a restriction of usage of the mobile device. This signal may originate locally from a sensor on the cell phone, such as GPS or accelerometer, or may originate from an external device either in the cloud or communicating over some wireless protocol (such as a transmission from the control device). Once the application receives or detects the trigger signal, the application on the conventional mobile device itself implements the usage restriction of the mobile device—thus, interfering with all or selected other applications and functionality of the mobile device. A common mechanism to perform mobile device blocking is to simply put up a screen on the mobile device that prevents the user from interacting with other applications. In addition, many applications will also watch for incoming/outgoing calls and forcibly end a phone call using APIs supplied by the operating system on the mobile device.

This well-established mechanism has worked well for most types of mobile devices. However, several manufacturers of mobile devices, such as Apple, do not allow one installed application to "interfere with" other applications on the mobile device. This restriction or prohibition has prevented distracted driving software applications from working on these platforms. Even if one could design a solution or means to enable one application to restrict usage of other applications, such distracted driving solutions must still be submitted through Apple's application review and approval process, which results in such application not being approved for sale or support through the Apple App Store, since such an application violates Apple's standard "application terms of service."

For these types of platforms, a different method for device restriction can be implemented. Instead of relying on the application installed on or accessed by the mobile device to perform the actual usage restriction, it is possible to use an external hardware device (in this case, the control device) to provide a data transmission or other communication to the iOS device that causes the OS of the mobile device to implement the desired restriction without requiring the application installed on or accessible by the mobile device to impose the restriction itself on another application or function on the mobile device.

(a) Preventing Prohibited Activities on a Mobile Device Using OS Level Commands Transmitted from an External Control Device Mimicking a HID For example, many mobile devices have supported external keyboards for a number of years. These external keyboards operate on standard protocols, such as HID (human interface device) or HID over GATT, for Bluetooth low energy applications.

Utilizing these established protocols, a system can be developed that is capable of restricting usage on these mobile platforms. For example, when the mobile device user opens an application, such external hardware device will receive a signal indicating improper usage and transmit a "key press," which has the same effect as if the user had pressed a key on an external keyboard. In most cases, a key press such as "home key" or "power key" is desirable. In the example in which a user opened or attempted to use an inappropriate or unauthorized application (e.g. based on the rules-based policy), it is possible to transmit a "home key" press, which would have the effect of minimizing this inappropriate or unauthorized application. This produces the desired effect of application restriction. This opens up a whole new class of mobile devices, which can implement a distracted driving policy and not have to worry about the application not being approved.

This mechanism could also be utilized in standalone manner—without any application needing to be installed on the mobile device. In this implementation, the external hardware device (e.g. control device) sends appropriate key presses on set intervals making it very difficult for a user to continue normal operation of the mobile device. In a preferred embodiment, it is possible to use both a software application and an external hardware device. The software application would be similar in communication and functionality as the other applications described herein. However, the primary difference is that at least part of the mobile device restriction would require the external hardware device sending the equivalent of key presses over a protocol, such as HID. The software application on the mobile device would alert the external hardware device of improper usage, which would then trigger the sending of the key presses. In this example, this type of application could likely be approved since it would not directly violate the manufacturer's application terms of service. In particular, such application does not restrict usage of other applications. Instead, it simply informs an external hardware component of the current state of the mobile device. The external component then issues whatever commands are appropriate, based on state of the mobile device, vehicle state, and policy.

(b)(i) Preventing Prohibited Activities on a Mobile Device Using ANCS Notifications Transmitted Between an External Control Device and the Mobile Device It will be appreciated by those of skill in the art that APPLE®-branded mobile communication devices often trail ANDROID®-branded mobile communication devices due to Apple Inc.'s tighter control of permissions associated with applications (or apps) installed thereon. However, it is possible to provide many mobile device control features and distracted driving functionality, which are more easily implemented or only available on an ANDROID®-branded mobile communication device, on an APPLE®-branded mobile communication device by making use of APPLE® Notification Center Service (ANCS) protocols currently used by APPLE®-branded mobile communication device that use Apple's iOS operating system (hereinafter an "iOS device").

The novel solution disclosed herein takes advantage of the connection established between an external BTLE device and an iOS device. Specifically, the external BTLE device is permitted, by Apple's iOS operating system, to interact with the ANCS service on the iOS device (called a "Notification Provider" within the ANCS protocol). The external BTLE device (called a "Notification Consumer" within the ANCS protocol) may be integrated into a DriveID or OBD transmitter type device (as described in the patent and patent applications incorporated herein by reference and identified above), enabling such existing DriveID or OBD transmitter type device to piggyback on the existing BTLE connection. Alternatively, the DriveID or OBD transmitter type device itself may be configured to be the external BTLE device itself that is configured to interact with the ANCS service on the iOS device.

One feature enabled by the ANCS protocols is the ability to block incoming calls directed to the iOS device. Currently, Apple, Inc. does not include or permit an iOS API to end incoming calls. For this reason, existing distracted driving solutions installed on iOS devices have struggled with fully preventing inappropriate phone usage because of the restrictions imposed by Apple, Inc. However, by sending a "negative" action in response to the incoming call notification using the ANCS protocols, the present invention is able to terminate/end calls before the user has had a chance to answer the call.

Another feature enabled by the ANCS protocols is the ability to auto-answer incoming calls. By sending a "positive" action in response to the incoming call notification using the ANCS protocols, software installed on the iOS device is permitted to answer the incoming call. This functionality is useful in some contexts, especially when combined with the ability to filter which incoming calls are ended or auto-answered. Using information obtained from the ANCS protocols, in combination with available iOS APIs for accessing contact information, the present system is able to determine the phone number of the caller. With this information, it is then possible, based on predefined list of known numbers, to define lists of phone numbers whose incoming calls will be either ended, auto-answered, or neither.

Another feature is the ability to auto-respond to SMS messages that are received by the iOS device while the user of the iOS device is driving or operating a vehicle. Using the ANCS protocols to determine the phone number of the SMS sender, the system can be configured to communicate with an SMS sending service (from the iOS device, from the external device, or relayed via a server) to send a response SMS to the sender. In one implementation, the system can be configured to use the iOS device phone number as the "sender phone number" when interacting with the SMS sending service. However, in many countries, including the United States, SMS spoofing is not technically feasible. In those cases, the auto-response SMS preferably will originate from a third-party number.

Another feature is the ability to read incoming SMS messages aloud or audibly to the user of the iOS device—which is especially useful when the user is driving or operating a vehicle. Using the ANCS ability to access the content of the incoming text, along with existing iOS APIs for performing text-to-speech functions, the present system is able to audibilize the content of an incoming text message to the iOS device user. This feature can further be enhanced by providing mechanisms or policies that permit the iOS device to read SMS messages aloud if but only if the SMS originates from certain predetermined "white listed" phone numbers.

All SMS message functionality can be filtered based on white lists or black lists, in a method analogous to incoming calls, using the ANCS ability to determine the sender of the SMS message.

Another feature is the ability to remove notifications from the lock screen and notification shade of the main display screen of the iOS device. Normally, on iOS devices, when a notification for SMS message, email, or other activity is generated, it is visible on the lock screen, as well as in the shade accessible from the lock screen. Part or all of the content of the message may be visible. This capability, while useful to the user, presents an undesirable distraction when the user is driving or operating a vehicle. Sending a negative action to such notifications via ANCS allows the present system to remove these notifications from the lock screen and lock screen notification shade and, thus, reduce potential distractions to the user of the iOS device.

Another feature is the ability to audit distractions while driving using ANCS. Each time a notification comes in, the system is able, using ANCS, to record the time, app, and app category that generated the notification. This data can then be aligned with driving time to determine how many notifications, and from which apps (or types of app), are coming in while the user is driving or operating a vehicle. Such data can be extremely useful from an auditing, legal, or insurance policy perspective to assess the risks from distracted driving and identify the source(s) of the distraction.

This detailed information can be captured by the system whether it is merely operating in an "audit" mode or when it is operating in a distracted driving "protection" mode, for example. Further, this information can be analyzed against driving behavior to determine how incoming notification messages from various applications affect the user's driving ability. For example, it is possible to correlate braking events, acceleration events, and other negative driving behaviors to the exact notification or phone event that caused or occurred at the same time as such behavior. This type of data can have huge ramifications as it relates to pricing insurance based on device usage while driving or operating a vehicle.

In one implementation, the external device parses and interprets ANCS notifications when interacting with the ANCS service. The external device can then formulate ANCS responses—such as sending a negative action back to the ANCS service operating on the iOS device to end a phone call and/por dismiss notifications off of the user's screen. In some instances, positive actions, such as answering a phone call, may also be warranted. The determination to send negative actions, positive actions, or no response at all can vary based on the environment and settings/policy determined by or on behalf of the user. For instance, while stopped at a red light, the iOS device may chose not to end phone calls or dismiss messages whereas, while moving, it may be desirable for the system to be configured to send negative actions so that the ANCS service terminates the distracting activity or screen notification.

In another implementation, the external control device simply relays ANCS data, byte-for-byte, back to an application running on the iOS device. The iOS app (or a remote server) is then responsible for parsing and interpreting ANCS messages. This minimizes load on the external control device and allows for greater flexibility in determining responses and evaluating the environment. In this case, custom BLTE characteristics can be configured for transmitting the ANCS messages (notifications and actions/responses) back and forth between the external control device, one or more applications running on the iOS device, and the iOS device itself. Any combination of BTLE custom characteristics can be used for relaying ANCS messages back and forth, sending vehicle state information, and retrieving data to and from the external control device and the iOS device and/or applications running on the iOS device.

The following is just one example of how this service could be implemented:

1. An external control device containing a BTLE compatible Bluetooth module is paired/authenticated with one or more iOS devices. In this example, the external control device may be a DriveID type of hardware component, an OBD installed hardware device, a standalone device, a device integrated directly into the vehicle or with the vehicle's on-board computer, a device located on another smart phone or other device, or any device that is external to the target iOS device from and for which it will receive information;

2. The iOS device receives an SMS message;

3. ANCS passes the SMS message information to the external BTLE device as an ANCS notification;

4. The external device processes the SMS message and determines, based on the user's "distracted driving" policy settings, that the message should be "blocked" from being viewed by the user of the iOS device;

5. A negative action is then sent using ANCS from the external control device to the iOS device;

6. The iOS device processes the ANCS response (negative action) and removes the notification from the user's notification bar and lock screen—preventing the user from being distracted.

Further, the above example could be extended such that the ANCS message is also transmitted to a remote server, remote application which may be running on the target iOS device or other iOS devices, or to another external device such that the message could then be recorded for auditing purposes. Alternatively, such message could then be further analyzed and compared with other data to make a more informed decision on what, if any, ANCS response should be transmitted.

The following is another example of how this service could be implemented:

1. A BTLE module is included or installed in an external control device, such as a DriveID component;
2. The iOS device receives an SMS message;
3. ANCS passes the SMS message to the DriveID component as an NACS notification;
4. The DriveID component passes the selected information obtained from the ANCS notification back to a distracted driving application, which is installed and running on the target iOS device. The DriveID component may also pass vehicle status or state data, such as speed, to the iOS device;
5. The application installed and running on the target iOS device processes the selected information and any other information provided to the iOS device or otherwise independently determinable by the iOS device (such as vehicle speed, location, whether the iOS device is on the user or passenger side of the vehicle, etc.), compares the selected information and other information to various distracted driving settings or policies established for the user;
6. The application on the iOS device then formulates a desired response to the ANCS notification and sends it back to the DriveID component;
7. The DriveID component then transmits the desired response in the form of an ANCS action back to the target iOS device, whereby that the ANCS service can process the ANCS action and perform the action desired by the application (but by-passing the iOS restrictions imposed on the application from interfering directly with the underlying activity or functionality of the iOS device).

It should be noted that while SMS is used in the above examples, the above processes can also be performed for Skype (or similar VoIP) messages, emails, calls, third party app notifications, etc.

The ANCS service on iOS devices requires that the two devices (the external control device and the iOS device) to be paired. This can create a burden in families with multiple cars or in commercial vehicle fleets in which there may be hundreds or even thousands of different vehicles. The present system allows the end user to pair the target iOS device to only one unit and, thereafter, share the "pairing" among one or more external control devices.

This is accomplished by using a combination of an application running on the target iOS device and the external BTLE device. When the initial pairing is completed, the pairing/bonding keys and all relevant information is transmitted from the external BTLE device to the application running on the iOS device. This information is then stored locally and/or on a remote server.

From this point forward, the iOS application has all the information required to force a different external BTLE device to "mimic" the BTLE device with which the iOS device was originally paired. In this way, the iOS device believes that the BTLE external device with which it is currently communicating is the "original" device with which it established a Bluetooth pairing—allowing the iOS device and ANCS service to function correctly without requiring a new Bluetooth pairing.

Here is an example of how this is implemented in a DriveID component, as described in the above referenced patents and patent application incorporated by reference:

1. A BTLE module is installed in or otherwise built into the DriveID component;
2. A system application is installed and running on the target iOS device;
3. The target iOS device and the DriveID component begin a pairing sequence;
4. Once the pairing is complete, the DriveID component sends the pairing keys, MAC address, and all relevant information to the iOS application, which is then stored (either on the iOS device or a remote server in communication with or otherwise accessible by the iOS device);
5. The target iOS device can then be carried and used in a new vehicle and communicates with a new DriveID component that is unique to or associated with the new vehicle;
6. The iOS application sends the keys, MAC address, and other relevant information to the DriveID component in the new vehicle;
7. The DriveID component then changes its MAC address and keys to match the received information;
8. The iOS device and ANCS service then connects to the DriveID component in the new vehicle in an authentication fashion as the two devices are now "paired."

(b)(ii) Preventing Prohibited Activities on an iOS Mobile Device by Creative Use of CallKit API Protocols As stated above, it is well known that APPLE®-branded mobile communication devices often trail ANDROID®-branded and other mobile communication devices in software application ("app") development and functionality, primarily due to Apple Inc.'s tighter control of permissions associated with apps installed thereon and restrictions that general prohibit $3^{rd}$ party apps from interfering with or blocking the functionality of other $3^{rd}$ party apps and core device functionality built into the APPLE®-branded mobile communication devices. However, Apple, Inc. recently released a new public application program interface (API) in its version 10.0+ iOS operating system. This new API is called "CallKit," and the solutions described herein take advantage of the "CallKit" API to provide distracted driving and other management and control functionality of iOS mobile communication devices in ways and for purposes beyond those purposes specifically intended by the "CallKit" API.

The intended purpose and use of the "CallKit" API is to allow for Voice Over IP (VoIP) applications (e.g., Skype™ and similar VoIP applications) to have tighter integration into the iOS and core functionality provided on iOS devices. As explained in a press release introducing iOS version 10.0, Apple, Inc. stated that the "CallKit framework . . . lets VoIP apps integrate with the iPhone [user interface to] give users a great experience." The framework enables users to "view and answer incoming VoIP calls on the lock screen and manage contacts from VoIP calls in the iPhone app's Favorites and Recents views." The press release states further that "CallKit also introduces app extensions that enable call blocking and caller identification."

This tighter integration allows a VoIP application installed on an iOS device to trigger the native phone application on the iOS device—both on the Lock Screen and when the device is unlocked and in use. This screen can be triggered in response to an incoming call, an active call, or an outbound VoIP call. For example, when a VoIP application notifies the iOS that there is an incoming call, the iOS will display the native phone app and indicate from whom the call is coming. As with conventional incoming calls to the iOS device, the display of a VoIP application using the CallKit functionality interrupts the user's current activity and becomes the "foregrounded application." This foregrounding will display over incoming SMS and other notifications, applications the user was using, and other processes. In addition, the triggering of the phone application is based on API calls that the VoIP application makes to notify the iOS that there is an incoming, outgoing, or in-progress VoIP call. However, no actual VoIP call has to be present for the VoIP application to trigger and make use of the CallKit functionality, as will be described hereinafter.

While this API is useful for improving the experience of VoIP applications on an iOS device, the level of control and discretion given to a VoIP (or any other) application incorporating the CallKit API makes it possible to display the phone application at will, which, in turn, enables the API to be used for other unintended but creative purposes. Such unintended but creative purposes include (i) helping to reduce distractions to a user of the iOS device when the user of the device is driving a vehicle or (ii) restricting, monitoring, or controlling selected functions of the iOS device when it is in a predetermined location or environment in which it may be desirable or necessary to limit or prohibit some functionality of the device (such as in a movie theatre, in a hospital, in a school, or in any other environment or area in which device usage needs to be controlled, monitored, or restricted).

For example, a conventional distracted driving application (as described in the applications and issued patents incorporated herein by reference above) would determine if and when a user of the iOS device was accessing or attempting to launch a "forbidden" or blacklisted application or function on the iOS device while the user of the device is driving or in a location in which the application or function on the iOS device is prohibited by the distracted driving application installed on or in controlling communication with the iOS device. If so, the distracted driving application can be configured to use the CallKit API to instruct the iOS to display a VoIP screen or notification window in the foreground, which effectively prevents the user from continuing with the prohibited application or feature since the VoIP notification window or display screen is given priority as the foregrounded application.

The screen or notification window associated with the application using the CallKit API may be a specified notification window or display screen provided by the application. For conventional VoIP applications using the CallKit API, the notification window or display screen is one generated by the native phone call interface or one customized by the VoIP application. With the present invention, the distracted driving application acts as if it is a VoIP application and, preferably, generates a customized notification window or display screen that is conventionally displayed to users of non-iOS devices and that is intended to minimize the distraction caused to the user of the iOS device.

If the CallKit API used by the distracted driving software merely forces the installed VoIP phone application to display one of its notification windows or display screens, there are a number of different possible implementations for doing so to have the effect of preventing the user from launching or accessing the prohibited application or feature. Below are several options based on the current configuration of the CallKit API (which obviously may be expanded or enhanced in future versions of the API). For example, the CallKit API can be configured by the distracted driving software to generate a notification window or display screen indicating that there is:

a new incoming call;
a new incoming call but that the call has been answered;
a new outgoing call;
a new outgoing call but that the call has been answered.

As stated previously, it is actually preferable that the distracted driving software incorporate the CallKit API, which then enables the distracted driving software to provide a customized notification window or display screen that is familiar to the user of the iOS device and does not confuse the user into believing that there is an attempted VoIP call coming in, in progress, or going out. Having a notification window or display screen generated by the distracted driving software has the added benefit of displaying a cleaner and more specific interface to the user, which helps the user understand what is happening and reduces confusion.

In implementations in which the native phone application is triggered and becomes foregrounded, efforts are made to notify the user as to what is currently happening, but in a manner that is intended to minimize the level of distraction. Some of these methods include:

changing the displayed "caller name" to include phrases such as "Blocking Mode Active" rather than the name of an actual caller identified by caller ID;

displaying a local notification to the user which explains that the user has accessed or attempted to launch an unauthorized application, function, or feature of the iOS device and that the distracted driving software has been triggered to prevent further usage and distraction that could be caused by such application, function, or feature;

first instructing the iOS that the "phantom" phone call supports video and then providing a video or static image to the iOS for display on the device screen—wherein such video or static image merely includes an illustration or wording that notifies the user that the device is in "blocking" mode and that there is not really an incoming phone call.

In another implementation using the CallKit API, the distracted driving application is configured to trigger the native iOS phone app briefly to display but then quickly signal that the call has been ended. This method would only show to the user a quick screen flash. This has the effect, in many cases, of preventing the user of the iOS device from continuing the current activity without requiring the user to be "stuck" in the phone application. A follow up notification can then be displayed to the user alerting them to the unauthorized application, function, or feature that was attempting to launch or be used, which would help avoid or reduce potential confusion to the user.

In other implementations, it may be desirable to keep the user in the phone application user interface (UI) whenever the user is accessing or attempting to launch a "forbidden" or blacklisted application or function on the iOS device. This can be accomplished by continually triggering the phone application notification window or display screen whenever the user is driving or otherwise attempting to access or launch unauthorized application, function, or feature on the iOS device, when the user is driving or when the device is in a predetermined location or environment in which it may be desirable or necessary to limit or prohibit some functionality of the device. In other words, whenever the application detects the user has navigated away from the phone application or "hung up" the call, the distracted driving application can then fire a new call to bring the user back into the phone application and prevent any other action.

It may further be desirable only to show the phone application when the user interacts with the phone or turns the screen on. This would reduce the power/battery drain of the iOS mobile device by only showing the phone app when the screen was actively in use (i.e., in unlocked mode).

The phone application may also be triggered only in response to the user pressing buttons on the screen, or after an incoming notification, such as a text message, is received.

The CallKit API may also be useful in preventing other aspects of distracted driving. For example, the CallKit API has the ability to be notified of system calls and calls from other VoIP applications. Using the knowledge of these calls, the CallKit API may be used to mute, or even terminate, these other calls to prevent the user from being distracted by new incoming calls or continuing existing calls. Again, the instruction to mute or terminate the VoIP call would only be implemented if and when the distracted driving software determined that the user was accessing or attempting to launch a "forbidden" or blacklisted application or function on the iOS device while the user of the device is driving or in a location in which the application or function on the iOS device is prohibited by the distracted driving application installed on or in controlling communication with the iOS device.

In response to a new incoming call, the CallKit API may be used to tell the system that the distracted driving software also has an incoming call. This would make it difficult or impossible for the user to answer the other call and, therefore, prevents the user from talking on the phone while driving.

In another implementation the system can be configured quickly to initiate and disconnect calls repeatedly as long as the screen is on. This would have the effect of preventing the user from accessing any other applications while the user of the device is driving or in a location in which the application or function on the iOS device is prohibited by the distracted driving application installed on or in controlling communication with the iOS device. A notification may also be shown to the user during this time to help explain the actions taking place to reduce confusion.

In a further implementation, the CallKit API can be triggered to prevent the user from being able to see short lived distractions, such as notifications from applications such as email, messaging, IM, or other applications in which notifications have been activated or turned on. Once a notification is detected (and assuming it is not from an authorized or "white-listed" application or number kept in the distracted driving software policy or user profile), then an incoming or outgoing call with a callerID of "Blocking Mode Active" can be displayed on the screen, using the CallKit API, to alert the user that a distraction on the iOS device is being blocked or prevented. Once the distraction is removed from the iOS device or otherwise ends, the CallKit API would send a notification indicating that the "blocked" call had terminated or disconnected and the user would be placed into a "safe area"—whether that be back to a Locked Screen status, back into an approved application, or back to the default screen generated by the distracted driving software.

Stated another way, in version 10.0+ of its iOS, Apple, Inc. introduced a new public API replacing its prior notification system with a new UserNotifications framework. This API allows for customizing of both modal and Lock Screen notifications that are shown to the user of the iOS device.

In pre-existing "notification-based" systems prior to the CallKit API, there was no "true" way of preventing or blocking unauthorized applications, functions, or features on an iOS device using a 3$^{rd}$ party app due to the inability of a non-CallKit API to determine the "Alert Style" of a notification coming from another app on the iOS device. This inability to enforce conventional distracted driving solutions made it difficult to enforce blocking or preventing use of unauthorized applications, functions, or features on an iOS device—or at least made just restrictions easier to circumvent.

However, the CallKit API effectively enables distracted driving software to integrate with and make effective use of the CallKit API functionality to prevent the user from accessing any other applications while the user of the iOS device is driving or in a location in which the application or function on the iOS device is prohibited by the distracted driving application installed on or in controlling communication with the iOS device. These implementations include:

Using a detection system the distracted driving software application resident on the iOS device is notified of the user interacting with the lock screen of the mobile device. This causes the distracted driving application to send multiple CallKit API notifications that are displayed on the lock screen of the iOS device. This addition of notifications results in the unapproved distraction (messages, email, notifications from applications on the phone, or phone call notifications, etc.) to be forced off of the display screen and out of view of the user.

Using means already described in prior filings identified above and incorporated by reference herein, once an iOS device is notified of an incoming, unapproved distraction (messages, email, notifications from applications on the iOS device, or phone call notifications, etc.), the distracted driving application resident on the iOS device triggers multiple notifications forcing the unapproved distraction off of the iOS device display screen and out of the user's view. If the user interacts with the display screen, the notifications are then cleared out and implementation 1 (above) is then triggered, causing more notifications to be displayed—which further reinforces to the user that the action is not approved.

With the ability to display an enforceable modal notification to the user while the iOS device is unlocked, it is now possible to provide the user with a customizable user experience. Items, such as one touch dialing, opening allowed applications, and other approved features can be set as available without the user going through layer after layer of User Interfaces; thus, further minimizing unnecessary distractions to an iOS device user while the user is attempting to access or use an "authorized" or permitted application, function, or feature on an iOS device.

With the ability to display an enforceable modal notification, the iOS device is able to block unapproved incoming phone calls, FaceTime calls, and VoIP calls. Upon the notification of an incoming phone call, the distracted driving application resident on the iOS device can display a notification to the user alerting them that the call is not allowed; thus, preventing them from answering the call. Outgoing calls can be prohibited in similar manner using the CallKit APIs to prevent the user from accessing pathways for making a call.

(c) Enforcing and Preventing by-Passing of "do not Disturb while Driving" Functionality on Mobile Devices that Enable Users to Self-Impose Distracted Driving Restrictions With Apple Inc.'s introduction of its "Do Not Disturb While Driving" (DNDWD) functionality in iOS 11, Apple introduced a self-enforcing (i.e. user opt in) way to limit mobile device distraction. For example, while the DNDWD is active on the mobile device, the user is protected from (i.e. prevented from seeing, hearing, and interacting with) passive distractions. Passive distractions typically include notifications (whether phone, text, or app-related) that are inbound or otherwise not directly initiated by the user, but are actions by the mobile device to which the user responds. The user is also protected from active distractions. In contrast with passive distractions, active distractions include interactions or activities on the mobile device initiated by the user. Active distractions are addressed by preventing the user from unlocking the mobile device when the device is in a "locked" state and when the DNDWD functionality is active. However, Apple makes it relatively easy for its users to override or by-pass the self-imposed DNDWD functionality by responding to a simple on-screen challenge. For example, when attempting to unlock the device when the DNDWD functionality is active, the user is presented with an on-screen challenge. Basically, the DNDWD gives the user one last chance to decide whether or not to by-pass or disable the DNDWD functionality regardless of whether the user is driving. When attempting to unlock, the device displays two buttons to the user: CANCEL and I AM NOT DRIVING. Thus, Apple's DNDWD functionality is provided as a deterrent to discourage the user from interaction with other functions of the mobile device. However, once the user selects "I AM NOT DRIVING" and opts out of being blocked from using the device, there is no further enforcement or blocking of device functionality by the system—even if the user is operating the vehicle.

The distracted driving prevention software and system of the disclosed herein may be used to supplement and enforce a distracted driving prevention application, such as Apple's basic DNDWD functionality. The present disclosure is also useful for improving upon and complementing any blocking functionality adopted by device manufacturers other than Apple, Inc. that provide self-imposed, but easy to deactivate, protections. For example, when a vehicle is in motion, the Apple's basic DNDWD functionality will keep the mobile device in a locked state, e.g., such that the user must take affirmative action to transition the mobile device to an unlocked state. Embodiments may be configured to detect the affirmative action to unlock the device while the vehicle is in motion, which triggers an enforcement protocol built into the distracted driving application of the present system. If the distracted driving prevention application on the mobile device detects that the user is in a vehicle moving (based on, for example, GPS data or another external triggering mechanism) the mobile device may prompt the user to re-enable the blocking functionality (after the user has selected the I AM NOT DRIVING button), warning that the distracted driving prevention application on the device will take affirmative action, such as notifying an account administrator/parent/guardian that the driver is no longer in compliance with the blocking functionality while in operation of a vehicle.

Increasingly, insurance companies and underwriters are basing the cost of insuring motorists on a multitude of things such as but not limited to daily mileage, time of day for drives, age of the driver, etc. A number of insurance companies are currently attempting to more accurately assign insurance costs and premiums on companies and upon individual users or families based on the driving habits of said drivers being insured. A number of data points are taken into consideration when establishing such costs and premiums, including but not limited to tracking and monitoring harsh braking events, average and top speeds, speeds compared to speed limits, hard acceleration events, hard cornering, and the like. Much of this data can be collected by the on-board computer of many vehicles, by control devices, as described herein, that are installed in vehicles, and based on data that can be collected by the mobile devices themselves. The challenge for this insurance cost model occurs when there are multiple users of this insurance in the same vehicle at the same time. Data collected for multiple users within the same vehicle will identify the same data points for all mobile devices within the vehicle—regardless of which device user is driving. For example, Driver X may be the safer and less risky of the two drivers in the eyes of the insurance company; however, if Driver Y is riding as a passenger when Driver X is driving, the data collected about Driver X's driving behavior will also be applied, incorrectly, to Driver Y. And, thus, the lower risk profile of Driver X may be incorrectly assigned to Driver Y. The inverse is also true. If Driver Y is driving and has the higher risk profile, all data collected about risky Driver Y may be incorrectly attributed to safer Driver X when Driver X is merely riding as a passenger of Driver Y.

(c)(i) Determining when a Mobile Device is being Used by a Passenger Rather than a Driver of a Vehicle.

A number of techniques for distinguishing between a driver and a passenger have already been described and disclosed herein. However, there may be circumstances in which it is desirable to determine whether a device user is a driver or passenger based on actions that the present distracted driving prevention software installed on the mobile device requires the user to take to validate and confirm whether he is a driver or passenger. In some embodiments, the system defaults to the assumption that the device user is a driver. Consequently, processes and systems described herein confirm whether the user is not the driver. However, such confirmation can require more than having a user self-select an option on the home screen of the device. This validation process can be performed before releasing the user to full device functionality that is conventionally provided after the user selects the I AM NOT DRIVING option.

For example, according to one embodiment disclosed herein, the user is prompted to hold the mobile device such that the screen of the device is facing him. The mobile device may prompt the user to rotate the device 360 degrees while keeping his hand from obstructing a rear-facing camera of the device, which is on the other side of the mobile device from the screen. The collected image or images (e.g., video data including image frames) is then processed (locally on the mobile device or uploaded and processed remotely) to determine whether the user is in the passenger space of the vehicle.

In another embodiment of the present disclosure, which requires less computational power than a 360 degree scan, the mobile device prompts the user to hold the mobile device in front of him. Then, front and rear-facing cameras are used to collect image/video data for processing. Again, collected image/video data is then processed/analyzed (locally on the mobile device or uploaded and processed remotely) to determine whether the user is in the passenger area of the vehicle.

In a feature or improvement upon the two procedures described above, tilt of the mobile device can also be checked with respect to gravity, and the tilt must be in a given range before collected images/video will be considered for processing. Alternatively, the system can require the mobile device to orient itself with respect to the vehicle, and this relative orientation must be in a pre-determined range before collected images/video will be considered for processing.

In another embodiment, mobile device prompts the user to hold the device such that the user's face is visible via the front-facing camera. Next, while the user's face is still visible, the system instructs the user to rotate his head and the camera such that the user is looking at an object within the cabin of the vehicle. The mobile device may instruct the user to aim the camera at a given item, such as a steering wheel, rear-view mirror, or passenger seat (or any other space in the vehicle). Optionally, by rotating through randomly-selected and different potential objects or locations within the vehicle and instructing the user to respond within a very short period of time, the mobile devices provides an additional challenge to the user with the selected item or location and requiring the user to aim the camera at that item or location in a relatively short amount of time. The system includes algorithms to determine where the user is looking compared to where the user should be looking if he were a passenger rather than a driver. Therefore, embodiments provide an additional challenge that can be used in combination with other challenge mechanisms to increase the reliability of the verification process.

In some embodiments, the mobile device is configured to enable the rear- and front-facing cameras to take images (or videos) from both cameras—one to capture the user's face and background behind the user and the other to capture what is in front of the user. Further, the mobile device may instruct the user to sit in the vehicle seat, with headrest behind the user's head and to position the device at head level so that one camera (front-facing camera) is pointed toward the user's face and the other camera (rear-facing camera) is pointed toward the dashboard/windshield of the vehicle (if the user is in the front seat) or the back of one of the front seats (if the user is in a rear seat). Further still, the mobile device may instruct the user how and where to hold the device and then the device screen shows a split view—one view for the front-facing camera and the other view for the rear-facing camera. Once the user's face is centered and properly oriented in the front-facing camera, the mobile device can capture or simply analyze the view from the rear-facing camera. If the user's face is captured and has an appropriate background based on where the user indicates he is sitting in the vehicle, and if there are no turnings or adjustments detected by the device which might indicate that the device is being handed to a different user or moved to try to trick the validation procedure, then the rear-facing image or video can be analyzed to determine whether the view is consistent with a view from the seat indicated by the user. As long as the view does not match a view from the driver's seat and as long as there have been no disallowed movements (turns, tilts, vertical or horizontal shifts of the device, as detected by the device's accelerometer, for example), then the validation process confirming that the user is not in the driver's seat is successful and the user is permitted to use the device as normal.

The above procedure or process also works for devices that do not enable simultaneous images or videos. First, the device is positioned to capture and center on the user's face. Then, the rear-facing camera takes or analyzes its view. If there are no disallowed movements between the capture or analysis of the user's face and then the capture or analysis of the rear-facing view, then the validation process proceeds. If there are any disallowed movements, then the validation process requires the user to start over and capture the user's face with one camera and hold the device in position until the device can capture or analyze the view from the other camera to determine where the user is positioned in the vehicle.

In an additional feature of the above verification process, the mobile device may prompt the user to select or self-identify in which seat within the vehicle he is located. This additional step is optionally performed before or while performing the passenger verification test. Doing so allows the mobile device to validate the location with knowledge of where the user claims to be located within the vehicle. In some embodiments, the device screen presents the user with a graphic, top level view of the vehicle and the different locations within the vehicle in which the user may be located. The user would then select the seat or space location by tapping the appropriate location on the device screen.

In some embodiments, the mobile device processes and analyzes collected image/video data by training a neural network (or other machine learning algorithm) to detect certain images from specified viewpoints. For example, if the user is in the front seat, the mobile device may instruct the user to point the camera towards the steering wheel while keeping his head visible in the forward-facing camera. The forward-facing camera confirms that the user's head is visible and then confirms, using the rear-facing camera, that the image matches the type of "view" expected by the machine learning algorithms based on system calibration and based on an ever-growing library of representative images taken of different users in different vehicles. If the check passes, the system knows that the user is in the front passenger seat.

In the back seat, the mobile device may perform a similar test. Where the user is visible in the front-facing camera and the seat in front of the user is visible in the back facing camera, the system may determine that the user is in a rear passenger space.

If the user is driving or riding in the vehicle at night or in the dark, the light from the device screen may be used to help illuminate the objects and locations within the vehicle. A white or gray image on the screen may help in this regard. This is safer than using the device's flash so as to avoid blinding the driver of the current vehicle or those in other vehicles.

Alternatively, at night or during dark conditions, the lights from the console or vehicle instrumentation panel may be detected in the images/video and used by the system to help determine the location and position of the device and device user.

In other embodiments, one or more of the above techniques may be combined together to provide the system with a higher level of confidence and accuracy in determining the position and location of the mobile device within the vehicle.

The process of analyzing any collected image/video data includes identifying, for example, the location of the vehicle dash board, steering wheel or console, rear and side view mirrors, gears, and the like. In addition, the mobile device may analyze and compare a location of the user's head, torso, hands, and arms relative to vehicle objects, such as seat and head rest, external windows, and whether the image was captured by the front or rear facing camera.

In some embodiments, the mobile device checks the images or videos of the rear-facing camera against a library of potential "views" the user may experience from various positions within the vehicle, such as front passenger, rear passenger, public transport such as a bus etc. If the view matches a passenger view, the blocking is released. If the device rotates more than a few degrees in any one direction, or if an acceleration consistent with "moving" the device takes place, the system resets and the user is required to start over and ensure that his face is visible in the rear-facing camera again. Doing so ensures that the user is always directly behind the device and looking into the rear-facing camera and cannot attempt to move the device after capturing the user's face. The user is allowed only small movements after the device is properly oriented to capture the user's face. This increases the accuracy of the image or video captured by the opposite-facing camera—whether it is capturing an image of the steering wheel, seat head rest, view straight ahead of the user, or other location within the vehicle at which the user has been instructed to look.

In some embodiments, the mobile device instructs the user where to look—whether that be the steering wheel, passenger seat, dashboard etc. So, when the user is ready to start the validation process, the user simply presses the validation button, aligns his face with the rear-facing camera, and if the user is already looking where he is supposed to, the mobile device quickly checks the rear camera image after locking in on the user's face. If the image matches (within a predetermined degree of accuracy) an expected passenger view, they are deemed to be a passenger. So, in such a case, there is no need for the user to turn or rotate their head/camera.

Accordingly, unless the device enable images or videos to be captured simultaneously, the system essentially switches back and forth between the front and rear camera based on events. First, the front-facing camera is activated until the system locks in on the user's face. The orientation of the device is established when the user's face is captured so that any unacceptable movements, tiltings, or re-orientations of the device can be detected if the orientation changes. Then, the system switches to the rear-facing camera to determine what the user is "looking at." If the user moves too much, the system switches back to check the rear-facing camera to ensure that the user's face is still properly positioned and that the user is not trying improperly to by-pass the validation procedure.

In one embodiment, the mobile device analyzes the collected image/video data to determine if an empty seat can be identified in the rear-facing camera, which can be useful for confirming whether there are passengers within the vehicle. Additionally, the system may require that the rear-facing camera detect the user's face.

In another embodiment, the mobile device instructs the user to type in a displayed code while collecting the images/video. Doing so enables the camera of the device to capture the user, background behind the user, and any objects detected by the front-facing camera. This technique prevents or makes it more difficult for the user to try to trick the validation procedures since the image/video data will only be collected while the user is typing in the required information, which establishes a fixed orientation between the device and user during the data collection process.

(c)(ii) Additional Methods for Preventing a Bone Fide Passenger from Entering Validation Data on Behalf of the User/Actual Driver.

Another problem to be solved is when a driver asks his passenger to unlock his device for him. In this situation, once the passenger has unlocked the phone, the system uses inertial navigation techniques to integrate accelerometer and gyroscope sensor data available from sensors built into the mobile device to determine that the device has been passed back to the driver. This data can be combined with GPS data to reduce false positives/negatives due to the motion of the vehicle. In addition, this technique can be combined with one or more of the above validation techniques.

Additionally, to prevent users from trying to have a passenger unlock the device for them, the system preferably warns the person completing the passenger verification test that the person doing so is solely responsible for keeping the mobile device in the passenger zone. The person completing the passenger verification test is warned that he is and will be responsible for any negative actions that happen if the device is used by or given back to the driver of the vehicle. The person completing the passenger verification test is then prompted to click an "I AGREE" button before the device is unlocked. In addition, the image of the person who unlocked the phone is taken and saved in the device. This accountability provides an additional deterrent to anyone trying to by-pass the DNDWD functionality and can also be stored and used for later audit or enforcement actions that may be necessary if an incident occurs and it is later necessary to identify who completed the passenger verification process.

Figure 9:
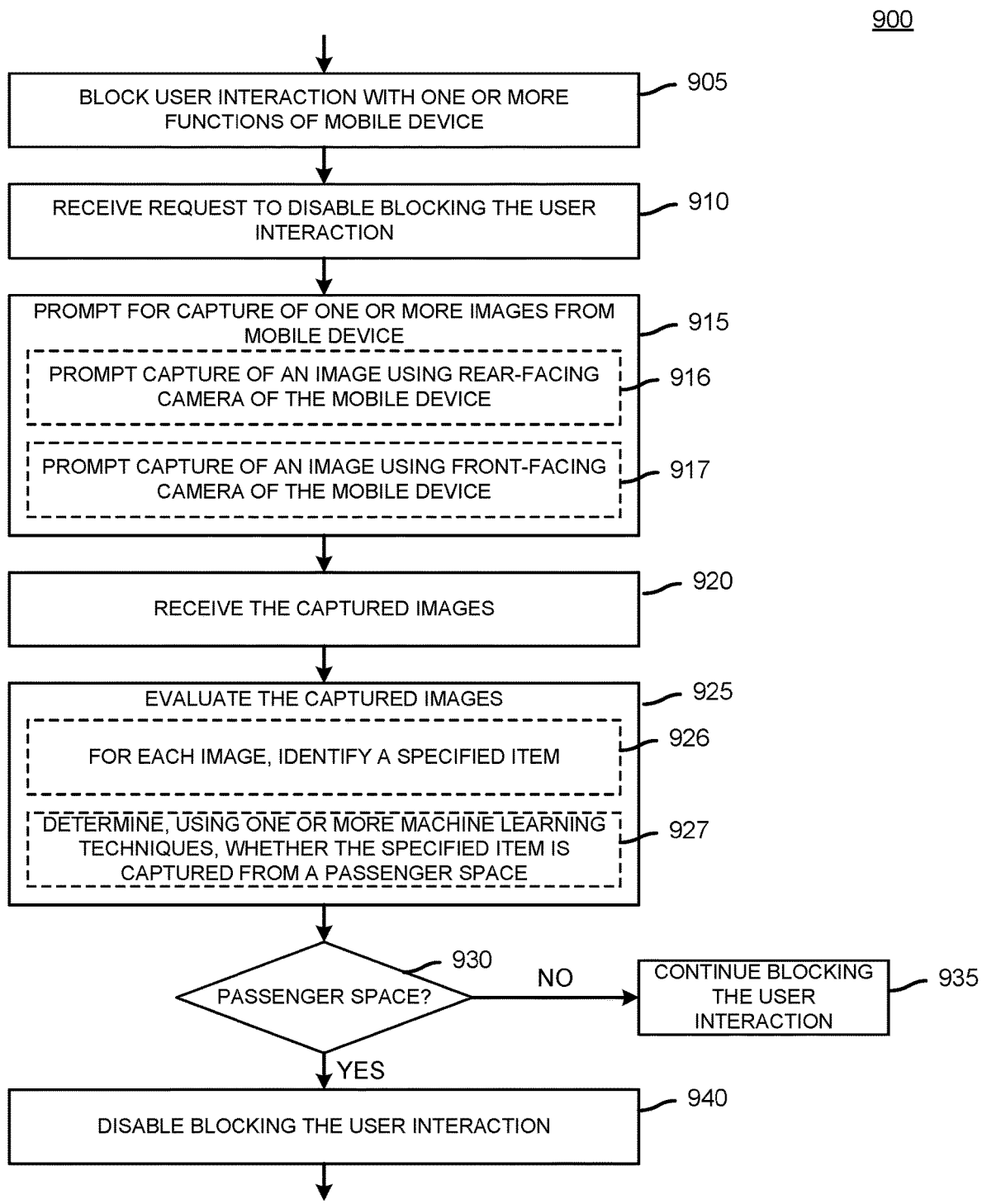
FIG. 9 is a flow chart of steps used by a mobile device for enforcing a blocking of user interaction with functions of the mobile device.

Referring now to FIG. 9, a method 900 for managing blocking of features of a mobile device is shown. Method 900 provides an example of how embodiments described herein may be carried out by the mobile device located within a vehicle. As shown, the method 900 begins in step 905, in which the mobile device blocks user interaction with one or more functions of the mobile device. For example, the mobile device may do so via a native application executing thereon, such as the DNDWD functionality described above. As another example, a distracted driving prevention application, also described herein, may also limit or fully disable the one or more functions.

In step 910, the mobile device receives a request to disable the blocking of the user interaction with the one or more functions of the mobile device. For instance, in the DNDWD example, the request may be indicative of a user selecting the I AM NOT DRIVING option on the user interface of the mobile device. The request may trigger the mobile device (e.g., via another application executing thereon) to provide a challenge to the requesting user to prove that the user in a passenger space of the vehicle.

In step 915, the mobile device prompts for capture of one or more images from the mobile device. For instance, to do so, in step 916, the mobile device requests capture of an image using the rear-facing camera of the mobile device. More particularly, the mobile device may instruct the user, through a prompt on the user interface of the mobile device, to capture an image of a specified item in the vehicle, such as a steering wheel. As another example, the mobile device may instruct the user to hold the mobile device in a given orientation or to aim at a particular target. Once in position, the mobile device may drive the camera to automatically capture the image (or frames of images, e.g., as video data). In step 917, the mobile device may also instruct the user, through a prompt on the user interface, to capture an image using the front-facing camera of the mobile device. As another example, the mobile device may instruct the user to hold the mobile device in a given orientation or at a particular target (e.g., such that the front-facing camera is facing the user and an object of the vehicle, such as a passenger seat headrest). Once in position, the mobile device may drive the camera to automatically capture the image (or frames of images). In some cases, the image capture using the rear-facing camera and the front-facing camera may occur substantially simultaneously. For instance, after the mobile device captures the image by the rear-facing camera, the mobile device may immediately capture the image by the front-facing camera. In step 920, the mobile device receives the images captured from both the front-facing camera and the rear-facing camera.

In step 925, the mobile device evaluates the captured images. As stated herein, the mobile device may use machine learning techniques either locally (or may send the images to a remote server) to identify whether the images were captured from a passenger space of the vehicle. For example, a system (or the mobile device) may train an image classifier to distinguish between a specified item (e.g., a steering wheel, a dashboard, a side-view mirror, etc.) captured from a driver space of a vehicle and the item captured from a passenger space of the vehicle. Machine learning techniques for doing so may include neural networks, Bayesian classification, and the like. In step 926, the mobile device, for each image, identifies a specified item in the image, e.g., using the machine learning techniques. Further, in step 927, the mobile device determines, via the machine learning techniques, whether the specified item is captured from a passenger space.

In step 930, the mobile device determines whether the captured images both correspond to images captured from a passenger space. If not, then in step 935, the mobile device continues to block user interaction with the one or more functions of the mobile device. In some cases, the mobile device may return a notification to the user that the blocking has not been disabled. Otherwise, in step 940, the mobile device disables the blocking of the user interaction. Continuing the DNDWD example, another application, such as a non-native distracted driving prevention application (using the techniques also described herein) may apply its own blocking measures on the mobile device.

Figure 10:
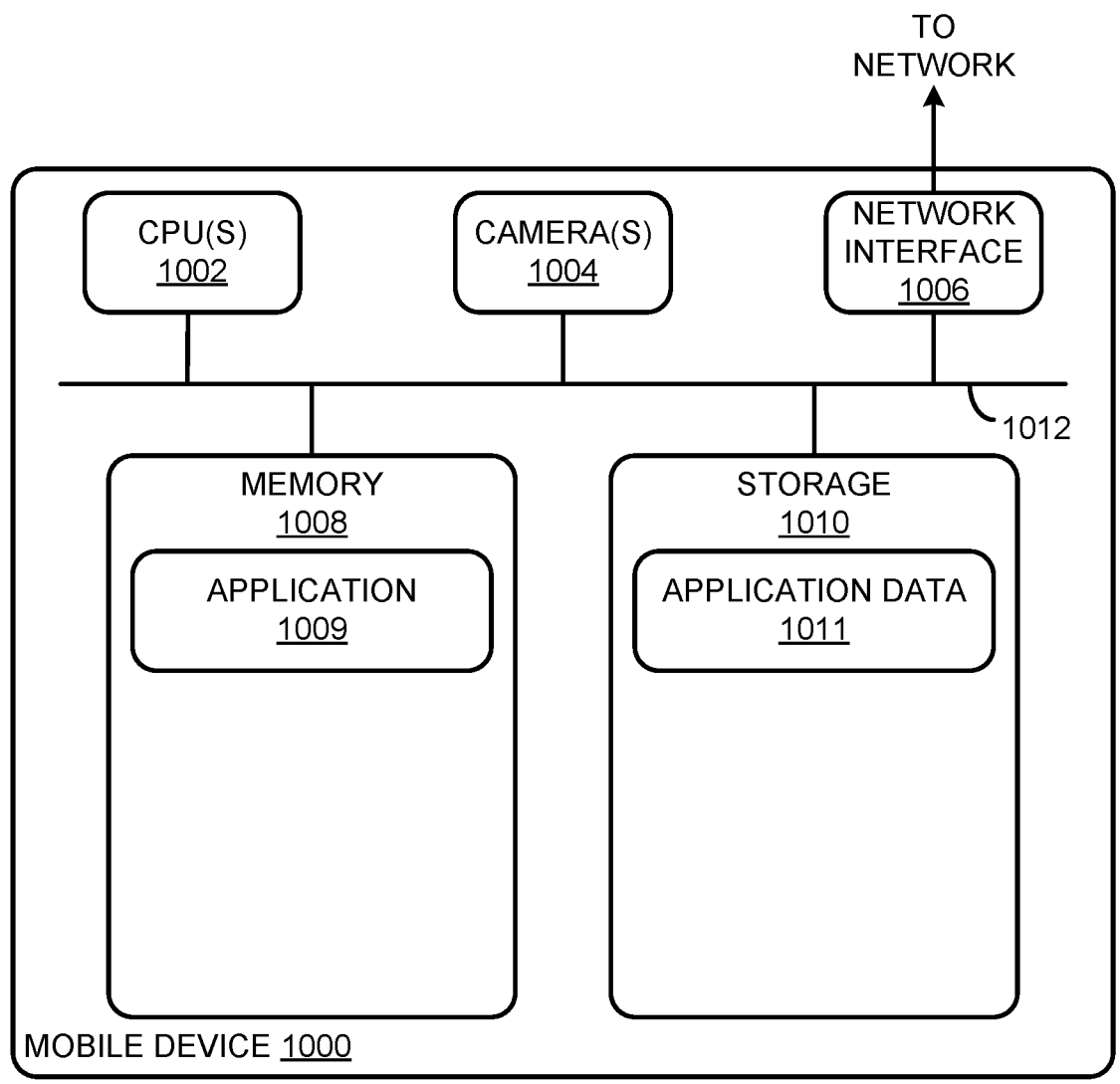
FIG. 10 is a simple block diagram of at least one embodiment of a mobile device that is configured to enforce blocking of user interaction with of a mobile device.

Referring now to FIG. 10, an example mobile device 1000 configured to manage blocking functionality on a mobile device is shown. As shown, the mobile device 1000 includes, without limitation, one or more central processing units (CPUs) 1002, one or more cameras 1004, a network interface 1006, a memory 1008, and a storage 1010, each interconnected via an interconnect bus 1012. Note, CPU 1002 is included to be representative of a single CPU, multiple CPUs, a single CPU having multiple processing cores, and the like. The cameras 1004 may include a rear-facing camera and a front-facing camera for capturing image and video data. The cameras 1004 may be controlled by software executing in the memory 1008. The memory 1008 is generally included to be representative of a random access memory. The storage 1010 may be a disk drive storage device. Although shown as a single unit, storage 1010 may be a combination of fixed and/or removable storage devices, such as fixed disc drives, removable memory cards, optical storage, network attached storage (NAS), or a storage area network (SAN). The network interface 1006 generally allows data to be transferred to/from the mobile device with a network (e.g., the Internet). The interconnect bus 1012 allows data to be communicated between the components of the mobile device 1000.

Illustratively, the memory 1008 includes an application 1009. The storage includes application data 1011. The application 1009 includes program code, which, when executed on the CPUs 1002, may carry out the embodiments described herein. More particularly, the application 1009 may receive a request to disable blocking of functions on the mobile device 1000 and prompt a capture of images within the vehicle by the cameras 1004. The application 1009 may receive the images and store the images as part of the application data 1011. Further, the application 1009 evaluates the images to determine whether the images were captured from a passenger space of the vehicle. If so determined, the application 1009 may disable the blocking of the functions on the mobile device 1000.

Further, the application 1009 may include program code for applying machine learning techniques on the captured images to more accurately determine whether the images were taken from the passenger space of a vehicle. For instance, the application 1009 may provide a classification model built from training image data (e.g., included as part of the application data 1011) that may receive, as input, an image. The classification model may identify an item in the image (e.g., specified by the application 1009) and evaluate whether the item corresponds to an item that is captured from a view of a passenger. The training data used to build the model may allow the classification model to distinguish between an item captured from the view of a passenger space from a view of a driver space.

(c)(iii) Procedures Used by the Present Distracted Driving System to Detect when the Mobile Device is in DNDWD Status and to Detect when User Selects the I AM NOT DRIVING Button to Deactivate the DNDWD Functionality.

In one embodiment of the present invention, when the system's application running on the mobile device detects that the mobile device is in a moving vehicle, it also needs to determine whether or not the DNDWD functionality has been activated by the user and detect when or if the user selects the I AM NOT DRIVING button. Preferably, this detection is done via API calls that are exposed via the OS, which give status information for DNDWD functionality. Alternatively, this detection can also be accomplished by observing mobile device behaviors. Such behaviors include but are not limited to detecting that the user: has navigated away from the home lock screen, is accessing applications, is receiving incoming messages, or is making or receiving phone calls.

Once the application has detected that the DNDWD functionality is not currently active or is disabled, the present application will confirm that the mobile device is still moving in a manner consistent with being in a vehicle. This determination can be based on hardware installed in the vehicle or sensors on the mobile device such as but not limited to: accelerometer, GPS, WIFI.

Once the present application has determined that the DNDWD functionality is not active and that the mobile device is moving, the application preferably performs one or more of the following activities in various combinations or order:

Action 1: Notify an administrator/parent/guardian/insurance company or person of authority that the mobile device is being used while moving.

Action 2: Prompt or instruct the user to reactivate the DNDWD functionality.

Action 3: Adjust the user's driving or UBI score to reflect the activities of the user.

Action 4: Prompt the user to perform a passenger verification test. If the passenger verification test fails and it is determined that the user is, in fact, driving, then all of the above may be performed in response, including but not limited to: appropriate notifications, driving score impact, prompt to turn back on, etc.

In one embodiment, the passenger verification test preferably includes having the user perform operations that can only be completed when the application has the user's full attention.

In another embodiment, the passenger verification test preferably includes utilizing the device's camera system, as described above, to identify if the device is being used by a passenger rather than the driver.

If the passenger verification test is successful, the user can then freely use the mobile device. However, it may make sense periodically to require the user to re-perform the tests.

If the passenger verification test fails, it makes sense potentially to impact driving scores, notify the user to turn the DNDWD feature back on, lock the device or disable usage until the user re-enables the DNDWD functionality, make notification to one or more appropriate parties regarding the activity, or, in some situations, even prevent the vehicle from being used.

In another embodiment, allowable features or apps may be allowed to be used even when it has been determined that the mobile device is being used by a driver after failing the passenger verification test. Such allowable features or apps may include, for example, navigation or music applications or emergency or white listed communications. The usage of these applications and functions are preferably controlled and monitored based on distracted driving policies associated with the present system.

In another embodiment, the above features may be used in a way that does not rely on Apple's DNDWD functionality to perform the feature restrictions. For example, once it has been determined that the user is attempting to use the mobile device and the mobile device is moving, the system can require instruct the user to perform a user verification test, as described above.

If the passenger verification test fails, make notification, deduct scores, or use other means to lock and disable the mobile device to prevent further inappropriate usage.

In some embodiments, it may be desirable to force the user to perform the passenger verification test(s). This can be accomplished by locking or preventing further usage of the device until the user confirms that they are a passenger. Other ways of enforcing the DNDWD functionality may include deducting driver score points based on how long it takes for them to acknowledge and perform the test.

In some embodiments, it may be desirable to prompt the user to perform a passenger verification test. If the user fails the passenger verification test, the system can be optionally configured to permit the user to proceed, but to alert their parent or employer or other admin that the user by-passed the DNDWD functionality. Optionally, the system can permit the user to acknowledge that they are the driver and to request that the DNDWD functionality be reactivated. If the user chooses to proceed despite failing the passenger verification test, the system can be configured to enable the admin to disable the user's ability even to attempt to pass the passenger verification procedure in the future—in which case, the system would automatically engage the distracted driving functionality or reactivate the DNDWD functionality if the device is being used in a moving vehicle. Optionally, the system could be configured automatically to remove the ability to use the passenger button in the future after 1 or more incorrect uses.

In other embodiments, AI (artificial intelligence), machine learning, decision trees, or hard coded logic may be used to adjust the behavior and response based on the user's prior history. For example, the user can begin in one mode, such as pure audit (where one or more functions are available to be used) or pure blocking (where nothing can be used) and adjust the blocking policy to be more or less restrictive based on the user reaching certain driving score thresholds, or other incentive based systems.

(3) Alternative Triggers for Initiating Distracted Driving and Other Applications It is sometimes useful to trigger a mobile device to go into "blocking" mode using a signal from the carrier network or from a cloud-based data network that is sent down to the mobile device. In network-based call blocking, a vehicle is equipped with a unit that is able to both determine vehicle status and communicate that information to a cloud-based network or server. The mobile device associated with that vehicle will then receive this information from the network and begin blocking/auditing/scoring. One problem with this particular technique is that the user's mobile device will be blocked, even if the user and his mobile device are not in the vehicle but if that vehicle is being driven by someone else. Most systems utilizing a signal from the cloud to trigger blocking work on a one-to-one basis. Meaning, one mobile device is tied to one vehicle. This is not an ideal situation. Below are some solutions to this problem.

One solution is to use the control device described herein, in conjunction with one or more mobile devices within the vehicle, to determine location of such mobile devices and then to determine the likely driver of the vehicle based upon such location determinations. Armed with this information, it is then possible for the control device or a software application on the mobile device of the driver to communicate vehicle status information and driver information to the carrier network, which can then intelligently send back a suitable signal to cause the mobile device to go into blocking/auditing/scoring mode. Alternatively, the carrier itself could impose a block, at least on cellular voice and data communications controlled by the carrier, to prevent such functionality until the control device or mobile device sends a suitable signal indicating that the vehicle is no longer being driven by the user of the mobile device and/or that the mobile device is no longer located in the driver space of the vehicle. It will also be appreciated by those of skill in the art that, armed with the information concerning who is driving the vehicle, it is then possible for the control device or a software application on the mobile device of the driver to communicate vehicle status information and driver information to a remote application server, which can then intelligently send back driver-specific data and information that can be used by software applications installed on the mobile device, for purposes other than distracted driving prevention.

Another solution is to use the GPS of the mobile device to determine if the mobile device is in motion. This would be performed only upon notification from the cloud that the vehicle associated with that mobile device is in motion, so as to preserve battery life on the mobile device. Further, the GPS position of the mobile device can be compared to that of the vehicle. This would allow the user to continue to have use of his mobile device when riding with someone else in another vehicle—even if his vehicle is being used by another at the same time.

Yet another solution is to use the accelerometer of the mobile device to determine if there has been a period of "walking" before getting a signal from the cloud that the vehicle is in motion. This would identify a scenario in which the user was likely walking to his vehicle. Further, it would allow someone in a stationary position to continue using his mobile device while someone else was driving his vehicle. Any "walking" detected long before, or after the signal from the cloud indicating vehicle movement, could be ignored.

In another case, significant changes in temperature can be used to indicate that the user is moving toward her vehicle. For example, the user may be getting into her vehicle and turning on the heat or air conditioner. Alternately, the user may be walking from inside to outside to get in her vehicle.

In either case, the rapid change in temperature will give some indication of a change in environment that, when correlated with the vehicle moving signal from the cloud, gives a higher level of certainty that the user is indeed driving her vehicle. This temperature can be correlated with the outside temperature of that location at that time, determined using the GPS coordinates from the vehicle and a third-party weather API, giving even better results.

Additionally, changes in barometric pressure can be used in a similar manner as temperature. Due to the nature of HVAC systems, barometric pressure is often different inside of buildings and vehicles than it is in the open environment. Some modern mobile device have barometric pressure sensors capable of detecting these differences. Again, this reading could be correlated with third-party data for increased accuracy.

Software running on the mobile device can analyze sounds captured within the vehicle, such as distinct engine noises, that could be used to determine the mobile device receiving the signal is actually in a vehicle. The sounds could be compared independently of the system control device in the vehicle, or sound samples captured by both a control device in the vehicle as well as the mobile device itself could be compared. For example, algorithms can be used to determine that the sounds heard by a mobile device are consistent with sounds that would be heard while in a vehicle. More specifically, the captured sounds may be used to determine the type of vehicle in which the mobile device is located to further verify that the mobile device is located in the intended or expected vehicle. Furthermore, if a sample was taken by both the control device and by the mobile device, the sounds can be compared to see if they were taken from the same vehicle. To aid in comparison, the control device or mobile device may broadcast a high frequency tone to signify an identifiable sound that can be detected by the other device to confirm that both are within the same vehicle.

In another implementation, the mobile device or control device may be periodically broadcasting a tone at a specified frequency to help with identification—as outlined above for identifying in which quadrant the mobile device is located. Using any of the above-mentioned methods, the control device in the vehicle may play audio tones, which are then picked up by the mobile device. Once the sounds have been picked up by the mobile device, a decision can be made as to whether the mobile device should be "blocked." Furthermore, using the quadrant-identifying techniques described above, a mobile device triggered to go into blocking mode from the network could be configured not to go into blocking mode, notwithstanding the network signal, if the mobile device determined that it was not within the driver quadrant of the vehicle.

If the mobile device is connected to a Bluetooth device, such as a vehicle navigation system or a hands-free phone application, such information could be valuable in determining if the mobile device is currently located within the "correct" or expected vehicle when the network "blocking" signal is generated.

As WiFi and connected-vehicle initiatives become increasingly more popular, using WiFi to identify that a particular mobile device is in a particular vehicle is becoming more viable. For example, merely determining with which WiFi network a mobile device is connected may be sufficient to confirm that such mobile device is in a particular vehicle. Another implementation may be to send data over the WiFi network in a challenge/response configuration. Another use of WiFi could be in an aftermarket hardware device added to a vehicle or integrated as part of the vehicle by the OEM that is running a web service which can be queried locally by a mobile device connected to the WiFi to determine state of the vehicle or to determine within which vehicle a mobile device is located.

Another detection mechanism is to use cellular signal characteristics, as detected by a hardware device located within the vehicle. Activity occurring on the mobile device, such as received or sent SMS messages, phone calls, or data transfers, can be used to narrow down which mobile device may be located in that particular vehicle. Absent any noticeable activity by the mobile device, the cellular signal detection hardware may be able to distinguish certain identifiable traits of the mobile device. Such as connected cell tower, relative cellular signal strength, cellular technology in use for example GSM vs. CDMA, 2G vs. 3G vs. LTE. Even characteristics produced by sensors running on the mobile device, such as Bluetooth, can be utilized.

It should be noted that all of the above methods could utilize and process the collected data within the mobile device, within the system control device, remotely from the vehicle, using a cloud-based server or processor, or any suitable combination of the above.

In another implementation, simply having the presence of various audio frequencies could be enough to trigger the application on the mobile device. One example could be to go into blocking/auditing/scoring mode whenever a consistent 19200 Hz and 19300 Hz signal is detected, as outlined in the various audio signal transmission methods discussed previously. If both signals are identified and consistently being played, the mobile device may use this as a signal to engage. To help prevent false positives related to the presence of the two signals, a third frequency may be used as a control or "presence" frequency. In one implementation, the left speaker might play a 19200 Hz tone and a 19300 Hz tone, whereas the right speaker would play a 19400 Hz tone and a 19300 Hz tone. In this example, the 19300 hz signal is the control signal. Further determination related to quadrant may be used as outlined above. It should be further stressed that all frequencies presented herein are intended only as examples. Any number of frequencies could be utilized in the presented solutions.

Another embodiment not requiring any hardware to be installed within the vehicle relies upon audio captured by the mobile device. Once the audio has been analyzed and determined to be in a vehicle, the accelerometer or GPS of the mobile device could be used to trigger motion and instruct the software on the mobile device to go into blocking mode. Through further analysis, the specific vehicle or type of vehicle could be determined. This would allow for a GPS or accelerometer based system to remove false positives and ensure that the mobile device is blocked only in intended vehicles.

In one implementation it may be desirable periodically to record background audio. Once the audio indicates that the mobile device is potentially in a vehicle, based on engine noises, known frequencies being played through the vehicle speakers, or other pre-determined sounds that are used to detect that a mobile device is in a vehicle, the system can transition to using GPS or accelerometer for motion to launch the blocking software on the mobile device. A GPS triggered or accelerometer triggered solution implemented in this fashion would have substantially reduced battery drain.

In another implementation, GPS or accelerometer data may be used to indicate movement. Once movement has been indicated, the mobile device can record background audio to determine if it is in a vehicle and/or specifically in which quadrant within the vehicle the mobile device is located. Using this information, a determination for blocking/auditing/scoring can be made by the software on the mobile device.

Light (either visible or not visible to the human eye) could be picked up by light sensors built into many mobile devices. Changes in light could be an indication of change in environment, which may precede a mobile device entering a vehicle. Light could also be unique to a vehicle and used as a way of distinguishing one vehicle from another. For example, lights emitted by various instruments and gadgets found within a vehicle, or light from outside the vehicle filtered by window tint may be used and calibrated to apply to a specific vehicle—with calibration being adjusted based on time of day and current weather conditions retrieved for the current location of the vehicle or the mobile device. The intensity, hue, and saturation of light(s) detected could all be useful in making this determination. Light itself could also be a triggering mechanism, with different lights being emitted into the cabin of a vehicle and detected by the mobile device. Data can be communicated through this method as well, using frequency modulation techniques. Using infrared may be especially advantageous in this context, as it would be invisible to humans, while most digital cameras are capable of seeing near-infrared light.

By utilizing all of the above triggering mechanisms, the blocking/auditing/scoring applications described herein can have multiple mobile devices associated with a single vehicle or with multiple vehicles.

All of the above methods of determining which mobile device (or the likelihood of a mobile device) being in a vehicle could also be used to conserve battery on the mobile device for various blocking/auditing/scoring applications. Some of these sensors use less energy than BT, for example. Thus, first determining that a mobile device is in a vehicle, using one or more the above information, such as audio, light, temperature, magnetometer, etc., may be useful before the mobile device initiates any Bluetooth discovery protocols, which would help conserve battery life on the mobile device.

In all references above to blocking or triggering, the solution should be understood to mean a blocking solution, auditing, scoring, UBI, or hours of service type application.

(4) Logging, Collection, and Auditing of Driver Activity and Vehicle Usage Applications Advantageously, the systems, methods, and devices described herein are also capable of monitoring usage of a vehicle to detect, log, and report on dangerous or abusive operator behavior, such as excessive speeding or excessive idling of the vehicle.

For example, a mobile application could record the number of phone calls made, the duration of phone calls, SMS sent and/or received, applications used, duration of application(s) used, screen dimming/un-dimming, screen locked or unlocked status, and other variables to reconstruct a picture of how the mobile device was utilized while the user was driving.

In another example, the microphone of the control device can be used to detect breaking glass associated with the vehicle. Such detection in combination with vehicle movement, based on data from the accelerometer or the GPS module, could be used to indicate that the vehicle has been in an accident. In contrast, detection of breaking glass in combination with non-movement of the vehicle, again based on data from the accelerometer or the GPS module, could be used to indicate that the vehicle has been broken into. Applications running on a mobile device or running on the vehicle itself could then use this data to, in the first case, send an automated call to 911 and to a spouse or closest relative indicating that an accident has occurred. In the second case, applications running on a mobile device or running on the vehicle itself could then use this data to call 911 and call or text the owner of the vehicle indicating that a break-in may have occurred. The GPS location of the device could also be provided in such communication.

In another example, being able to detect noise in the cabin of the vehicle, such as a dog barking or a child crying, in combination with data detecting that the vehicle is not in motion and has not been in motion for a predetermined period of time, in combination with a high in-cabin temperature reading, could trigger an application to notify send an emergency alert call or text to the owner of the vehicle (or to authorities) depending upon the settings made in the application.

In a further example, the accelerometer of the control device can be used to detect rapid changes in orientation of the control device. If such rapid change in orientation is detected while the vehicle is in motion, such information could indicate that the vehicle has been involved in a potentially serious accident, indicating that the vehicle has rolled or flipped. On the other hand, such rapid change in orientation of the control device while the vehicle is not in motion could indicate that the user is attempting to remove the control device from its mounted position. Additional vehicular data detectible by the control device can further aid in validating if either of these conditions is actually occurring.

(5) UBI Scoring and Insurance Applications

Another advantage of knowing which mobile device is in the driver quadrant of a vehicle is to identify the owner of the mobile device as the likely driver of the vehicle, which can then be used for UBI scoring, rewards programs, electronic driver logging, and the like.

For purposes of UBI scoring, there can be individual scores for various factors associated with the driver. These factors can then be combined into a single cumulative score. Further, impaired driving can potentially be detected by swerving, hard braking, and hard acceleration. Each of these can be detected via accelerometer associated with the vehicle, with the control device installed in a vehicle, or with the mobile device, or any combination of the above.

For example, a mobile application could record the number of phone calls made, the duration of phone calls, SMS sent and/or received, applications used, duration of application(s) used, screen dimming/un-dimming, screen locked or unlocked status, and other variables to reconstruct a picture of how the mobile device was utilized while the user was driving. This usage information can then be formulated into a score to aid in UBI scoring, reward programs, or behavioral modification programs.

Utilizing a device capable of detecting signals emitting from the driver quadrant of a vehicle, UBI, rewards, or behavioral scoring could also be performed without needing an application to run on the mobile device. Such as outlined above, the signal detection system could record various uses of the mobile device while located within the driver quadrant.

Driving conditions can also play a role in such scoring. For example, if someone is driving into the sun, while it is at a low angle, this in a dangerous condition. This can be detected by heading information, latitude and longitude data (all gathered via GPS) combined with ephemeris data for the sun, at that time, and in that location. A threshold for both heading versus sun azimuth, as well as minimum and maximum sun altitude, could be used for this score, as well as length of time and speed while in this condition.

Driver fatigue can also be a contributing factor to accidents. This can be measured by tracking how many hours the driver has driven that day, as well as how many hours in a row the driver has driven. Additionally, late night interstate driving is more dangerous than late night city driving. Interstate driving can be detected by a continuous high speed or by collection of GPS data.

Additionally, the control device can be used to help detect, identify, and manage insurance fraud and collision management by monitoring/collecting data, such as accelerometer activity, g-force/impact, combined with GPS location and other data elements including driver/passenger identification. For instance, if an impact event happens, while a teenage-driver was driving the vehicle near the parent-vehicle-owner's home, the collected data would prevent the parent-vehicle-owner from moving the vehicle and staging a fraudulent accident at a later time, at a different location, and with a different driver.

(6) Smart Pairing Applications

Another use for driver identification (or identifying within which quadrant of the vehicle a mobile device is located) includes "smart pairing." For example, it is becoming more and more common for vehicles to adapt to the person who is driving. Many aspects of the driving experience (such as which mobile device is currently connected to hands free, which address book is shared, which music is being streamed, seat adjustments, etc.) can be configured within the vehicle based on driver. Using technology to identify which mobile device is within the driver quadrant can be used to make these technologies more efficient. For example, an application running on a mobile device can be configured to notify the head unit or head rest when the mobile device is in the driver quadrant. This would allow the vehicle's adjustments to take place automatically.

A common use case would be determining which mobile device is currently connected via Bluetooth to the head unit. If two family members enter into a vehicle today, only one of those mobile devices will connect to the head unit for music streaming, address book synching, and hands free calling. Typically, the mobile device that has been designated as the "primary" device associated with the vehicle will prevail—even if such device is not being carried by the driver. Using the control device disclosed herein and using one or more methods for determining whether the mobile device is located in the driver quadrant, the head unit could drop the connection to the "primary" mobile device when it has been determined that the primary mobile device is not located within the driver quadrant. This would free up the connection for the mobile device (and the customized vehicle settings) of the user who is actually sitting in the driver quadrant. Head unit technology can take advantage of this smart association without blindly relying upon which mobile device has been identified as the "primary" device associated with the vehicle and, instead, the system would dynamically designate whichever mobile device is in the driver quadrant as the currently active or primary device and associate the vehicle settings to the user associated with the detected mobile device.

The various technologies and techniques for determining whether the mobile device is located in the driver quadrant can also be used outside of today's current head unit use cases. For example, SMS could be withheld by the head unit automatically, calls could be routed to voice mail, auto responding messages could be sent. Any number of adjustments can be made to communications that are allowed—based on the mobile device located within the driver quadrant. Even behavioral modification technologies could benefit, being able to direct instructions tailored towards the actual driver or passengers based on the various locations of the mobile devices within the cabin of the vehicle.

(7) Industry Specific Applications

Another use for driver identification (or identifying within which quadrant of the vehicle a mobile device is located) includes the ability to communicate with third party route management software as to GPS location, start/stop time, etc. Such data can also be cross-referenced for route optimization, re-routing due to traffic congestion data, validation and/or verification of home healthcare visits, compliance with house arrest or parole obligations, delivery notifications and confirmations, and the like.

In view of the foregoing detailed description of preferred embodiments of the present invention, it readily will be understood by those persons skilled in the art that the present invention is susceptible to broad utility and application. While various aspects have been described herein, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in various different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method comprising:
   prompting, in response to a request to disable blocking of a user interaction with one or more functions of a mobile device of a user in a vehicle, a positioning of the mobile device in a specified orientation;
   capturing a first image by a first camera of the mobile device while the specified orientation is maintained;
   prompting, while the specified orientation is maintained, a capture of at least a second image by a second camera of the mobile device, the second image including one or more items;

determining, as a function of the at least the second image, whether the one or more items included in the second image is captured from a passenger space of the vehicle while the specified orientation is maintained;

upon determining that the one or more items is captured from the passenger space of the vehicle, prompting the user to provide an input;

upon validating the input, disabling the blocking of the user interaction with the one or more functions of the mobile device;

receiving accelerometer and gyroscope sensor data indicating that the mobile device has been moved to a driver space of the vehicle from the passenger space; and reenabling, in response to the received accelerometer and gyroscope sensor data, the blocking of the user interaction with the one or more functions of the mobile device.

2. The method of claim 1, further comprising:
detecting a deviation from the specified orientation; and
re-prompting for the positioning of the mobile device in the specified orientation.

3. The method of claim 1, wherein the prompting of the positioning of the mobile device occurs while the vehicle is in motion.

4. The method of claim 1, wherein determining whether the one or more items included in the second image is captured from the passenger space is further determined as a function of a classification model built from a plurality of training images distinguishing between items captured from a perspective of the passenger space and a perspective of a space in the vehicle other than the passenger space.

5. The method of claim 1, further comprising, upon determining that the at least the second image is captured from a space in the vehicle other than the passenger space, continuing to block the user interaction with the one or more functions of the mobile device.

6. The method of claim 1, further comprising, prompting a capture of a third image by the first camera of the mobile device.

7. The method of claim 6, further comprising, determining whether the third image is captured from the passenger space.

8. The method of claim 6, wherein the second camera corresponds to a rear-facing camera and wherein the first camera corresponds to a front-facing camera.

9. The method of claim 1, wherein prompting the capture of at least the second image by the second camera comprises prompting a capture of a specified item by the second camera.

10. The method of claim 9, further comprising, identifying the specified item in the at least the second image, wherein determining whether the at least the second image is captured from the passenger space comprises determining, based on one or more machine learning techniques, whether the specified item is captured from the passenger space.

11. The method of claim 1, wherein the request to disable the blocking of a user interaction with the one or more functions of the mobile device is an indication of a passenger status of a user of the mobile device.

12. The method of claim 1, wherein the blocking of the user interaction with the one or more functions of the mobile device is caused by a native application executing on the mobile device.

13. A mobile device, comprising:
a first camera;
a second camera;
one or more processors;
a display;
a memory storing application code, which, when executed by the one or more processors, causes the mobile device to:
prompt, in response to a request to disable blocking of a user interaction with one or more functions of the mobile device by of a user in a vehicle, a positioning of the mobile device in a specified orientation,
capture a first image by the first camera while the specified orientation is maintained;
prompt, while the specified orientation is maintained, a capture of at least a second image by the second camera, the second image including one or more items;
determine, as a function of the at least the second image, whether the one or more items included in the second image is captured from a passenger space of the vehicle while the specified orientation is maintained;
upon a determination that the one or more items is captured from the passenger space of the vehicle, prompt the user to provide an input;
upon a validation the input, disable the blocking of the user interaction with the one or more functions of the mobile device;
receive accelerometer and gyroscope sensor data indicating that the mobile device has been moved to a driver space of the vehicle from the passenger space;
reenable, in response to the received accelerometer and gyroscope sensor data, the blocking of the user interaction with the one or more functions of the mobile device.

14. The mobile device of claim 13, wherein the application code further causes the mobile device to:
detect a deviation from the specified orientation; and
re-prompt for the positioning of the mobile device in the specified orientation.

15. The mobile device of claim 13, wherein the prompt of the positioning of the mobile device occurs while the vehicle is in motion.

16. The mobile device of claim 13, wherein the determination of whether the one or more items included in the second image is captured from the passenger space is further determined as a function of a classification model built from a plurality of training images distinguishing between items captured from a perspective of the passenger space and a perspective of a space in the vehicle other than the passenger space.

17. The mobile device of claim 13, wherein the application code further causes the mobile device to, upon a determination that the at least the second image is captured from a space in the vehicle other than the passenger space, continue to block the user interaction with the one or more functions of the mobile device.

18. The mobile device of claim 13, further comprising a third camera, wherein the application code further causes the mobile device to, prompt to capture of a third image by the third camera.

19. The mobile device of claim 18, wherein the application code further causes the mobile device to determine whether the third image is captured from the passenger space.

20. The mobile device of claim 18, wherein the second camera corresponds to a rear-facing camera and wherein the first camera corresponds to a front-facing camera.

* * * * *